(12) United States Patent
Omatsu et al.

(10) Patent No.: US 6,682,590 B2
(45) Date of Patent: Jan. 27, 2004

(54) INK COMPOSITION FOR INK JET RECORDING AND IMAGE FORMATION METHOD

(75) Inventors: Tadashi Omatsu, Kanagawa (JP); Masaki Noro, Kanagawa (JP)

(73) Assignee: Fuji Photo Film Co., Ltd., Minami Ashigara (JP)

( * ) Notice: Subject to any disclaimer, the term of this patent is extended or adjusted under 35 U.S.C. 154(b) by 91 days.

(21) Appl. No.: 09/995,761

(22) Filed: Nov. 29, 2001

(65) Prior Publication Data

US 2002/0096082 A1 Jul. 25, 2002

(30) Foreign Application Priority Data

Nov. 29, 2000 (JP) ..................................... P.2000-363201

(51) Int. Cl.[7] ............................................... C09D 11/02
(52) U.S. Cl. ................ 106/31.5; 106/31.43; 106/31.48; 106/31.33
(58) Field of Search ............................ 106/31.5, 31.43, 106/31.48, 31.33; 347/100

(56) References Cited

U.S. PATENT DOCUMENTS

| 5,462,590 | A | * | 10/1995 | Yui et al. .................. 106/31.43 |
| 6,048,390 | A | * | 4/2000 | Yano et al. ............... 106/31.43 |
| 6,455,679 | B1 | * | 9/2002 | Tateishi et al. .............. 534/766 |
| 6,468,338 | B1 | * | 10/2002 | Evans et al. ................ 106/31.5 |
| 6,489,452 | B1 | * | 12/2002 | Tateishi et al. .............. 534/775 |

OTHER PUBLICATIONS

CRC Handbook of Chemistry and Physics, 63rd Edition, pp. C–268 and C–312, 1982, no month available.*

Matsui et al, "The Effect of Antiozonants on the Reaction of Dyes with Ozone. 1–Mechanism of Antiozonant Action", *Journal of the Society of Dyers and Colourists*, vol. 101, pp. 334336, 10/85.

* cited by examiner

*Primary Examiner*—Helene Klemanski
(74) *Attorney, Agent, or Firm*—Burns, Doane, Swecker & Mathis, LLP

(57) ABSTRACT

An ink composition comprising: an aqueous medium; a high boiling organic solvent dispersed in the aqueous medium; an oil-soluble dye dissolved in the high boiling organic solvent; and a compound represented by the formula (I) defined in the specification: wherein the oil-soluble dye is represented by the formula (II) defined in the specification.

23 Claims, No Drawings

INK COMPOSITION FOR INK JET RECORDING AND IMAGE FORMATION METHOD

FIELD OF THE INVENTION

The present invention relates to an ink composition for ink jet recording excellent in image fastness and stability, and an image formation method using the ink composition.

BACKGROUND OF THE INVENTION

With the recent spread of computers, ink-jet printers have been widely utilized for printing paper, film, cloth and the like, not only in offices, but also in homes. As ink-jet recording ink, there are known water-based ink, oil-based ink and solid ink. However, the water-based ink is mainly used in terms of production, handling, odors and safety.

In many cases, however, the water-based ink has the advantages of high transparency and color density, but the disadvantage of poor water resistance, which causes blurring (bleeding) on printing on so-called plain paper, resulting in significantly deteriorated printing quality, because water-soluble dyes soluble in the molecular state are used. Further, the water-based ink also has the disadvantage of very poor light resistance.

For overcoming the above-mentioned disadvantages, water-based ink using pigments or disperse dyes has variously been reported, for example, in JP-A-56-157468 (the term "JP-A" as used herein means an "unexamined published Japanese patent application"), JP-A-4-18468, JP-A-10-110126 and JP-A-10-195355. These methods improve the water resistance, but are insufficient. In particular, pigment ink has the disadvantages of being inferior to dye ink in color development and being liable to clog nozzles because of lack of storage stability of dispersions.

Further, JP-A-58-45272 proposes a method of involving a dye in urethane polymer latex particles. However, this method has the disadvantage that it is difficult to obtain colored particles excellent in dispersion stability when the dye is involved in a desired concentration. Furthermore, JP-A-10-279873 discloses a method of preparing fine colored polymer particles by dissolving an acrylic polymer and an oil-soluble dye in an organic solvent, and removing the organic solvent after dispersing. However, this method has raised problems with regard to the quality of recorded images, particularly the quality of images recorded on paper media for photographic quality, and stability in continuous recording.

On the other hand, JP-B-5-76977 (the term "JP-B" as used herein means an "examined Japanese patent publication") discloses an ink composition in which an oil-soluble dye is dissolved and dispersed in an organic solvent. However, it has become clear that the organic solvents defined herein are generally insufficient in compatibility with the oil-soluble dyes, so that the recording density is low, resulting in precipitation of the dyes during storage to cause clogging of nozzles according to circumstances.

Further, the oil-soluble dyes disclosed are insufficient in color reproduction based on insufficient color hues, and the storage stability of images obtained is also insufficient For improving the storage stability, JP-A-1-170674 discloses ink jet recording solutions containing UV absorbers and/or antioxidants. However, they can not be said to be sufficient in respect to light resistance.

As a means for allowing water resistance to be compatible with color development and image keeping quality, an ink composition is conceivable in which an oil-soluble dye and a fading inhibitor are dispersed in an aqueous medium. In this case, for preventing the dye from being precipitated, securing the storage stability and ejecting stability of the ink composition, and obtaining higher recorded image quality, it is necessary to reduce the average particle size of colored particles. However, the image keeping quality tends to deteriorate under such conditions. A technique has therefore been desired in which the image quality and the water resistance are compatible with the image keeping quality, regardless of the average particle size of the colored particles.

SUMMARY OF THE INVENTION

An object of the invention is to provide an ink composition for ink jet recording excellent in image quality, water resistance and image fastness.

According to the invention, there are provided:

(1) An ink composition comprising: an aqueous medium; a high boiling organic solvent dispersed in the aqueous medium; an oil-soluble dye dissolved in the high boiling organic solvent; and a compound represented by the following formula (I):

wherein $R^{101}$ and $R^{102}$ each independently represents one of a hydrogen atom, an aliphatic group, an aromatic group, a heterocyclic group, an acyl group, an aliphatic oxycarbonyl group, an aromatic oxycarbonyl group, an aliphatic sulfonyl group, an aromatic sulfonyl group, a substituted or unsubstituted carbamoyl group and a substituted or unsubstituted thiocarbamoyl group; $R^{103}$ represents one of an aliphatic group, an aromatic group, an aliphatic oxy group, an aromatic oxy group, an aliphatic thio group, an aromatic thio group, an acyloxy group, an aliphatic oxycarbonyloxy group, an aromatic oxycarbonyloxy group, a substituted or unsubstituted amino group, a heterocyclic group and a hydroxyl group; and $R^{101}$ and $R^{102}$, $R^{102}$ and $R^{103}$, and $R^{103}$ and $R^{101}$ may each combine with each other to form one of 5-, 6- and 7-membered ring, excluding the case a 2,2,6,6-tetraalkylpiperidine skeleton is formed, wherein the oil-soluble dye is represented by the following formula (II):

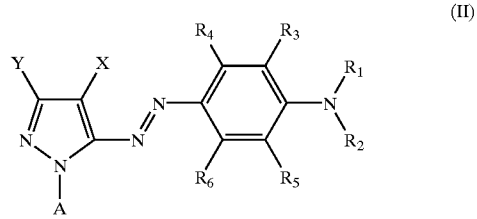

wherein X represents an electron attractive group having a Hammett substituent constant $\sigma_p$ of at least 0.20; $R_1$ and $R_2$ each independently represents one of a substituted or unsubstituted alkyl group, a substituted or unsubstituted alkenyl group, a substituted or unsubstituted cycloalkyl group and a substituted or unsubstituted aralkyl group; $R_3$, $R_4$, $R_5$ and $R_6$ each independently represents one of a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group and an acyl group, which may each further have a substituent group; $R_1$ and $R_2$, $R_3$ and $R_1$, and Rd $R_2$ and $R_5$ may each combine with each other to form a ring; Y represents one of a secondary or tertiary alkyl group, and a substituted or unsubstituted aryl group; and A represents a group comprising a non-metallic atomic group necessary for forming a one of 5-, 6-, 7- and 8-membered ring, and the ring may be substituted, may be a saturated ring, and may have an unsaturated bond.

(2) The ink composition as described in (1), wherein A in the formula (II) is a group represented by one of the following formulae (2-1) to (2-9):

(2-1)

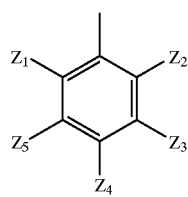

(2-2)

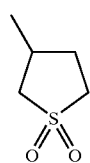

(2-3)

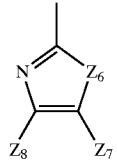

(2-4)

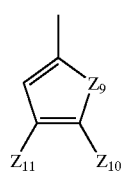

(2-5)

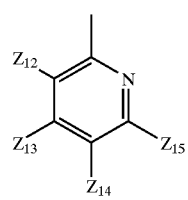

(2-6)

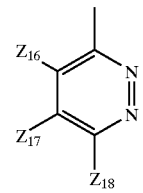

(2-7)

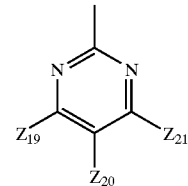

(2-8)

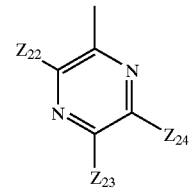

(2-9)

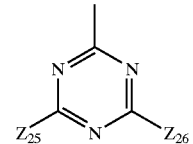

wherein $Z_1$ and $Z_2$ each independently represents one of a halogen atom, an alkyl group, a cycloalkyl group, an aralkyl group, an alkenyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group and an acyl group; $Z_6$ and $Z_9$ each independently represents one of N—R, an oxygen atom and a sulfur atom; and R, $Z_3$, $Z_4$, $Z_5$, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$ and $Z_{26}$ each independently represents one of a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group and an acyl group.

(3) The ink composition as described in (1) or (2), wherein the compound represented by the formula (I) is a compound represented by the following formula (IA):

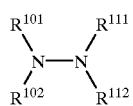

(IA)

wherein $R^{101}$ and $R^{102}$ have the same meaning as defined in the formula (I), and $R^{111}$ and $R^{112}$ have the same meaning as $R^{101}$.

(4) The ink composition as described in one of (1) to (3), wherein the compound represented by the formula (I) is a compound represented by the following formula (IB):

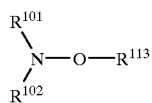

(IB)

wherein $R^{101}$ and $R^{102}$ have the same meaning as defined in the formula (I), and $R^{113}$ has the same meaning as $R^{101}$.

(5) The ink composition as described in (3), wherein $R^{101}$ and $R^{102}$ each independently represents one of a hydrogen atom, an aliphatic group, an aromatic group and an acyl group.

(6) The ink composition as described in (3), wherein $R^{111}$ and $R^{112}$ each independently represents one of a hydrogen atom, an acyl group, an aliphatic oxycarbonyl group, an aromatic oxycarbonyl group, an aliphatic sulfonyl group, an aromatic sulfonyl group, a substituted or unsubstituted carbamoyl group and a substituted or unsubstituted thiocarbamoyl group.

(7) The ink composition as described in (4), wherein $R^{113}$ represents one of a hydrogen atom, an aliphatic group, an aromatic group, a heterocyclic group and an acyl group.

(8) The ink composition as described in one of (1) to (7), wherein particles comprising the dye dispersed in the aqueous medium have an average particle size of from 5 nm to 100 nm.

(9) The ink composition as described in one of (1) to (8), wherein the compound represented by the formula (I) and the oil-soluble dye are comprised in same particles.

(10) The ink composition as described in one of (1) to (9), wherein the amount of the compound represented by the formula (I) is from 1 mol % to 1000 mol % based on the amount of the oil-soluble dye.

(11) The ink composition as described in one of (1) to (10), wherein the amount of the oil-soluble dye is from 0.2 to 20 parts by weight per 100 parts by weight of the ink composition.

(12) The ink composition as described in one of (1) to (11), wherein the amount of the high boiling organic solvent is from 0.01 to 20 parts by weight based on 1 parts by weight of the amount of the oil-soluble dye.

(13) An image formation method which comprises ejecting the ink composition as described in one of (1) to (12) onto an image receiving paper comprising: an image receiving layer comprising white inorganic pigment particles; and a support.

(14) The image formation method as described in (13), wherein the compound represented by the formula (I) is a compound represented by the following formula (IA):

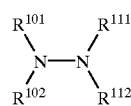

(IA)

wherein $R^{101}$ and $R^{102}$ have the same meaning as defined in the formula (I), and $R^{111}$ and $R^{112}$ have the same meaning as $R^{101}$.

(15) The image formation method as described in (13), wherein the compound represented by the formula (I) is a compound represented by the following formula (IB):

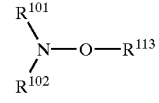

(IB)

wherein $R^{101}$ and $R^{102}$ have the same meaning as defined in the formula (I), and $R^{113}$ has the same meaning as $R^{101}$.

DETAILED DESCRIPTION OF THE INVENTION

The invention will be described in detail below.

In the invention, the oil-soluble dye and the high boiling organic solvent are in a so-called emulsified dispersion state in which they are dispersed in the aqueous medium as fine particle-like droplets of oil. The term "aqueous medium" as used in the invention means water or a mixture of water and a small amount of an aqueous-miscible organic solvent to which an additive such as a surfactant, a wetting agent, a stabilizer or a preservative is added as needed.

As the oil-soluble dye used in the invention, there can be used one having an arbitrary solubility in ethyl acetate.

Then, the compound represented by formula (I) will be described.

In formula (I), $R^{101}$ and $R^{102}$ each represents a hydrogen atom, an aliphatic group (e.g., methyl, ethyl, t-butyl, octyl, methoxyethoxy), an aromatic group (e.g., phenyl, p-chlorophenyl, naphthyl), a heterocyclic group (e.g., 2-pyridyl, 1-piperidino, 1-morpholino), an acyl group (e.g., acetyl, pivaloyl, methacryloyl, benzoyl), an aliphatic oxycarbonyl group (e.g., methoxycarbonyl, hexadecyloxycarbonyl), an aromatic oxycarbonyl group (e.g., phenoxycarbonyl), an aliphatic sulfonyl group (e.g., methanesulfonyl, butanesulfonyl), an aromatic sulfonyl group (e.g., benzenesulfonyl, p-toluenesulfonyl), a substituted or unsubstituted carbamoyl group (e.g., carbamoyl, N-methylcarbamoyl, N-phenylcarbamoyl) or a substituted or unsubstituted thiocarbamoyl group (e.g., thiocarbamoyl, N-methylthiocarbamoyl, N-phenylthiocarbamoyl); $R^{103}$ represents an aliphatic group (e.g., methyl, ethyl, t-butyl, octyl, methoxyethoxy), an aromatic group (e.g., phenyl, p-chlorophenyl, naphthyl), an aliphatic oxy group (e.g., methoxy, octyloxy), an aromatic oxy group (e.g., phenoxy, p-methoxyphenoxy), an aliphatic thio group (e.g., methylthio, octylthio), an aromatic thio group (e.g., phenylthio, p-methoxyphenylthio), an acyloxy group (e.g., acetoxy, pivaloyloxy, p-chlorobenzoyl), an aliphatic oxycarbonyloxy group (e.g., methoxycarbonyloxy, octyloxycarbonyl), an aromatic oxycarbonyloxy group (e.g., phenoxycarbonyloxy), a substituted or unsubstituted amino group (an amino group substituted by a substituent group such as an aliphatic group, an aromatic group, an acyl group, an aliphatic sulfonyl group, an aromatic sulfonyl group), a heterocyclic group (e.g., 2-pyridyl, 4-pyridyl, 1-piperidino, 1-morpholino) or a hydroxyl group; and $R^{101}$ and $R^{102}$, $R^{102}$ and $R^{103}$, or $R^{103}$ and $R^{101}$ may combine with each other to form a 5- to 7-membered ring (e.g., piperidine, pyrazolidine) when possible.

These substituent groups may be further substituted by substituent groups, which include, for example, a halogen atom, an alkyl group (including a cycloalkyl group and a bicycloalkyl group), an alkenyl group (including a cycloalkenyl group and a bicycloalkenyl group), an alkynyl group, an aryl group, a heterocyclic group, a cyano group, a hydroxyl group, a nitro group, a carboxyl group, an alkoxyl group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group and a silyl group.

The compounds of the invention represented by formula (I) include compounds represented by formula (I) of JP-B-6-97332, formula (I) of JP-B-6-97334, formula (I) of JP-A-2-148037, formula (I) of JP-A-2-150841, formula (I) of JP-A-2-181145, formula (I) of JP-A-3-266836, formula (IV) of JP-A-4-350854 and formula (I) of JP-A-5-61166.

The compounds of the invention represented by formula (I) are preferably compounds represented by formulae (IA) and (IB) in terms of the effect of the invention.

(IA)

(IB)

In formulae (IA) and (IB), $R^{101}$ and $R^{102}$ have the same meaning as defined in formula (I), and $R^{111}$ to $R^{113}$ have the same meaning as $R^{101}$.

In formula (IA), $R^{101}$ and $R^{102}$ are each preferably a hydrogen atom, an aliphatic group, an aromatic group or an acyl group, and more preferably an aliphatic group or an aromatic group. Further, $R^{111}$ and $R^{112}$ are each preferably a hydrogen atom, an acyl group, an aliphatic oxycarbonyl group, an aromatic oxycarbonyl group, an aliphatic sulfonyl group, an aromatic sulfonyl group, a substituted or unsubstituted carbamoyl group or a substituted or unsubstituted thiocarbamoyl group, and more preferably a hydrogen atom, an acyl group, an aliphatic sulfonyl group, an aromatic sulfonyl group, a substituted or unsubstituted carbamoyl group or a substituted or unsubstituted thiocarbamoyl group.

In formula (IB), $R^{101}$ is preferably an aliphatic group, an aromatic group, a heterocyclic group, an acyl group, an aliphatic sulfonyl group or an aromatic sulfonyl group, and more preferably an aliphatic group, a heterocyclic group or an acyl group. $R^{102}$ is preferably a hydrogen atom, an aliphatic group or an aromatic group, and more preferably a hydrogen atom or an aliphatic group. $R^{113}$ is preferably a hydrogen atom, an aliphatic group, an aromatic group, a heterocyclic group or an acyl group, and more preferably a hydrogen atom or an aliphatic group.

The compounds represented by formula (IA) can be synthesized by alkylation, acylation, sulfonylation or carbamoylation of hydrazine derivatives. Further, the compounds represented by formula (IB) can be synthesized by alkylation or acylation of hydroxylamine derivatives.

Specific examples of the compounds represented by formula (I) are shown below, but are not limited thereto.

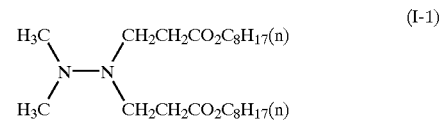
(I-1)

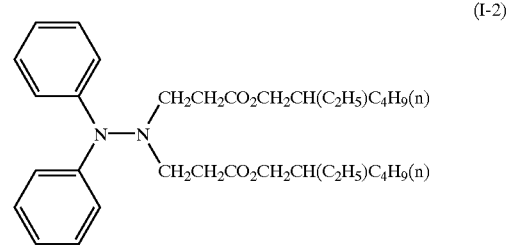
(I-2)

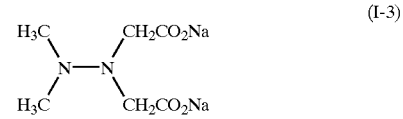
(I-3)

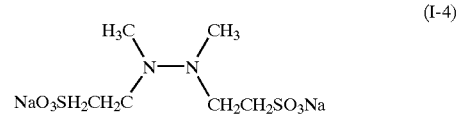
(I-4)

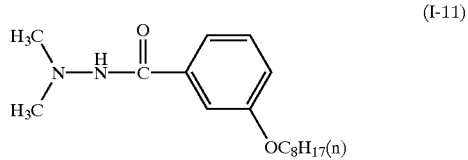
(I-11)

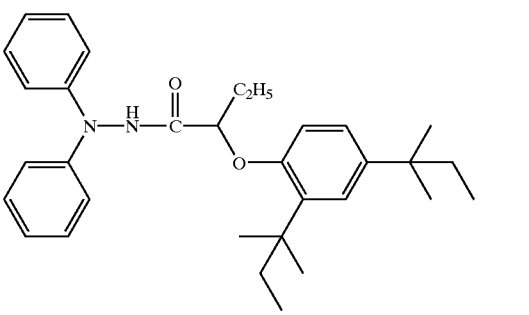
(I-12)

-continued

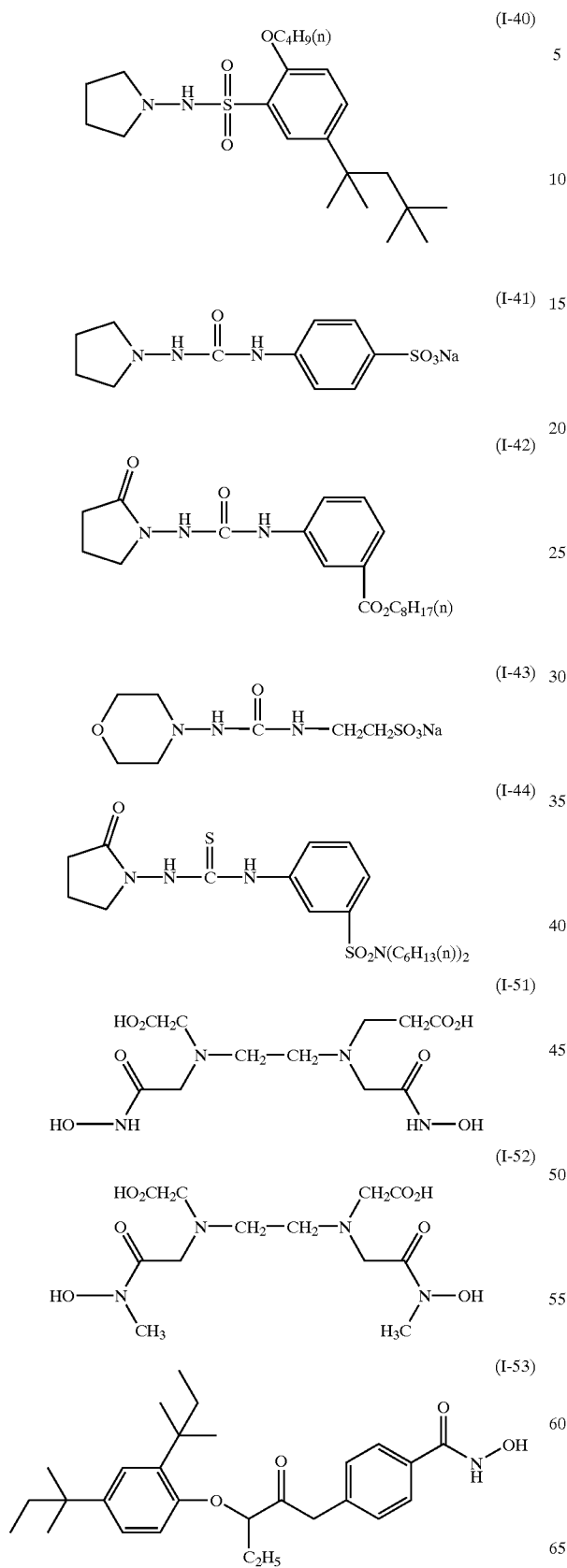
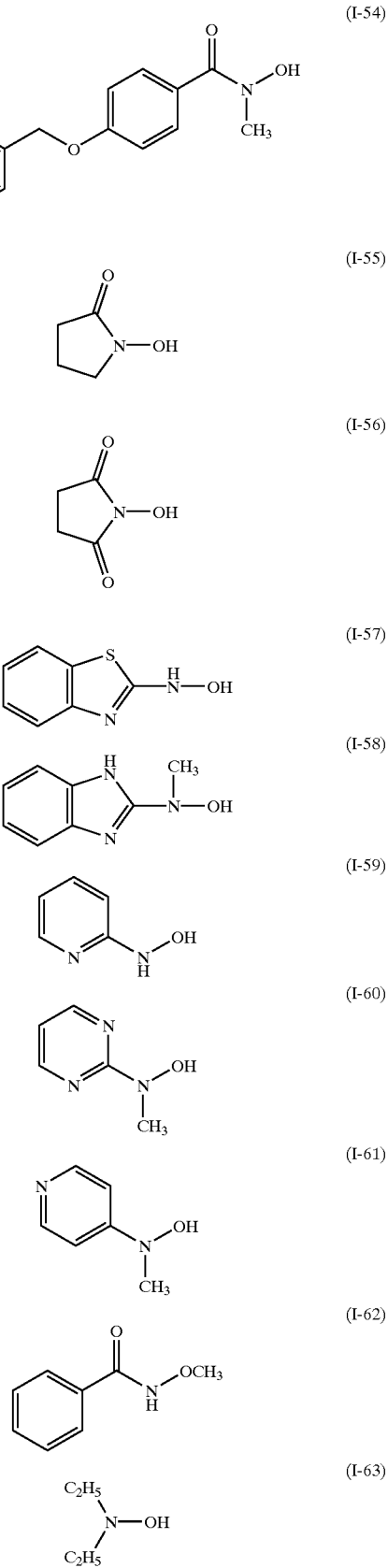

-continued
(I-64)
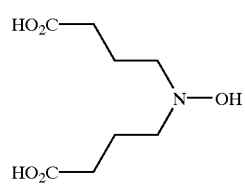
(I-65)
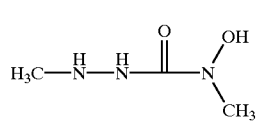
(I-66)
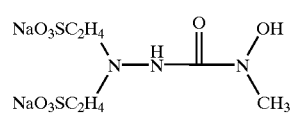
(I-67)
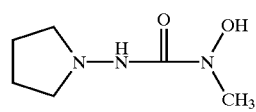
(I-68)
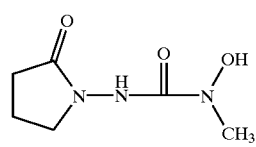
(I-69)
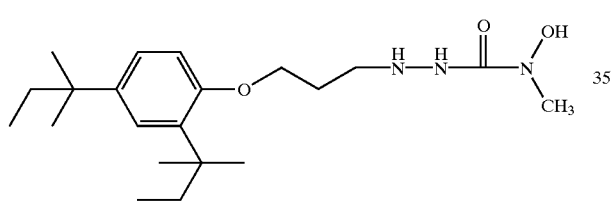
(I-70)
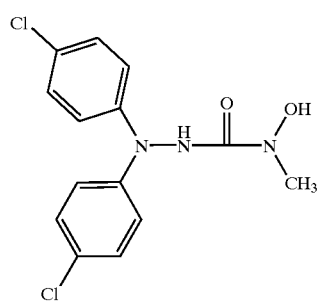
(I-71)
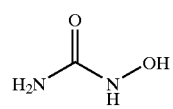
(I-72)
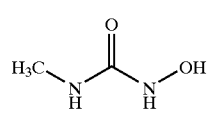
(I-73)
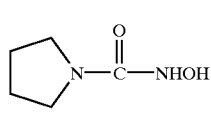
-continued
(I-74)
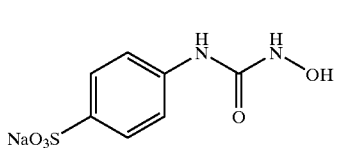
(I-75)
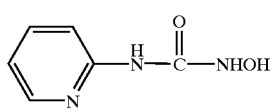
(I-76)
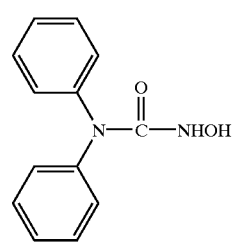
(I-77)
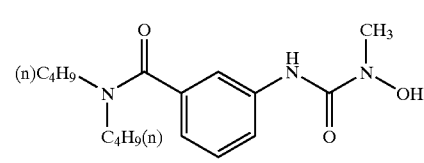
(I-78)
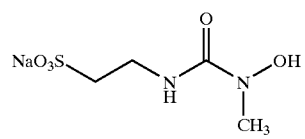
(I-79)
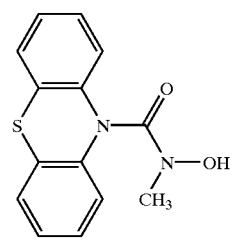
(I-80)
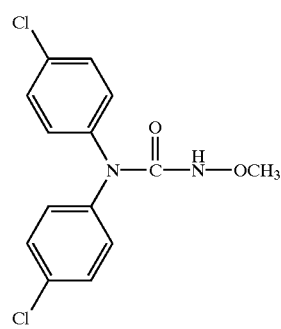
(I-81)
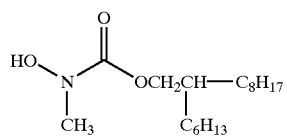

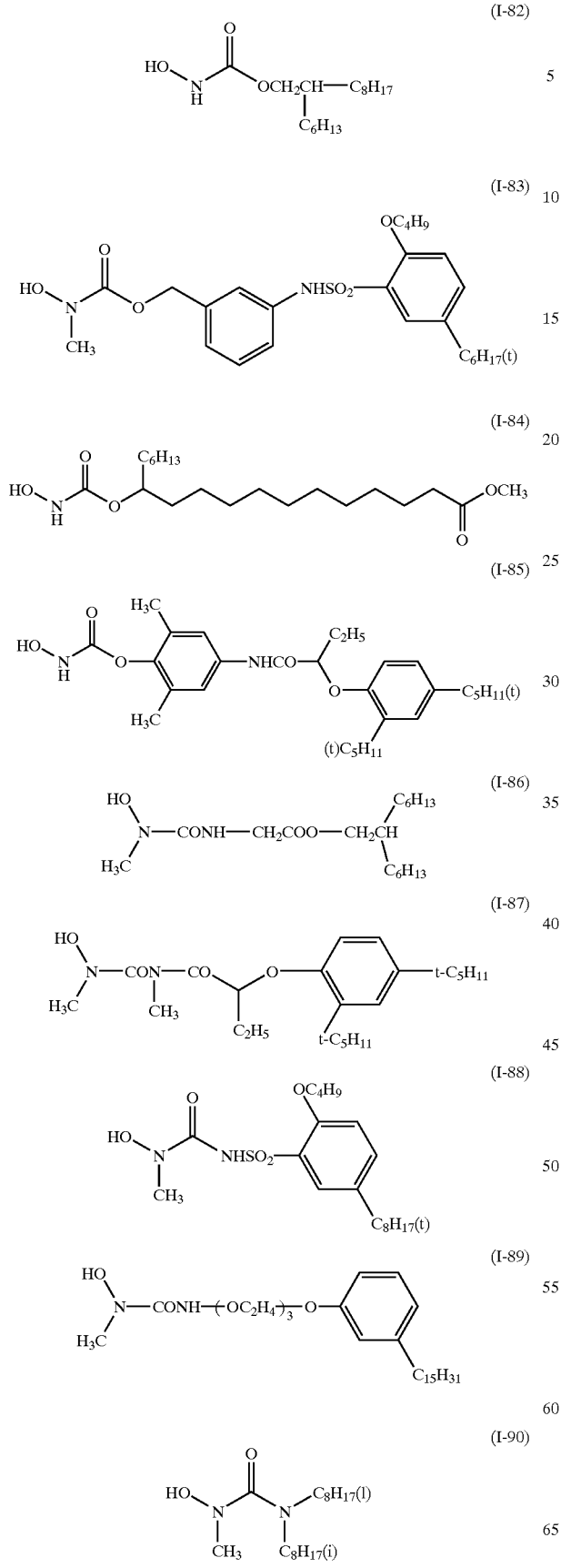
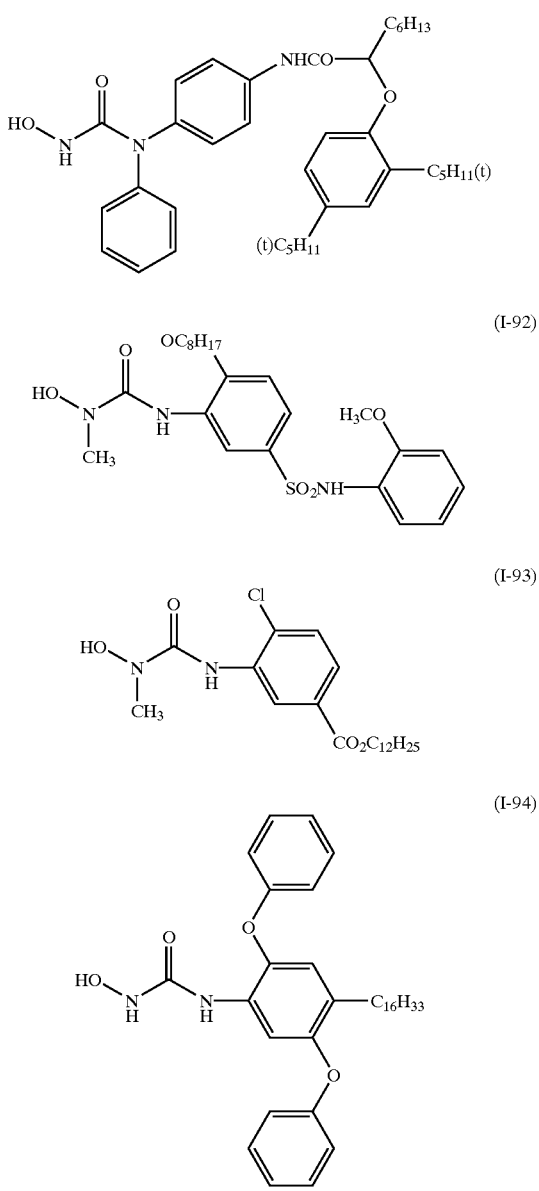

In the invention, various kinds of organic and metal complex fading inhibitors can be used together for improving the keeping quality of dye images. The organic fading inhibitors include hydroquinones, alkoxyphenols, dialkoxyphenols, phenols, anilines, amines, indanes, coumarones, alkoxyanilines and heterocycles, and the metal complex fading inhibitors include nickel complexes and zinc complexes. These are described in patents cited in *Research Disclosure*, No.17643, VII–I to J, ibid., No. 15162, ibid., No. 18716, page 650, left column, ibid., No. 36544, page 527, ibid., No. 307105 and ibid., No. 15162.

In addition to these compounds, there can be used alkene compounds represented by formula (I) of U.S. Pat. No. 4,713,317, boron compounds represented by formula (I) of JP-A-4-174430, epoxy compounds represented by formula (II) of U.S. Pat. No. 5,183,731 and formula (S1) of JP-A-8-53431, disulfide compounds represented by the formula of EP271322B1 and formulae (I), (II), (III) and (IV) of JP-A-4-19736, sulfinic acid compounds represented by formula (I)

of U.S. Pat. No. 4,770,987, reactive compounds represented by formulae (I), (II), (III) and (IV) of U.S. Pat. No. 5,242,785 and cyclic phosphorus compounds represented by formula (I) of JP-A-8-283279.

In the invention, metal complexes may be used. As the metal complexes, there are known many complexes such as dithiolate nickel complexes and salicylaldoxime nickel complexes, and can be used complexes represented by formula (I) of JP-B-61-13736, formula (I) of JP-B-61-13737, formula (I) of JP-B-61-13738, formula (I) of JP-B-61-13739, formula (I) of JP-B-61-13740, formula (I) of JP-B-61-13742, formula (I) of JP-B-61-13743, formula (I) of JP-B-61-13744, the formula of JP-B-5-69212, formulae (I) and (II) of JP-A-5-88809, the formula of JP-A-63-199248, formulae (I) and (II) of JP-A-3-182749, formulae (II), (III), (IV) and (V) of U.S. Pat. No. 4,590,153 and formulae (II), (III) and (IV) of U.S. Pat. No. 4,912,027.

As the metal complex, there can be used a compound represented by formula (IIIA) in terms of the effect of the invention.

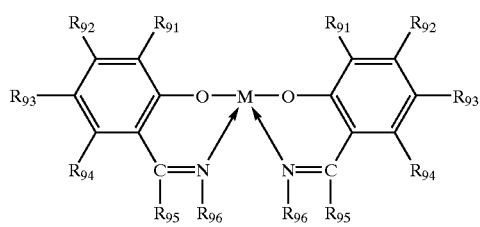

(IIIA)

wherein $R_{91}$, $R_{92}$, $R_{93}$ and $R_{94}$ each represents a substituent group; $R_{95}$ represents a hydrogen atom, an aliphatic group or an aromatic group; $R_{96}$ represents a hydrogen atom, an aliphatic group, an aromatic group or a hydroxyl group; M represents Cu, Co, Ni, Pd or Pt; two $R_{96}$'s may combine with each other to form a 5- to 7-membered ring; and adjacent $R_{91}$ and $R_{92}$, $R_{92}$ and $R_{93}$, $R_{93}$ and $R_{94}$, or $R_{94}$ and $R_{95}$ may combine with each other to form a 5- or 6-membered ring.

The substituent groups of $R_{91}$, $R_{92}$, $R_{93}$ and $R_{94}$ include, for example, an aliphatic group, an aliphatic oxy group, an aliphatic sulfonyl group, an aromatic sulfonyl group and an acylamino group, and the aliphatic groups of $R_{95}$ and $R_{96}$ include, for example, a methyl group, an ethyl group and an undecyl group. The aromatic groups include, for example, a phenyl group, and M is preferably Ni.

The amount of the compound of formula (I) added is from 1 mol % to 1000 mol %, preferably from 10 mol % to 500 mol %, based on the oil-soluble dye. Two or more kinds of compounds can also be used by mixing them in any proportion. Further, these compounds can be used together with the above-mentioned fading inhibitors. Although these compounds can be used in any phases of the ink compositions for ink jet recording, the coexistence with the oil-soluble dyes is more preferred.

The compounds of formula (I) can also be used together with stain inhibitors described in JP-A-7-104448 (column 39, line 50 to column 70, line 9), JP-A-7-77775 (column 61, line 50 to column 62, line 49) and JP-A-7-301895 (column 87, line 49 to column 88, line 48), UV absorbers described in JP-A-62-215272 (page 125, upper right column, line 2 to page 127, lower left column, the bottom line), JP-A-2-33144 (page 37, lower right column, line 14 to page 38 m upper left column, line 11) and EP-A-0355600 (page 85, lines 22 to 31), or fading inhibitors described in JP-A-7-104448 (column 70, line 10 to column 71, line 2).

Then, the compound represented by formula (II) will be described.

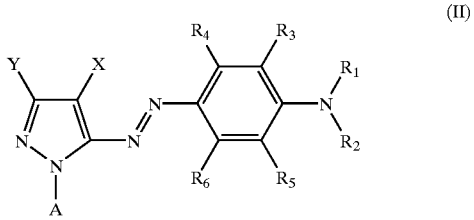

(II)

In the above-mentioned formula (II), X represents an electron attractive group having a Hammett substituent constant $\sigma_p$ of 0.20 or more. X is preferably an electron attractive group having a $\sigma_p$ constant of 0.30 to 1.0. Examples of the electron attractive groups X having a $\sigma_p$ constant of 0.20 or more include an acyl group, an acyloxy group, a carbamoyl group, an alkyloxycarbonyl group, an aryloxycarbonyl group, a cyano group, a nitro group, a dialkylphosphono group, a diarylphosphono group, a diarylphosphinyl group, an alkylsulfinyl group, an arylsulfinyl group, an alkylsulfonyl group, an arylsulfonyl group, a sulfonyloxy group, an acylthio group, a sulfamoyl group, a thiocyanate group, a thiocarbonyl group, an alkylhalide group, an alkoxyl halide group, an aryloxy halide group, an alkylamino halide group, an alkylthio halide group, an aryl group substituted by another electron attractive group having a $\sigma_p$ constant of 0.20 or more, a heterocyclic group, a halogen atom and a selenocyanate group.

X may further have a substituent group. The substituent groups in that case include a halogen atom (e.g., chlorine, bromine), a straight or branched chain alkyl group having from 1 to 12 carbon atoms, an aralkyl group having from 7 to 18 carbon atoms, an alkenyl group having from 2 to 12 carbon atoms, a straight or branched chain alkynyl group having from 2 to 12 carbon atoms, a straight or branched chain cycloalkyl group having from 3 to 12 carbon atoms, a straight or branched chain cycloalkenyl group having from 3 to 12 carbon atoms (e.g., methyl, ethyl, propyl, isopropyl, t-butyl, 2-methanesulfonylethyl, 3-phenoxypropyl, trifluoromethyl, cyclopentyl), an aryl group (e.g., phenyl, 4-t-butylphenyl, 2,4-di-t-amylphenyl), a heterocyclic group (e.g., imidazolyl, pyrazolyl, triazolyl, 2-furyl, 2-thienyl, 2-pyrimidinyl, 2-benzothiazolyl), a cyano group, a hydroxyl group, a nitro group, a carboxyl group, an amino group, an alkyloxy group (e.g., methoxy, ethoxy, 2-methoxyethoxy, 2-methanesulfonylethoxy), an aryloxy group (e.g., phenoxy, 2-methylphenoxy, 4-t-butylphenoxy, 3-nitrophenoxy, 3-t-butyloxycarbamoylphenoxy, 3-methoxycarbamoyl), an acylamino group (e.g., acetoamido, benzamido, 4-(3-t-butyl-4-hydroxyphenoxy)butaneamido), an alkylamino group (e.g., methylamino, butylamino, diethylamino, methylbutylamino), an anilino group (e.g., phenylamino, 2-chloroanilino), a ureido group (e.g., phenylureido, methylureido, N,N-dibutylureido), a sulfamoylamino group (e.g., N,N-dipropylsulfamoylamino), an alkylthio group (e.g., methylthio, octylthio, 2-phenoxyethyltio), an arylthio group (e.g., phenylthio, 2-butoxy-5-t-octylphenylthio, 2-carboxyphenylthio), an alkyloxycarbonylamino group (e.g., methoxycarbonylamino), a sulfonamido group (e.g., methanesulfonamido, benzenesulfonamido, p-toluenesulfonamido, octadecane), a carbamoyl group (e.g., N-ethylcarbamoyl, N,N-dibutylcarbamoyl), a sulfamoyl group (e.g., N-ethylsulfamoyl, N,N-dipropylsulfamoyl, N,N-diethylsulfamoyl), a sulfonyl group (e.g., methanesulfonyl, octanesulfonyl, benzenesulfonyl, toluenesulfonyl), an alkyloxycarbonyl group (e.g., methoxycarbonyl, butyloxycarbonyl), a heterocyclic oxy group (e.g., 1-phenyltetrazole-5-oxy, 2-tetrahydropyranyloxy), an azo group (e.g., phenylazo, 4-methoxyphenylazo, 4-pivaloylaminophenylazo, 2-hydroxy-4-propanoylphenylazo, an acyloxy group (e.g., acetoxy), a carbamoyloxy group (e.g., N-methylcarbamoyloxy, N-phenylcarbamoyloxy), a silyloxy group (e.g., trimethylsilyloxy, dibutylmethylsilyloxy), an aryloxycarbonylamino group (e.g., phenoxycarbonylamino), an imido group (e.g., N-succinimido, N-phthalimido), a heterocyclic thio group (e.g., 2-benzothiazolylthio, 2,4-diphenoxy-1,3,5-triazole-6-thio, 2-pyridylthio), a sulfinyl group (e.g., 3-phenoxypropylsulfinyl), a phosphonyl group (e.g., phenoxyphosphonyl, octyloxyphosphonyl, phenylphosphonyl), an aryloxycarbonyl group (e.g., phenoxycarbonyl) and an acyl group (e.g., acetyl, 3-phenylpropanoyl, benzoyl).

Preferred examples of the groups represented by X include an acyl group having from 2 to 12 carbon atoms, an acyloxy group having from 2 to 12 carbon atoms, a carbamoyl group having from 1 to 12 carbon atoms, an alkyloxycarbonyl group having from 2 to 12 carbon atoms, an aryloxycarbonyl group having from 7 to 18 carbon atoms, a cyano group, a nitro group, an alkylsulfinyl group having from 1 to 12 carbon atoms, an arylsulfinyl group having from 6 to 18 carbon atoms, an alkylsulfonyl group having from 1 to 12 carbon atoms, an arylsulfonyl group having from 6 to 18 carbon atoms, a sulfamoyl group having from 0 to 12 carbon atoms, an alkyl halide group having from 1 to 12 carbon atoms, an alkyloxy halide group having from 1 to 12 carbon atoms, an alkylthio halide group having from 1 to 12 carbon atoms, an aryloxy halide group having from 7 to 18 carbon atoms, an aryl group having from 7 to 18 carbon atoms substituted by two or more electron attractive groups having a $\sigma_p$ constant of 0.20 or more, and a heterocyclic group having from 1 to 18 carbon atoms, and having a nitrogen atom, an oxygen atom or a sulfur atom.

X is more preferably an alkyloxycarbonyl group having from 2 to 12 carbon atoms, a nitro group, a cyano group, an alkylsulfonyl group having from 1 to 12 carbon atoms, an arylsulfonyl group having from 6 to 18 carbon atoms, a carbamoyl group having from 1 to 12 carbon atoms or an alkyl halide group having from 1 to 12 carbon atoms, particularly preferably a cyano group, alkylsulfonyl group having from 1 to 12 carbon atoms or an arylsulfonyl group having from 6 to 18 carbon atoms, and most preferably a cyano group.

In the above-mentioned formula (II), $R_1$ and $R_2$ each independently represents a substituted or unsubstituted alkyl, alkenyl, cycloalkyl or aralkyl group.

The alkyl groups represented by $R_1$ and $R_2$ include alkyl groups having substituent groups and unsubstituted alkyl groups. The alkyl groups are preferably alkyl groups each having from 1 to 12 carbon atoms, and more preferably alkyl groups each having from 1 to 6 carbon atoms. The substituent groups include a hydroxyl group, an alkoxyl group, an alkoxycarbonyl group, a cyano group and a halogen atom. Examples of the alkyl groups include methyl, ethyl, butyl, isopropyl, t-butyl, hydroxyethyl, methoxyethyl, cyanoethyl, trifluoromethyl, 3-sulfopropyl and 4-sulfobutyl.

The cycloalkyl groups represented by $R_1$ and $R_2$ include cycloalkyl groups having substituent groups and unsubstituted cycloalkyl groups. The cycloalkyl groups are preferably cycloalkyl groups each having from 5 to 12 carbon atoms. Examples of the cycloalkyl groups include cyclohexyl.

The aralkyl groups represented by $R_1$ and $R_2$ include aralkyl groups having substituent groups and unsubstituted aralkyl groups. The aralkyl groups are preferably aralkyl groups each having from 7 to 12 carbon atoms. Examples of the aralkyl groups include benzyl and 2-phenethyl.

The alkenyl groups represented by $R_1$ and $R_2$ include alkenyl groups having substituent groups and unsubstituted alkenyl groups. The alkenyl groups are preferably alkenyl groups each having from 5 to 12 carbon atoms. Examples of the alkenyl groups include vinyl and allyl.

$R_3$, $R_4$, $R_5$ and $R_6$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxyl group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group or an acyl group.

Above all, $R_3$, $R_4$, $R_5$ and $R_6$ are each preferably a hydrogen atom, a halogen atom, an alkyl group, an aryl group, a cyano group, an alkoxyl group, an amido group, a ureido group, an alkoxycarbonylamino group, a sulfonamido group, a carbamoyl group, a sulfamoyl group or an alkoxycarbonyl group, and more preferably a hydrogen atom, a halogen atom, an alkyl group, an alkoxyl group, an amido group, a ureido group, a sulfonamido group, a carbamoyl group or a sulfamoyl group.

The halogen atoms represented by $R_3$, $R_4$, $R_5$ and $R_6$ include fluorine, chlorine and bromine.

The alkyl groups represented by $R_3$, $R_4$, $R_5$ and $R_6$ include alkyl groups having substituent groups and unsubstituted alkyl groups. The alkyl groups are preferably alkyl groups each having from 1 to 12 carbon atoms. The substituent groups include a hydroxyl group, an alkoxyl group, a cyano group and a halogen atom. Examples of the alkyl groups include methyl, ethyl, butyl, isopropyl, t-butyl, hydroxyethyl, methoxyethyl, cyanoethyl, trifluoromethyl, 3-sulfopropyl and 4-sulfobutyl.

The cycloalkyl groups represented by $R_3$, $R_4$, $R_5$ and $R_6$ include cycloalkyl groups having substituent groups and unsubstituted cycloalkyl groups. The cycloalkyl groups are preferably cycloalkyl groups each having from 5 to 12 carbon atoms. Examples of the cycloalkyl groups include cyclohexyl.

The alkenyl groups represented by $R_3$, $R_4$, $R_5$ and $R_6$ include alkenyl groups having substituent groups and unsubstituted alkenyl groups. The alkenyl groups are preferably alkenyl groups each having from 5 to 12 carbon atoms. Examples of the alkenyl groups include vinyl and allyl.

The aralkyl groups represented by $R_3$, $R_4$, $R_5$ and $R_6$ include aralkyl groups having substituent groups and unsubstituted aralkyl groups. The aralkyl groups are preferably aralkyl groups each having from 7 to 12 carbon atoms. Examples of the aralkyl groups include benzyl and 2-phenethyl.

The aryl groups represented by $R_3$, $R_4$, $R_5$ and $R_6$ include aryl groups having substituent groups and unsubstituted aryl groups. The aryl groups are preferably aryl groups each having from 7 to 12 carbon atoms. Examples of the substituent groups include an alkyl group, an alkoxyl group, a halogen atom and an alkylamino group. Examples of the aryl groups include phenyl, p-tolyl, p-methoxyphenyl, o-chlorophenyl and m-(3-sulfo-propylamino)phenyl.

The heterocyclic groups represented by $R_3$, $R_4$, $R_5$ and $R_6$ include heterocyclic groups having substituent groups and unsubstituted heterocyclic groups. The heterocyclic groups are preferably 5- or 6-membered heterocyclic groups. Examples of the heterocyclic groups include 2-pyridyl, 2-thienyl and 2-furyl.

The alkylamino groups represented by $R_3$, $R_4$, $R_5$ and $R_6$ include alkylamino groups having substituent groups and unsubstituted alkylamino groups. The alkylamino groups are preferably alkylamino groups each having from 1 to 6 carbon atoms. Examples of the alkylamino groups include methylamino and diethylamino.

The alkoxyl groups represented by $R_3$, $R_4$, $R_5$ and $R_6$ include alkoxyl groups having substituent groups and unsubstituted alkoxyl groups. The alkoxyl groups are preferably alkoxyl groups each having from 1 to 12 carbon atoms. Examples of the alkoxyl groups include methoxy, ethoxy, isopropoxy, methoxyethoxy and 3-carboxypropoxy.

The aryloxy groups represented by $R_3$, $R_4$, $R_5$ and $R_6$ include aryloxy groups having substituent groups and unsubstituted aryloxy groups. The aryloxy groups are preferably aryloxy groups each having from 6 to 12 carbon atoms. Examples of the substituent groups include an alkoxyl group. Examples of the aryloxy groups include phenoxy, p-methoxyphenoxy and o-methoxyphenoxy.

The amido groups represented by $R_3$, $R_4$, $R_5$ and $R_6$ include amido groups having substituent groups and unsubstituted amido groups. The amido groups are preferably amido groups each having from 2 to 12 carbon atoms. Examples of the amido groups include acetamido, propionamido, benzamido and 3,5-disulfobenzamido.

The arylamino groups represented by $R_3$, $R_4$, $R_5$ and $R_6$ include arylamino groups having substituent groups and unsubstituted arylamino groups. The arylamino groups are preferably aryl amino groups each having from 6 to 12 carbon atoms. Examples of the substituent groups include a halogen atom. Examples of the arylamino groups include anilino and 2-chloroanilino.

The ureido groups represented by $R_3$, $R_4$, $R_5$ and $R_6$ include ureido groups having substituent groups and unsubstituted ureido groups. The ureido groups are preferably ureido groups each having from 1 to 12 carbon atoms. Examples of the substituent groups include an alkyl group and an aryl group. Examples of the ureido groups include 3-methylureido, 3,3-dimethylureido and 3-phenylureido.

The sulfamoylamino groups represented by $R_3$, $R_4$, $R_5$ and $R_6$ include sulfamoylamino groups having substituent groups and unsubstituted sulfamoylamino groups. Examples of the substituent groups include an alkyl group. Examples of the sulfamoylamino groups include N,N-dipropylsulfamoylamino.

The alkylthio groups represented by $R_3$, $R_4$, $R_5$ and $R_6$ include alkylthio groups having substituent groups and unsubstituted alkylthio groups. The alkylthio groups are preferably alkyl thio groups each having from 1 to 12 carbon atoms. Examples of the alkylthio groups include methylthio and ethylthio.

The arylthio groups represented by $R_3$, $R_4$, $R_5$ and $R_6$ include arylthio groups having substituent groups and unsubstituted arylthio groups. The arylthio groups are preferably arylthio groups each having from 6 to 12 carbon atoms. Examples of the substituent groups include an alkyl group. Examples of the arylthio groups include phenylthio and p-tolylthio.

The alkoxycarbonylamino groups represented by $R_3$, $R_4$, $R_5$ and $R_6$ include alkoxycarbonylamino groups having substituent groups and unsubstituted alkoxycarbonylamino groups. The alkoxycarbonylamino groups are preferably alkoxycarbonylamino groups each having from 2 to 12 carbon atoms. Examples of the alkoxycarbonylamino groups include ethoxycarbonylamino.

The sulfonamido groups represented by $R_3$, $R_4$, $R_5$ and $R_6$ include sulfonamido groups having substituent groups and unsubstituted sulfonamido groups. The sulfonamido groups are preferably sulfonamido groups each having from 1 to 12 carbon atoms. Examples of the sulfonamido groups include methanesulfonamido, benzenesulfonamido and 3-carboxybenzenesulfonamido.

The carbamoyl groups represented by $R_3$, $R_4$, $R_5$ and $R_6$ include carbamoyl groups having substituent groups and unsubstituted carbamoyl groups. Examples of the substituent groups include an alkyl group. Examples of the carbamoyl groups include methylcarbamoyl and dimethylcarbamoyl.

The sulfamoyl groups represented by $R_3$, $R_4$, $R_5$ and $R_6$ include sulfamoyl groups having substituent groups and unsubstituted sulfamoyl groups. Examples of the substituent groups include an alkyl group. Examples of the sulfamoyl groups include dimethylsulfamoyl and di-(2-hydroxyethyl)sulfamoyl.

The sulfonyl groups represented by $R_3$, $R_4$, $R_5$ and $R_6$ include methanesulfonyl and phenylsulfonyl.

The alkoxycarbonyl groups represented by $R_3$, $R_4$, $R_5$ and $R_6$ include alkoxycarbonyl groups having substituent groups and unsubstituted alkoxycarbonyl groups. The alkoxycarbonyl groups are preferably alkoxycarbonyl groups each having from 2 to 12 carbon atoms. Examples of the alkoxycarbonyl groups include methoxycarbonyl and ethoxycarbonyl.

The heterocyclic oxy groups represented by $R_3$, $R_4$, $R_5$ and $R_6$ include heterocyclic oxy groups having substituent groups and unsubstituted heterocyclic oxy groups. The heterocyclic oxy groups are preferably heterocyclic oxy groups each having a 5- or 6-membered heterocycle. Examples of the substituent groups include a hydroxyl group. Examples of the heterocyclic oxy groups include 2-tetrahydropyranyloxy.

The azo groups represented by $R_3$, $R_4$, $R_5$ and $R_6$ include azo groups having substituent groups and unsubstituted azo groups. Examples of the azo groups include p-nitrophenylazo.

The acyloxy groups represented by $R_3$, $R_4$, $R_5$ and $R_6$ include acyloxy groups having substituent groups and unsubstituted acyloxy groups. The acyloxy groups are preferably acyloxy groups each having from 1 to 12 carbon atoms. Examples of the acyloxy groups include acetoxy and benzoyloxy.

The carbamoyloxy groups represented by $R_3$, $R_4$, $R_5$ and $R_6$ include carbamoyloxy groups having substituent groups and unsubstituted carbamoyloxy groups. Examples of the substituent groups include an alkyl group. Examples of the carbamoyloxy groups include N-methylcarbamoyloxy.

The silyloxy groups represented by $R_3$, $R_4$, $R_5$ and $R_6$ include silyloxy groups having substituent groups and unsubstituted silyloxy groups. Examples of the substituent groups include an alkyl group. Examples of the silyloxy groups include trimethylsilyloxy.

The aryloxycarbonyl groups represented by $R_3$, $R_4$, $R_5$ and $R_6$ include aryloxycarbonyl groups having substituent groups and unsubstituted aryloxycarbonyl groups. The aryloxycarbonyl groups are preferably aryloxycarbonyl groups each having from 7 to 12 carbon atoms. Examples of the aryloxycarbonyl groups include phenoxycarbonyl.

The aryloxycarbonylamino groups represented by $R_3$, $R_4$, $R_5$ and $R_6$ include aryloxycarbonylamino groups having substituent groups and unsubstituted aryloxycarbonylamino groups. The aryloxycarbonylamino groups are preferably aryloxycarbonylamino groups each having from 7 to 12 carbon atoms. Examples of the aryloxycarbonylamino groups include phenoxycarbonylamino.

The imido groups represented by $R_3$, $R_4$, $R_5$ and $R_6$ include imido groups having substituent groups and unsubstituted imido groups. Examples of the imido groups include N-phthalimido and N-succinimido.

The heterocyclic thio groups represented by $R_3$, $R_4$, $R_5$ and $R_6$ include heterocyclic thio groups having substituent groups and unsubstituted heterocyclic thio groups. It is preferred that the heterocyclic thio groups have 5- or 6-membered heterocycles. Examples of the heterocyclic thio groups include 2-pyridylthio.

The sulfinyl groups represented by $R_3$, $R_4$, $R_5$ and $R_6$ include sulfinyl groups having substituent groups and unsubstituted sulfinyl groups. Examples of the sulfinyl groups include phenylsulfinyl.

The phosphoryl groups represented by $R_3$, $R_4$, $R_5$ and $R_6$ include phosphoryl groups having substituent groups and unsubstituted phosphoryl groups. Examples of the phosphoryl groups include phenoxyphosphoryl and phenylphosphoryl.

The acyl groups represented by $R_3$, $R_4$, $R_5$ and $R_6$ include acyl groups having substituent groups and unsubstituted acyl groups. The acyl groups are preferably acyl groups each having from 1 to 12 carbon atoms. Examples of the acyl groups include acetyl and benzoyl.

In the above-mentioned formula (II), $R_1$ and $R_2$, $R_3$ and $R_1$, or $R_2$ and $R_5$ may combine with each other to form a ring. Preferred examples of the rings formed are shown below:

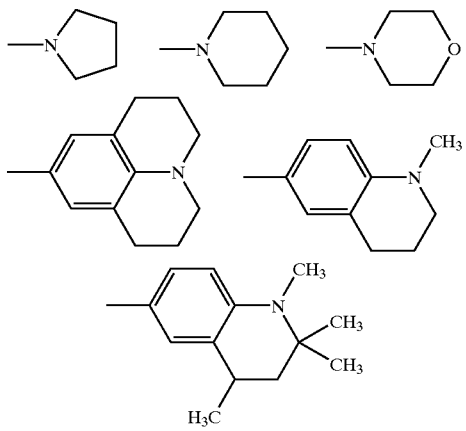

In the above-mentioned formula (II), Y represents a secondary or tertiary alkyl group, or a substituted or unsubstituted aryl group. Y is preferably a secondary or tertiary alkyl group, and more preferably a tertiary alkyl group. Specific examples thereof include an isopropyl group, a t-butyl group and an aryl group. These substituent groups may further have substituent groups, which include a hydroxyl group, an alkoxyl group, a cyano group, and a halogen atom.

In the above-mentioned formula (II), Are presents a group composed of a non-metallic atomic group necessary for forming a 5- to 8-membered ring. The ring may be substituted, may be a saturated ring, or may have an unsaturated bond. Preferred examples of the non-metallic atoms include a nitrogen atom, an oxygen atom, a sulfur atom and a carbon atom.

The groups represented by A include, for example, a benzene ring, a cyclopentane ring, a cyclohexane ring, a cycloheptane ring, a cyclooctane ring, a cyclohexene ring, a pyridine ring, a piperazine ring, an oxane ring and a thiane ring. When these rings further have substituent groups, the substituent groups include the groups illustrated for the above-mentioned substituent groups $R_3$, $R_4$, $R_5$ and $R_6$.

A is preferably a group represented by any one of the following formulae (2-1) to (2-9):

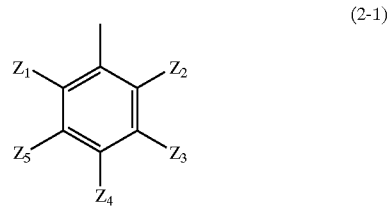
(2-1)

(2-2)

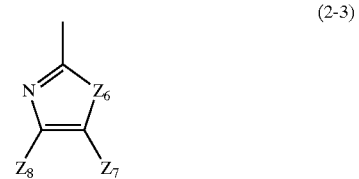
(2-3)

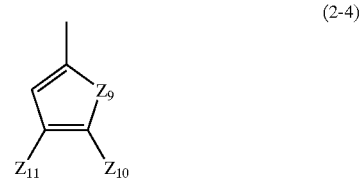
(2-4)

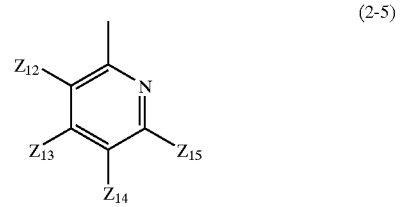
(2-5)

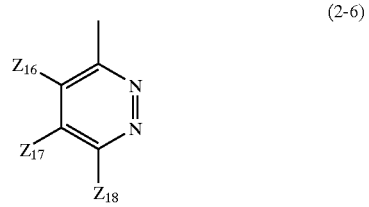
(2-6)

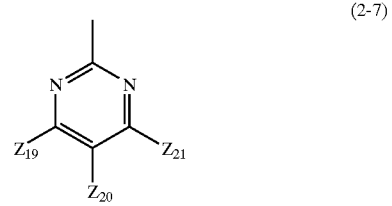
(2-7)

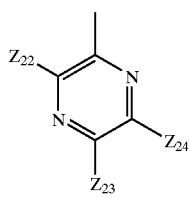

(2-8)

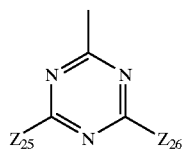

(2-9)

In the above-mentioned formula (2-1), $Z_1$ and $Z_2$ each independently represents a halogen atom, an alkyl group, a cycloalkyl group, an aralkyl group, an alkenyl group, an aryl group, a heterocyclic group, a cyano group, a hydroxyl group, a nitro group, an amino group, an alkylamino group, an alkoxyl group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group or an acyl group.

In the above-mentioned formulae, $Z_3$, $Z_4$, $Z_5$, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$ and $Z_{26}$ each independently represents a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxyl group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group or an acyl group.

In the above-mentioned formulae (2-3) and (2-4), $Z_6$ and $Z_9$ each independently represents N—R, an oxygen atom or a sulfur atom, wherein R has the same meaning as given for $Z_3$, $Z_4$ and $Z_5$.

Specific examples of the respective groups represented by $Z_1$, $Z_2$, $Z_3$, $Z_4$ and $Z_5$ in the above-mentioned formula (2-1) include the specific examples of the respective groups illustrated as the groups represented by substituent groups $R_3$, $R_4$, $R_5$ and $R_6$ in the above-mentioned formula (II).

In the above-mentioned formula (2-1), $Z_1$ and $Z_2$ are each preferably a halogen atom, an alkyl group, an aryl group, a cyano group, a nitro group, an alkoxyl group, an amido group, a ureido group, a sulfamoylamino group, an alkoxycarbonylamino group, a sulfonamido group, a carbamoyl group, a sulfamoyl group, a sulfonyl group, an alkoxycarbonyl group, an acyloxy group, a carbamoyloxy group, an imido group, a sulfinyl group, a phosphoryl group or an acyl group.

In the above-mentioned formula (2-1), $Z_3$, $Z_4$ and $Z_5$ are each preferably a hydrogen atom, a halogen atom, an alkyl group, an aryl group, a cyano group, a nitro group, an alkoxyl group, an amido group, a ureido group, a sulfamoylamino group, an alkoxycarbonylamino group, a sulfonamido group, a carbamoyl group, a sulfamoyl group, a sulfonyl group, an alkoxycarbonyl group, an acyloxy group, a carbamoyloxy group, an imido group, a sulfinyl group, a phosphoryl group or an acyl group.

Further, it is preferred that at least two of $Z_1$, $Z_2$, $Z_3$, $Z_4$ and $Z_5$ are substituted by substituent groups the total $\sigma_p$ constant of which is 0.4 or more in the above-mentioned formula (2-1).

In the above-mentioned formula (2-1), it is more preferred that $Z_1$ and $Z_2$ are each independently a halogen atom, a cyano group, a nitro group, an alkoxyl group, an amido group, a ureido group, a sulfamoylamino group, an alkoxycarbonylamino group, a sulfonamido group or a sulfonyl group, and $Z_3$, $Z_4$ and $Z_5$ are each independently a hydrogen atom, a halogen atom, a cyano group, a nitro group, an alkoxyl group, an amido group, a ureido group, a sulfamoylamino group, an alkoxycarbonylamino group, a sulfonamido group or a sulfonyl group. Furthermore, it is most preferred that at least two of $Z_1$, $Z_2$, $Z_3$, $Z_4$ and $Z_5$ are substituted by substituent groups the total $\sigma_p$ constant of which is 0.4 or more.

In the above-mentioned formulae (2-3) to (2-9), specific examples of the respective groups represented by $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_1$, $Z_{19}$, $Z_{20}$, $Z_{21}$, $Z_{22}$, $Z_{23}$, $Z_{24}$, $Z_{25}$ and $Z_{26}$ include the specific examples of the respective groups illustrated as the groups represented by substituent groups $R_3$, $R_4$, $R_5$ and $R_6$ in the above-mentioned formula (II). Above all, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$ and $Z_{26}$ are each preferably a hydrogen atom, a halogen atom, an alkyl group, a cyano group, a nitro group, an alkoxyl group, an amido group, a ureido group, a sulfamoylamino group, an alkoxycarbonylamino group, a sulfonamido group, a carbamoyl group, a sulfamoyl group, a sulfonyl group, an alkoxycarbonyl group, an acyloxy group, a carbamoyloxy group, an imido group, a sulfinyl group, a phosphoryl group or an acyl group.

Further, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$ and $Z_{26}$ are each more preferably a hydrogen atom, a halogen atom, a cyano group, a nitro group, an alkoxyl group, an amido group, a ureido group, a sulfamoylamino group, an alkoxycarbonylamino group, a sulfonamido group or a sulfonyl group.

Preferred examples of the oil-soluble dyes represented by the above-mentioned formula (II) include oil-soluble dyes represented by any one of the following formulae (7-1) to (7-9). Respective groups in the following formulae (7-1) to (7-9) have the same meanings as given for the respective groups in the above-mentioned formula (II) and formulae (2-1) to (2-9).

(7-1) 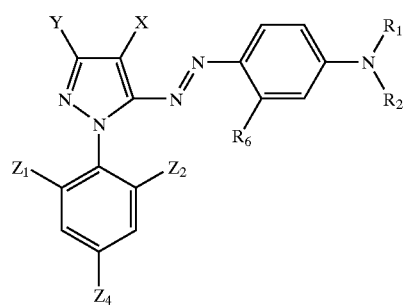

(7-2) 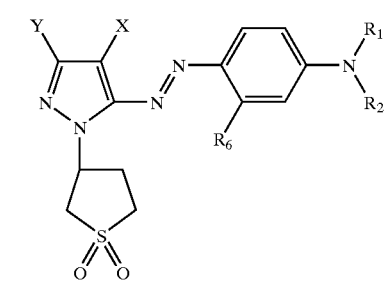

(7-3) 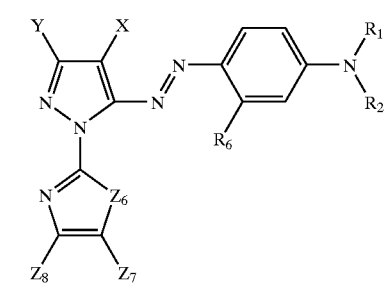

(7-4) 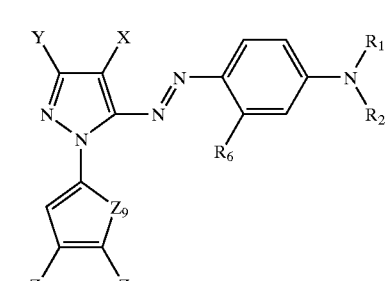

(7-5) 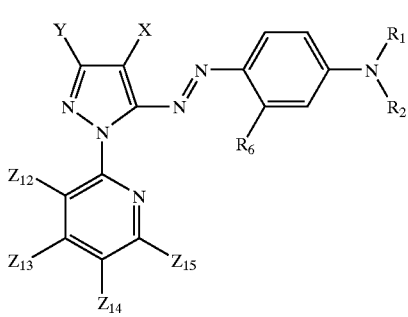

-continued (7-6) 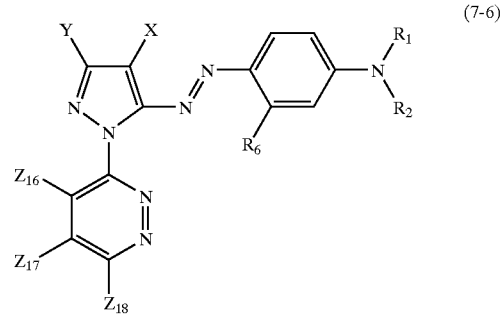

(7-7) 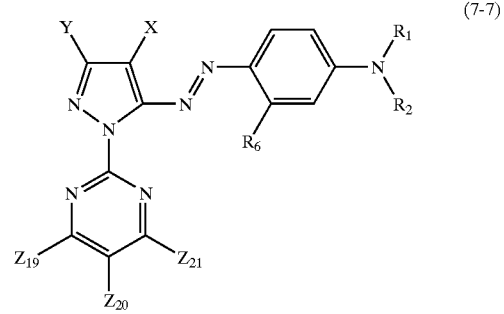

(7-8) 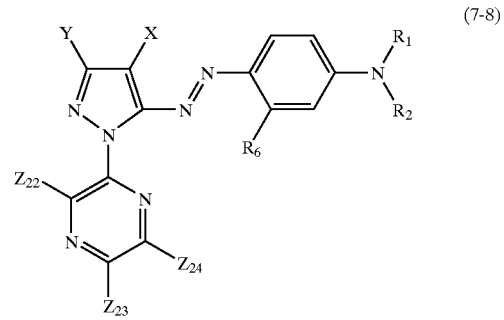

(7-9) 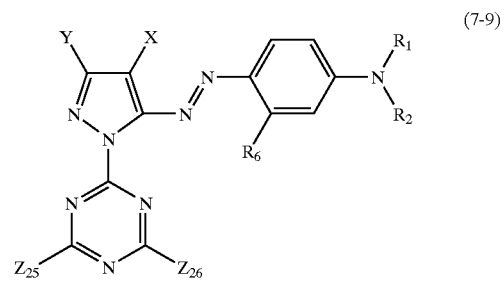

As to the most preferred combinations of respective substituent groups in the oil-soluble dyes represented by the above-mentioned formula (7-1), X is a cyano group, an alkylsulfonyl group having from 1 to 12 carbon atoms or an arylsulfonyl group having from 6 to 18 carbon atoms, and most preferably a cyano group; Y is a secondary or tertiary alkyl group or an aryl group, and most preferably a t-butyl group; $R_1$ and $R_2$ are each independently an alkyl group; $R_6$ is an amido group, a ureido group, a sulfamoylamino group, an alkoxycarbonylamino group or a sulfonamido group, and most preferably an amido group, a ureido group or sulfonamido group; $Z_1$ and $Z_2$ are each independently a halogen atom or an alkyl group, and $Z_4$ is a hydrogen atom, a halogen atom, an amido group, a sulfonamido group, a carbamoyl group, a sulfamoyl group or an alkoxycarbonyl group, and most preferably an amido group.

Specific examples (example compounds 1-1 to 1-21) of the oil-soluble dyes represented by the above-mentioned formula (II) are shown below, but it is understood that the invention is not limited thereto.

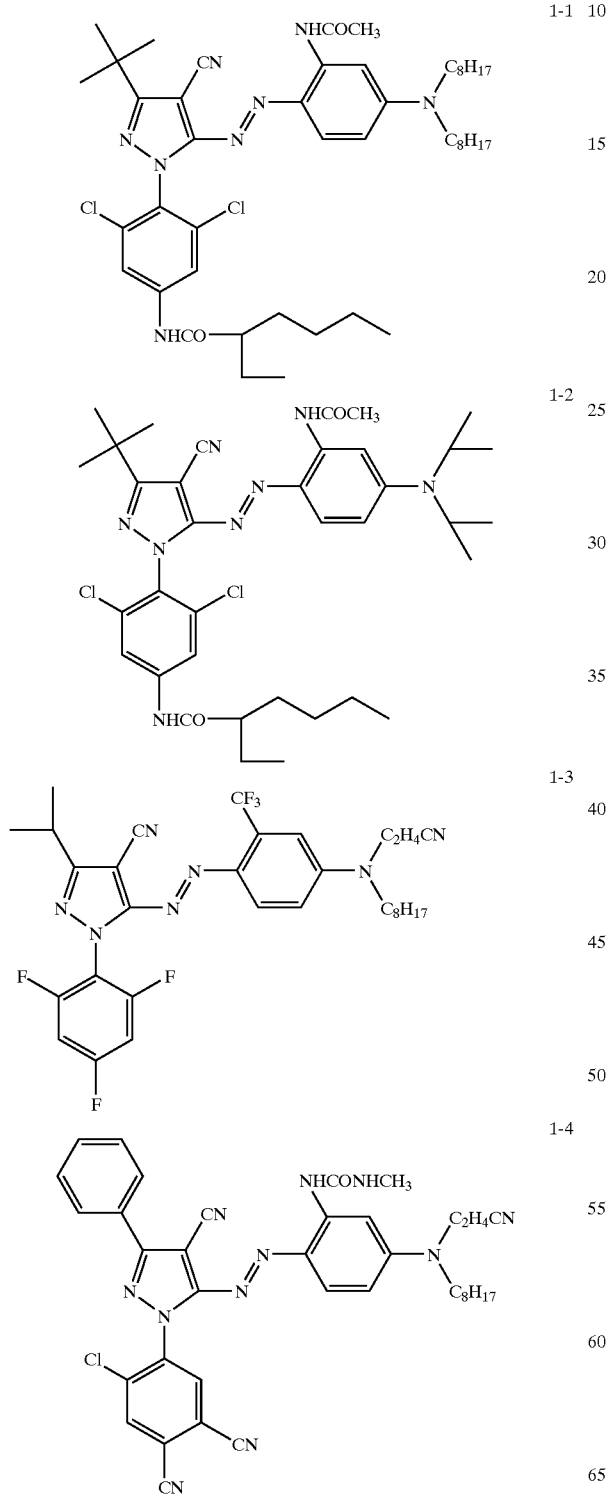
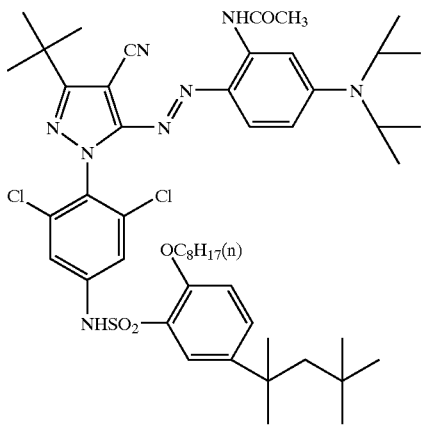
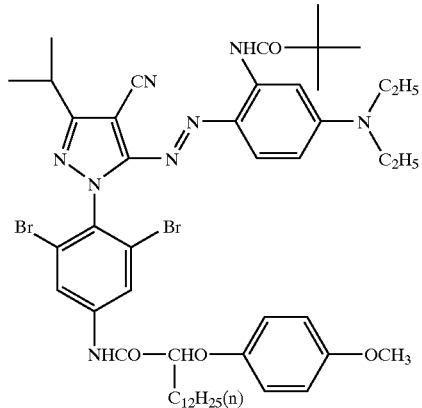
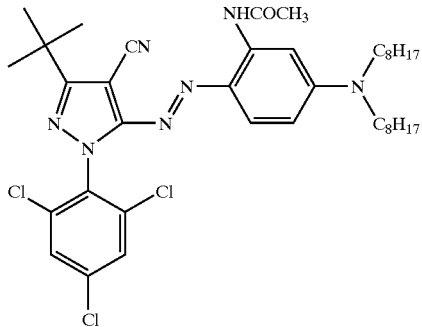
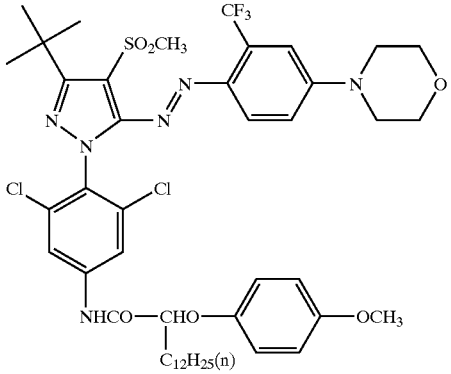

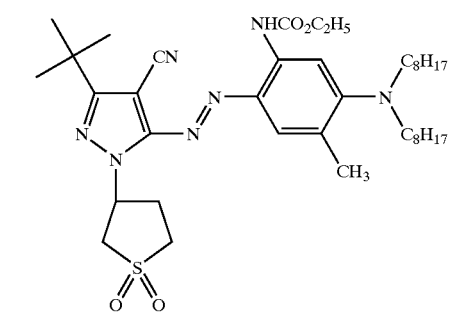
1-9
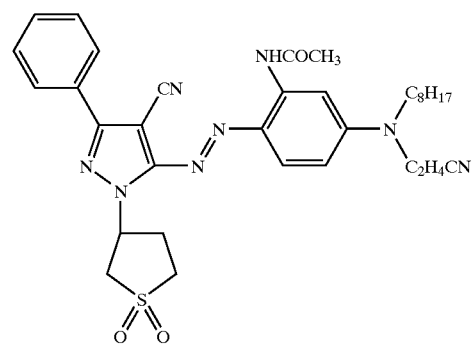
1-10
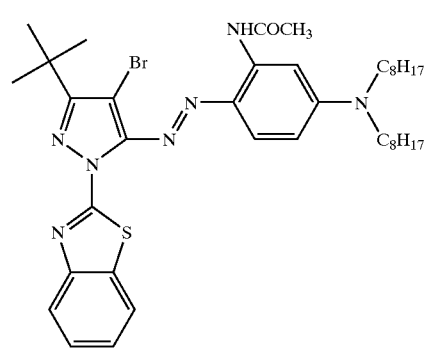
1-11
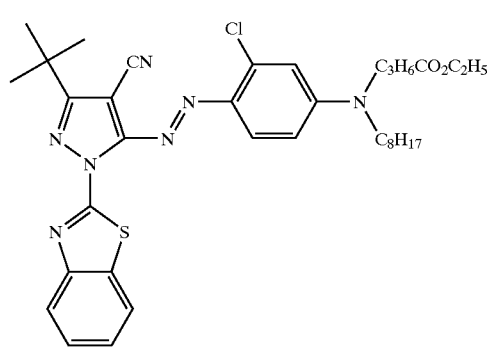
1-12
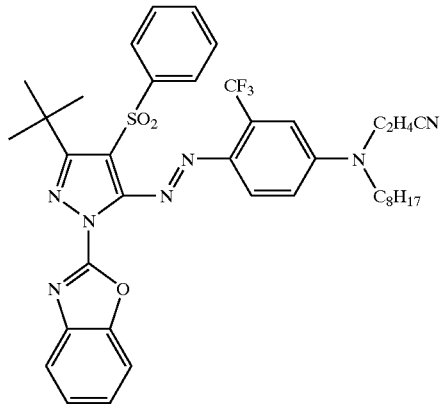
1-13
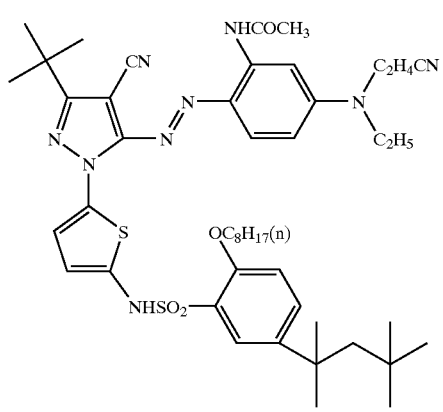
1-14
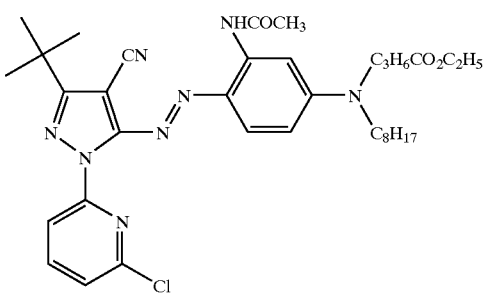
1-15
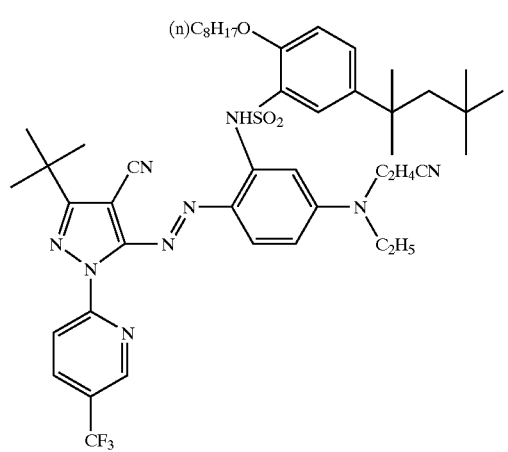
1-16

1-17
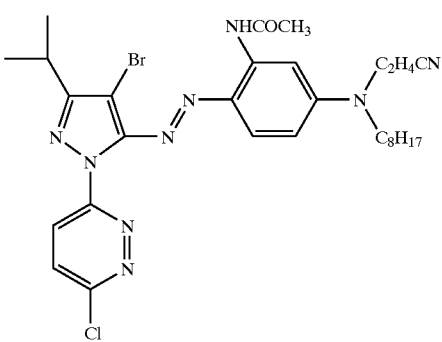

1-18
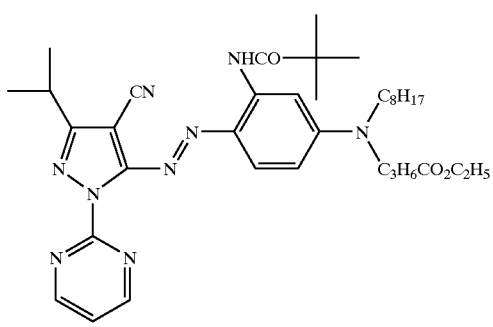

1-19
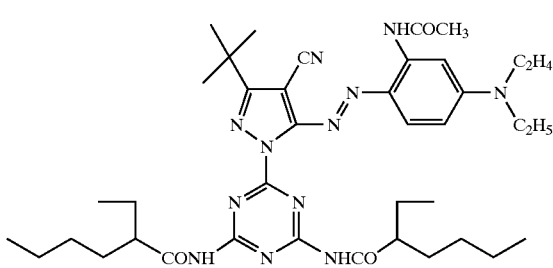

1-20
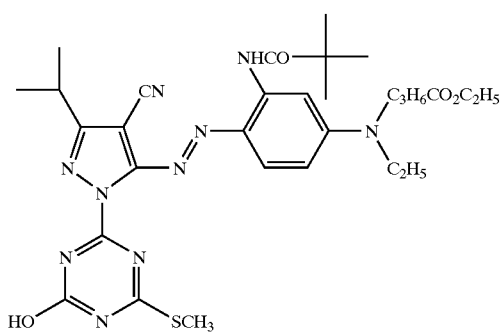

1-21
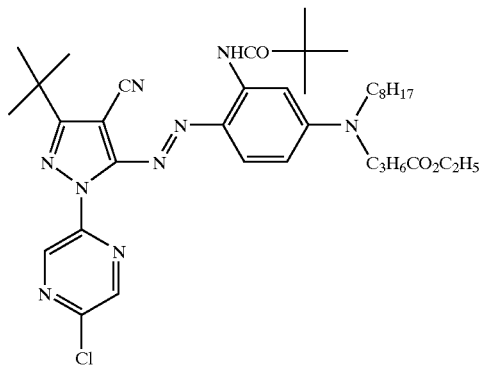

Methods for producing the oil-soluble dyes represented by formula (II) will be described in detail below.

The method for producing the oil-soluble dye represented by formula (II) comprises the steps of (a) reacting an aminopyrazole represented by formula (3) with a diazotizing agent to form a diazonium salt, (b) reacting the diazonium salt with an aromatic coupling agent represented by formula (4) to form an oil-soluble dye represented by formula (5), and (c) reacting the oil-soluble dye represented by formula (5) with an arylating agent or a heterylating agent in the presence of a base to form an oil-soluble dye represented by formula (6).

After the above-mentioned step (c), the step of introducing a substituent group into A' using an appropriate reagent can be further added.

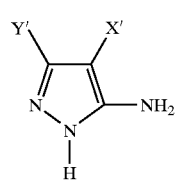
(3)

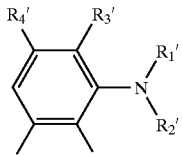
(4)

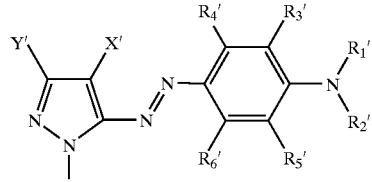
(5)

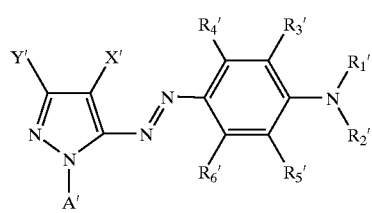
(6)

wherein X', Y', $R_1'$, $R_2'$, $Z_3'$, $Z_4'''$, $Z_5'$, $R_6'$ and A' have the same meanings as given for X, Y, $R_1$, $R_2$, $Z_3$, $Z_4$, $Z_5$, $R_6$ and A in the above-mentioned formula (II).

A pyrazoleazo dye (for example, a 1-aryl- or heteryl-3-secondary or tertiary alkyl-4-cyano-pyrazole-5-ylazo dye or a 1-aryl- or heteryl-3-aryl-4-cyano-pyrazole-5-ylazo dye) can be synthesized at high purity in a high yield by carrying out the above-mentioned steps (a) to (c). For example, when a pyrazolylazo dye in which a secondary or tertiary alkyl or aryl group does not exist at the 3-position (for example, a 4-cyanopyrazolylazo dye) is alkylated without carrying out the above-mentioned steps (a) to (c), a mixture of a pyrazole-3-ylazo dye and a pyrazole-5-ylazo dye is formed. The pyrazole-3-ylazo dye has a hue different from that of the desired pyrazole-5-ylazo dye (absorbs light having lower wavelengths, so that it is necessary for obtaining the desired hue to separate both from each other. However, the separation is difficult. Nevertheless, the production of the pyrazoleazo dye through the above-mentioned steps (a) to (c)

results in no production of the pyrazole-3-ylazo dye, which does not cause the above-mentioned adverse effect. Further, the synthesis of the pyrazoleazo dye (for example, a 1,3-dialkyl- or 1-alkyl-3-aryl-4-cyano-pyrazole-5-ylazo dye) by direct diazotization and coupling of a corresponding aminopyrazole (for example, 1-alkyl-3-aryl-4-cyano-5-aminopyrazole) results in an impracticably low yield. Moreover, an alkylhydrazine necessary for the synthesis of the aminopyrazole (for example, 1-alkyl-4-cyano-5-aminopyrazole) which is the raw material is limited in its structure, and the synthesis thereof is difficult in many cases. According to the above-mentioned producing method, the above-mentioned raw material is unnecessary, and the azo dye can be produced stably and in a high yield.

As the diazotizing agent used in the above-mentioned step (a), an aqueous diluted hydrochloric acid solution of sodium nitrite is preferred. Further, isopentyl nitrite or nitrosyl sulfate in trifluoroacetic acid can also be used as the above-mentioned diazotizing agent.

As the aromatic coupling agent used in the above-mentioned step (b), a 3-acetamido-N,N-dialkylaniline is preferred.

The arylating agents or the heterylating agents used in the above-mentioned step (c) include compounds represented by the following formulae (8-1) to (8-9):

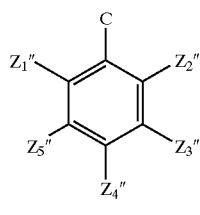
(8-1)

(8-2)

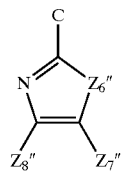
(8-3)

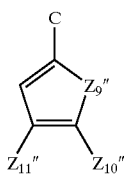
(8-4)

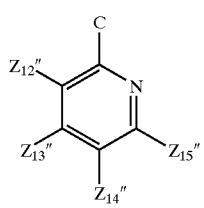
(8-5)

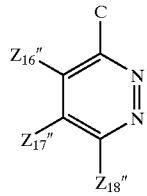
(8-6)

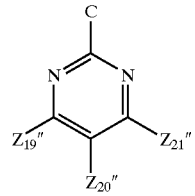
(8-7)

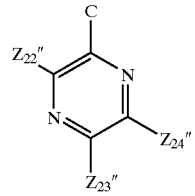
(8-8)

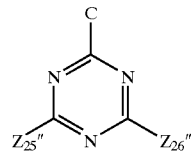
(8-9)

In the above-mentioned formulae (8-1) to (8-9), $Z_1''$ to $Z_{26}''$ have the same meanings as given for $Z_1$ to $Z_{26}$ in the above-mentioned formulae (2-1) to (2-9). It is preferred that $Z_1''$ to $Z_5''$ are substituted by substituent groups the total Hammett constant $\sigma_p$ of which is 0.15 or more, or that $Z_4''$ is a nitro group. C represents a halogen atom or —OSO$_2$R'. R' represents an alkyl group or an aryl group such as phenyl.

The bases used in the above-mentioned step (c) include organic bases such as tetrabutylammonium hydroxide and diisopropylethylamine, and inorganic bases such as potassium carbonate, sodium carbonate, sodium hydrogen carbonate, potassium hydrogen carbonate, sodium hydroxide and potassium hydroxide.

Examples of reaction schemes used in the above-mentioned producing method are shown below:

[KA 34]

Step (a)

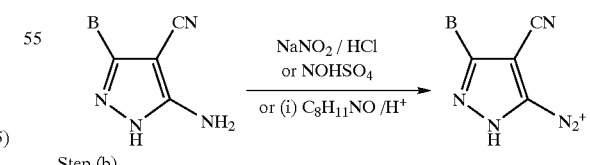

Step (b)

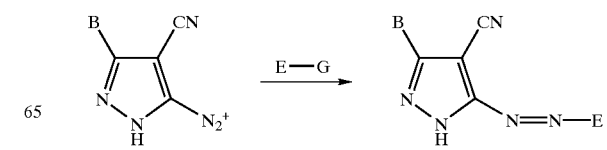

Step (c)

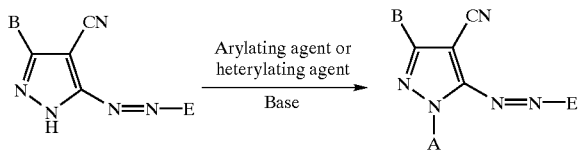

In the above-mentioned schemes, B represents t-butyl, isopropyl or phenyl; E represents substituted aminophenyl, tetrahydroquinolyl or julolidinyl; and G represents hydrogen substitutable by a diazonium salt.

The compound represented by formula (3) (particularly, a secondary or tertiary alkyl-4-cyano-5-aminopyrazole or 3-aryl-4-cyano-5-aminopyrazole, in the above-mentioned reaction scheme), a starting material used in the above-mentioned producing method, can be synthesized by methods described in U.S. Pat. No. 3,336,285, Heterocycles, 20, 519 (1983) and JP-B-6-19036.

The above-mentioned example compounds 1-1 to 1-21 can be produced by the above-mentioned producing method.

It is preferred that the oil-soluble dye is contained in an amount of 0.2 to 20 parts by weight per 100 parts by weight of ink composition for ink jet recording of the invention. In the ink composition for ink jet recording of the invention, at least one additional dye may be used in combination with the oil-soluble dye for adjusting hues for obtaining full color images. Examples of the dyes which can be used together include the following.

As applicable yellow dyes, any ones can be used. Examples thereof include aryl or heteryl azo dyes having phenols, naphthols, anilines, pyrazolone compounds, pyridone compounds or open-chain active methylene compounds as coupling components; azomethine dyes having open-chain active methylene compounds as coupling components; methine dyes such as benzylidene dyes and monomethineoxonol dyes; and quinone dyes such as naphthoquinone dyes and anthraquinone dyes, and the other dye species include quinophthalone dyes, nitro-nitroso dyes, acridine dyes and acridinone dyes.

As applicable magenta dyes, any ones can be used. Examples thereof include aryl or heteryl azo dyes having phenols, naphthols or anilines as coupling components; azomethine dyes having pyrazolone compounds or pyrazolotriazole compounds as coupling components; methine dyes such as arylidene dyes, styryl dyes, merocyanine dyes and oxonol dyes; carbonium dyes such as diphenylmethane dyes, triphenylmethane dyes and xanthene dyes; quinone dyes such as naphthoquinone dyes, anthraquinone dyes and anthrapyridone dyes; and condensation polycyclic dyes such as dioxazine dyes.

As applicable cyan dyes, any ones can be used. Examples thereof include azomethine dyes such as indoaniline dyes, indophenol dyes and dyes having pyrrolotriazoles as coupling components; polymethine dyes such as cyanine dyes, oxonol dyes and merocyanine dyes; carbonium dyes such as diphenylmethane dyes, triphenylmethane dyes and xanthene dyes; phthalocyanine dyes; anthraquinone dyes; aryl or heteryl azo dyes having phenols, naphthols or anilines as coupling components; and indigo-thio indigo dyes.

The above-mentioned respective dyes may be ones which do not turn yellow, magenta and cyan, respectively, until parts of chromophores dissociate. In that case, counter cations may be inorganic cations such as alkali metal ions and ammonium ions, or organic cations such as pyridinium ions and quaternary ammonium salt ions, or polymer cations having them as partial structures.

Dyes formed by reaction of the following yellow, magenta or cyan couplers with oxidized products of aromatic primary amine developing agents are preferably used.

Yellow couplers: Couplers described in U.S. Pat. Nos. 3,933,501, 4,022,620, 4,326,024, 4,401,752 and 4,248,961, JP-B-58-10739, British Patents 1,425,020 and 1,476,760, U.S. Pat. Nos. 3,973,968, 4,314,023 and 4,511, 649, and EP-A-249,473, couplers represented by formulae (I) and (II) of EP-A-502,424, couplers represented by formulae (1) and (2) of EP-A-513,496 (particularly, Y-28 on page 18), couplers represented by formula (I) of claim 1 of EP-A-568,037, couplers represented by formula (I) in lines 45 to 55 in column 1 of U.S. Pat. No. 5,066,576, couplers represented by formula (I) in paragraph 0008 of JP-A-4-274425, couplers described in claim 1 on page 40 of EP-A-498,381 (particularly, D-35 on page 18), couplers represented by formula (Y) on page 4 of EP-A-447,969 (particularly, Y-1 on page 17 and Y-54 on page 41), and couplers represented by formulae (II) to (IV) in lines 36 to 58 in column 7 of U.S. Pat. No. 4,476,219 (particularly, II-17 and II-9 in column 17, and II-24 in column 19).

Magenta couplers: Couplers described in U.S. Pat. Nos. 4,310,619 and 4,351,897, European Patent 73,636, U.S. Pat. Nos. 3,061,432 and 3,725,067, Research Disclosure, No. 24220 (June, 1984), ibid., No. 24230 (June, 1984), JP-A-60-33552, JP-A-60-43659, JP-A-61-72238, JP-A-60-35730, JP-A-55-118034, JP-A-60-185951, U.S. Pat. Nos. 4,500, 630, 4,540,654 and 4,556,630, WO88/04795, JP-A-3-39737 (L-57 (page 11, lower right), L-68 (page 12, lower right), L-77 (page 13, lower right)), [A-4]-63 (page 143) and [A-4]-73 and-75 (page 139) of European Patent 456,257, M-4 and M-6 (page 26) and M-7 (page 27) of European Patent 486,965, M-45 (page 19) of EP-A-571,959, M-1 (page 6) of JP-A-5-204106, M-22 in paragraph 0237 of JP-A-4-362631, U.S. Pat. Nos. 3,061,432 and 3,725,067.

Cyan couplers: Couplers described in U.S. Pat. Nos. 4,052,212, 4,146,396, 4,228,233 and 4,296,200, European Patent 73,636, CX-1, -3, -4, -5, -11, -12, -14 and -15 (pages 14 to 16) of JP-A-4-204843, C-7 and -10 (page 35), -34 and -35 (page 37), and I-1 and I-17 (pages 42 and 43) of JP-A-4-43345, and couplers represented by formula (Ia) or (Ib) in claim 1 of JP-A-6-67385.

The high boiling organic solvents used in the invention include phthalates (for example, dibutyl phthalate, dioctyl phthalate, dicyclohexyl phthalate, di-2-ethylhexyl phthalate, decyl phthalate, bis (2,4-di-tert-amylphenyl) isophthalate and bis (1,1-diethylpropyl) phthalate), phosphates or phosphonates (for example, diphenyl phosphate, triphenyl phosphate, tricresyl phosphate, 2-ethylhexyldiphenyl phosphate, dioctylbutyl phosphate, tricyclohexyl phosphate, tri-2-ethylhexyl phosphate, tridodecyl phosphate and di-2-ethylhexylphenyl phosphate), benzoates (for example, 2-ethylhexyl benzoate, 2,4-dichlorobenzoate, dodecyl benzoate and 2-ethylhexyl p-hydroxybenzoate), amides (for example, N,N-diethyldodecaneamide and N,N-diethyllaurylamide), alcohols (for example, isostearyl alcohol), aliphatic esters (for example, dibutoxyethyl succinate, di-2-ethylhexyl succinate, 2-hexyldecyl tetradecanoate, tributyl citrate, diethyl azelate, isostearyl lactate and trioctyl citrate), aniline derivatives (for example, N,N-dibutyl-2-butoxy-5-tert-octylaniline), chlorinated paraffins (for example, paraffins having a chlorine content of 10% to 80%), trimesates (for example, tributyl trimesate), dodecylbenzene, diisopropylnaphthalene, phenols (for example, 2,4-di-tert-amylphenol, 4-dodecyloxyphenol, 4-dodecyloxycarbonylphenol and 4-(4-dodecyloxyphenylsulfonyl)phenol), carboxylic acids (for example, 2-(2,4-di-tert-amylphenoxybutyric acid and 2-ethoxyoctanedecanoic acid), and alkylphosphoric acids (for example, di-(2-ethylhexyl)phosphoric acid and diphenyl-phosphoric acid). Further, organic solvents having a boiling point of about 15° C. to about 30° C. (for example, ethyl acetate, butyl acetate, ethyl propionate, methyl ethyl ketone cyclohexanone, 2-ethoxyethyl acetate and dimethylformamide) may be used together as co-solvents.

The boiling point of the high boiling organic solvents used in the invention is preferably 150° C. or more, and more preferably 170° C. or more.

These high boiling organic solvents may be used either alone, or as a mixture of several kinds of them (for example, tricresyl phosphate and dibutyl phthalate, trioctyl phosphate and di(2-ethylhexyl) sebacate, and dibutyl phthalate and poly(N-t-butylacrylamide)).

Compound examples of the high boiling organic solvents other than the above, which are used in the invention, and/or methods for synthesizing these high boiling organic solvents are described, for example, in U.S. Pat. Nos. 2,322,027, 2,533,514, 2,772,163, 2,835,579, 3,594,171, 3,676,137, 3,689,271, 3,700,454, 3,748,141, 3,764,336, 3,765,897, 3,912,515, 3,936,303, 4,004,928, 4,080,209, 4,127,413, 4,193,802, 4,027,393, 4,220,711, 4,239,851, 4,278,757, 4,353,979, 4,363,873, 4,430,421, 4,430,422, 4,464,464, 4,483,918, 4,540,657, 4,684,606, 4,728,599, 4,745,049, 4,935,321 and 5,013,639, EP-A-276,319, EP-A-286,253, EP-A-289,820, EP-A-309,158, EP-A-309,159, EP-A-309,160, EP-A-509,311, EP-A-510,576, East German Patents 147,009, 157,147, 159,573 and 225,240A, British Patent 2,091,124A, JP-A-48-47335, JP-A-50-26530, JP-A-51-25133, JP-A-51-26036, JP-A-51-27921, JP-A-51-27922, JP-A-51-149028, JP-A-52-46816, JP-A-53-1520, JP-A-53-1521, JP-A-53-15127, JP-A-53-146622, JP-A-54-91325, JP-A-54-106228, JP-A-54-118246, JP-A-55-59464, JP-A-56-64333, JP-A-56-81836, JP-A-59-204041, JP-A-61-84641, JP-A-62-118345, JP-A-62-247364, JP-A-63-167357, JP-A-63-214744, JP-A-63-301941, JP-A-64-9452, JP-A-64-9454, JP-A-64-68745, JP-A-1-101543, JP-A-1-102454, JP-A-2-792, JP-A-2-4239, JP-A-2-43541, JP-A-4-29237, JP-A-4-30165, JP-A-4-232946 and JP-A-4-346338.

The above-mentioned organic solvent is used preferably in a 0.01-fold to 20-fold amount by weight, and more preferably in a 0.05-fold to 5-fold amount by weight, based on the oil-soluble dye.

The low boiling organic solvents used in the invention are organic solvents having a boiling point of about 30° C. to about 150° C. at atmospheric pressure. Examples of the solvents preferably used include but are not limited to esters (for example, ethyl acetate, butyl acetate, ethyl propionate, β-ethoxyethyl acetate and methyl cellosolve acetate), alcohols (for example, isopropyl alcohol, n-butyl alcohol and sec-butyl alcohol), ketones (for example, methyl isobutyl ketone, methyl ethyl ketone and cyclohexanone), amides (for example, dimethylformamide and N-methylpyrrolidone), and ethers (for example, tetrahydrofuran and dioxane).

Dispersion by emulsification is conducted for dispersing an oily phase dissolved in the high boiling organic solvent or a mixed solvent of the high boiling organic solvent and the low boiling solvent according to circumstances, in an aqueous phase mainly composed of water to prepare minute oil droplets of the oily phase. In this case, additives such as a surfactant, a wetting agent, a dye stabilizer, an emulsion stabilizer, a preservative and a mildewproofing agent can be added to either of the aqueous phase and the oily phase or both as needed.

As the emulsification method, there is generally used a method of adding the oily phase to the aqueous phase. However, a so-called phase reversal emulsification method can also be preferably used in which the aqueous phase is added dropwise to the oily phase. As the emulsification method, there is generally used a method of adding the oily phase to the aqueous phase. However, a so-called phase reversal emulsification method can also be preferably used in which the aqueous phase is added dropwise to the oily phase.

In dispersion by emulsification in the invention, various surfactants can be used. Examples of the surfactants preferably used include anionic surfactants such as fatty acid salts, alkylsulfate ester salts, alkylbenzenesulfonates, alkylnaphthalenesulfonates, dialkylsulfosuccinates, alkylphosphate ester salts, naphthalenesulfonate-formalin condensates and polyoxyethylene alkyl sulfate ester salts, and nonionic surfactants such as polyoxyethylene alkyl ethers, polyoxyethylene alkyl allyl ethers, polyoxyethylene fatty acid esters, sorbitan fatty acid esters, polyoxyethylene sorbitan fatty acid esters, polyoxyethylene alkylamines, glycerol fatty acid esters and oxyethylene-oxypropylene block copolymers. Further, SURFYNOLS (Air Products & Chemicals), an acetylene polyoxyethylene oxide surfactant, is also preferably used. Amine oxide type amphoteric surfactants such as N,N-dimethyl-N-alkylamine oxides are also preferred. Further, surfactants described in JP-A-59-157636, pages 37 and 38, and *Research Disclosure*, No. 308119 (1989) can also be used.

For stabilizing the dispersions immediately after emulsification, water-soluble polymers can also be added together with the above-mentioned surfactants. As the water-soluble polymers, there are preferably used polyvinyl alcohol, polyvinyl pyrrolidone, polyethylene oxide, polyacrylic acid, polyacrylamide and copolymers thereof. Natural water-soluble polymers such as polysaccharides, casein and gelatin are also preferably used. Further, for stabilizing the dye dispersions, polymers obtained by polymerization of acrylates, methacrylates, vinyl esters, acrylamide, methacrylamide, olefins, styrene, vinyl ethers and acrylonitrile derivatives, which are substantially insoluble in aqueous media, can also be used. It is preferred that these polymers contain —$SO_2$— or —COO—. When these polymers which are substantially insoluble in aqueous media are used together, high boiling organic solvents are used preferably in an amount of 0.1% to 20% by weight, and more preferably in an amount of 0.1% to 10% by weight.

When the hydrophobic dyes are dispersed by emulsification to prepare water-based ink, particularly important is particle size control thereof. For raising the color purity and the density at the time when images are formed by ink jet recording, it is indispensable to reduce the average particle size. The average particle size is preferably from 5 nm to 100 nm by the volume average particle size.

It has been revealed that the presence of coarse particles also plays a very major role for printing performance. That is to say, it has been proved that a nozzle of a head is clogged with coarse particles, or coarse particles form stains even if the nozzle is not clogged, which causes a failure to eject ink or a twist of ejected ink to have a profound influence on printing performance. In order to prevent this, it is important to restrain the number of particles having a size of 5 $\mu$m or more to 10 particles or less per $\mu$l of ink, and the number of particles having a size of 1 $\mu$m or more to 1000 particles or less per μl of ink. As methods for removing these coarse particles, there can be used known centrifugal separation methods and microfiltration methods. These separating means may be applied immediately after dispersion by emulsification, or after addition of various additives such as a wetting agent and a surfactant to the emulsified dispersion and immediately before charging the dispersion into ink cartridges.

As an effective means for reducing the average particle size and removing coarse particles, there can be used a mechanical emulsifier.

As the emulsifiers, there can be used known apparatus of a simple stirrer or impeller stirring system, an in-line stirring system, a mill system (for example, a colloid mill) and an ultrasonic system. However, the use of a high-pressure homogenizer is particularly preferred.

As to the high-pressure homogenizer, its detailed mechanism is described in U.S. Pat. No. 4, 533,254 and JP-A-6-47264. Commercially available apparatus include Gaulin Homogenizer (A. P. V. Gaulin Inc.), Microfluidizer (Microfluidex Inc.) and Altimizer (Sugino Machine Co., Ltd.).

Further, a high-pressure homogenizer provided with a mechanism for finely graining particles in an extra-high pressure jet stream as recently described in U.S. Pat. No. 5,720,551 is particularly effective for dispersion by emulsification of the invention. Examples of the emulsifiers using extra-high pressure jet streams include De Bee 2000 (Bee International Ltd.).

When the particles are emulsified with the high-pressure emulsifiers, the pressure is 50 MPa or more, preferably 60 MPa or more, and more preferably 180 MPa or more. For example, the use of two or more kinds of emulsifiers in combination, such as treatment with a high-pressure homogenizer after emulsification with a stirring emulsifier, is particularly preferred. Further, a method is also preferred in which after the particles are once dispersed by emulsification with the emulsifier, additives such as a wetting agent and a surfactant are added, and then, the emulsified dispersion is allowed to pass through the high-pressure homogenizer again before ink is charged into cartridges.

When the low boiling organic solvents are contained together with the high boiling organic solvents, the low boiling organic solvents are preferably removed from the viewpoints of the stability of the emulsions, and the safety and sanitation. As methods for removing the low boiling organic solvents, various known methods can be used depending on the kind of solvent. That is to say, evaporation methods, vacuum evaporation methods and ultrafiltration methods can be used. It is preferred that the low boiling organic solvents are removed as soon as possible after emulsification.

The ink for ink jet recording of the invention can be prepared by dissolving and/or dispersing the above-mentioned oil-soluble dye and compound represented by formula (I) in an aqueous medium. The term "aqueous medium" as used in the invention means water or a mixture of water and a small amount of an aqueous-miscible organic solvent to which an additive such as a surfactant, a wetting agent, a stabilizer or a preservative is added as needed.

When the above-mentioned dyes and other additives are hydrophobic and dispersed in the aqueous media, the dyes are preferably dispersed in a fine particle state using a dispersing device (for example, a ball mill, a sand mill, an attriter, a roll mill, an agitator mill, a Henschel mixer, a colloid mill, an ultrasonic homogenizer, a purl mill, a jet mill, Ang Mill, Gaulin Homogenizer, Microfluidizer, Altimizer or an emulsifier using extra-high pressure jet streams such as De Bee 2000 manufactured by Bee International Ltd.). The above-mentioned dyes maybe dissolved in appropriate organic solvents, and then the resulting solutions may be dispersed in the aqueous media by emulsification. When the dyes are dispersed by emulsification, dispersing agents (emulsifiers) and surfactants can be used. High boiling organic solvents such as phthalates, phosphates or phosphonates, benzoates, amides, alcohols, aliphatic esters, aniline derivatives, chlorinated paraffins, trimesates, phenols, carboxylic acids and alkylphosphoric acids may be used together with the dyes. For stabilizing the dispersions, water-soluble polymers can also be added. As the water-soluble polymers, there are preferably used polyvinyl alcohol, polyvinyl pyrrolidone, polyethylene oxide, polyacrylic acid, polyacrylamide and copolymers thereof. Natural water-soluble polymers such as polysaccharides, casein and gelatin are also preferably used. Further, for stabilizing the dye dispersions, vinyl polymers obtained by polymerization of acrylates, methacrylates, vinyl esters, acrylamide and derivatives thereof, methacrylamide and derivatives thereof, olefins, styrene and derivatives thereof, vinyl ethers, acrylonitrile and derivatives thereof, which are substantially insoluble in aqueous media, polyurethanes, polyesters, polyamides, polyureas or polycarbonates can also be used together. It is preferred that these polymers contain —$SO_2$— or —COO—. When these polymers which are substantially insoluble in aqueous media are used together, they are preferably used in an amount of 10% to 1000% by weight based on the dye.

As to methods for preparing aqueous ink for ink jet recording, details thereof are described in JP-A-5-148436, JP-A-5-295312, JP-A-7-97541, JP-A-7-82515, JP-A-7-118584 and JP-A-12-78454. These methods can also be utilized for the preparation of the ink for ink jet recording of the invention.

As the above-mentioned aqueous medium, there can be used a mixture of water as a main component and at least one aqueous-miscible organic solvent added on request. Examples of the aqueous-miscible organic solvents include alcohols (for example, methanol, ethanol, propanol, isopropanol, butanol, isobutanol, sec-butanol, t-butanol, pentanol, hexanol, cyclohexanol and benzyl alcohol), polyhydric alcohols (ethylene glycol, diethylene glycol, triethylene glycol, polyethylene glycol, propylene glycol, dipropylene glycol, polypropylene glycol, butylene glycol, hexanediol, pentanediol, glycerol, hexanetriol and thiodiglycol), glycol derivatives (ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monomethyl ether acetate, triethylene glycol monoethyl ether and ethylene glycol monophenyl ether), amines (for example, ethanolamine, diethanolamine, triethanolamine, N-methyldiethanolamine, N-ethyldiethanolamine, morpholine, N-ethylmorpholine, ethylenediamine, diethylenetriamine, triethylenetetramine, polyethyleneimine and tetramethyl-propylenediamine) and other polar solvents (for example, formamide, N,N-dimethylformamide, N,N-dimethylacetamide, dimethyl sulfoxide, sulfolane, 2-pyrrolidone, N-methyl-2-pyrrolidone, N-vinyl-2-pyrrolidone, 2-oxazolidone, 1,3-dimethyl-2-imidazolidinone, acetonitrile and acetone). The aqueous-miscible organic solvents may be used as a combination of two or more of them.

When the emulsified dispersions of the fine colored particles of the oil-soluble dyes obtained in the invention are used as the ink for ink jet recording, additives can be appropriately selected and used in proper amounts. Such additives include an anti-drying agent for preventing an ink jet outlet from being clogged due to drying, a penetration accelerator for allowing ink to penetrate paper better, an UV absorber, an antioxidant, a viscosity modifier, a surface tension regulator, a dispersing agent, a dispersion stabilizer, a mildewproofing agent, a corrosion inhibitor, a pH adjusting agent, an antifoaming agent and a chelating agent.

As the anti-drying agents used in the invention, water-soluble organic solvents having a lower vapor pressure than water are preferred. Specific example thereof include polyhydric alcohols represented by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerol and trimethylolpropane; lower alkyl ethers of polyhydric alcohols such as ethylene glycol monomethyl (or ethyl) ether, diethylene glycol monomethyl (or ethyl) ether and triethylene glycol monomethyl (or butyl) ether, heterocycles such as 2-pyrrolidone, N-methyl-2-pyrrolidone, 1,3-dimethyl-2-imidazolidinone and N-ethylmorpholine; sulfur-containing compounds such as sulfolane, dimethyl sulfoxide and 3-sulfolene; multifunctional compounds such as diacetone alcohol and diethanolamine; and urea derivatives. Of these, polyhydric alcohols such as glycerol and diethylene glycol are more preferred. The above-mentioned anti-drying agents may be used either alone or as a combination of two or more of them. These anti-drying agents are preferably contained in ink in an amount of 10% to 50% by weight.

The penetration accelerators used in the invention include alcohols such as ethanol, isopropanol, butanol, diethylene glycol monobutyl ether, triethylene glycol monobutyl ether and 1,2-hexanediol, sodium laurylsulfate, sodium oleate and the nonionic surfactants mentioned above as the surfactants for dispersion by emulsification. They shows the sufficient effect when contained in ink in an amount of 10% to 30% by weight, and are preferably added within such a range that no blur of printing and no print through occur.

The UV absorbers used for improving the keeping quality of images in the invention include benzotriazole compounds described in JP-A-58-185677, JP-A-61-190537, JP-A-2-782, JP-A-5-197075 and JP-A-9-34057; benzophenone compounds described in JP-A-46-2784, JP-A-5-194483 and U.S. Pat. No. 3,214,463; cinnamic acid compounds described in JP-B-48-30492, JP-B-56-21141 and JP-A-10-88106; triazine compounds described in JP-A-4-298503, JP-A-8-53427, JP-A-8-239368, JP-A-10-182621 and JP-W-8-501291 (the term "JP-W" as used herein means an unexamined published international patent application); compounds described in *Research Disclosure*, No. 24239; and compounds represented by stilbene and benzoxazole compounds, which absorb ultraviolet rays to emit fluorescence, so-called fluorescent brightening agents.

As the antioxidants used for improving the keeping quality of images in the invention, there can be used various organic and metal complex antifading agents. The organic antifading agents include hydroquinone and derivatives thereof, alkoxyphenols, dialkoxyphenols, phenols, anilines, amines, indan and derivatives thereof, chroman and derivatives thereof, alkoxyanilines and heterocycles, and the metal complex antifading agents include nickel complexes and zinc complexes. More specifically, there can be used compounds described in patents cited in *Research Disclosure*, No. 17643, Items VII–I to J, ibid., No. 15162, ibid., No. 18716, page 650, left column, ibid., No. 36544, page 527, ibid., No. 307105, page 872, and ibid., No. 15162, and compounds contained in formulae and compound examples of typical compounds described in JP-A-62-21572, pages 127 to 137.

The mildewproofing agents used in the invention include sodium dehydroacetate, sodium benzoate, sodium pyridinethione-1-oxide, ethyl p-hydroxybenzoate, 1,2-benzoisothiazoline-3-one and salts thereof. They are preferably used in ink in an amount of 0.02% to 1.00% by weight.

The pH adjusting agents used in the invention can be suitably used in terms of pH adjustment and dispersion stabilization, and are added so as to give preferably a pH of 4.5 to 10.0, and more preferably a pH of 6 to 10.0.

As to the pH adjusting agents, basic ones include organic bases and inorganic alkalis, and acidic ones include organic acids and inorganic acids.

The organic bases include triethanolamine, diethanolamine, N-methyldiethanolamine and dimethylethanolamine. The inorganic alkalis include hydroxides of alkali metals (for example, sodium hydroxide, lithium hydroxide and potassium hydroxide), carbonates (for example, sodium carbonate and sodium hydrogencarbonate) and ammonia.

The organic acids include acetic acid, propionic acid, trifluoroacetic acid and an alkylsulfonic acid. The inorganic acids include hydrochloric acid, sulfuric acid and phosphoric acid.

The surface tension of the ink of the invention is preferably from 20 mN/m to 60 mN/m, and more preferably from 25 mN/m to 45 mN/m. The surface tension regulators used in the invention include nonionic, cationic and anionic surfactants. For example, the surfactants used in the above-mentioned dispersion by emulsification can be used. However, it is preferred that the surfactants used herein have a solubility in water at 25° C. of 0.5% or more.

The ink of the invention preferably has a viscosity of 30 mPa·s or less. It is more preferred that the viscosity is adjusted to 20 mPa·s or less. Accordingly, the viscosity modifier is sometimes used for adjusting the viscosity. The viscosity modifiers include, for example, celluloses, water-soluble polymers such as polyvinyl alcohol, and nonionic surfactants. Details thereof are described in "Viscosity Adjusting Techniques", chapter 9 (Gijutsu Joho Kyokai, 1999) and "Chemicals for Ink Jet Printers (supplemented in '98)" —Research of Development Trend and Outlook of Materials— (CMC, 1997).

In the invention, the above-mentioned various cationic, anionic and nonionic surfactants can also be used as the dispersing agents and dispersion stabilizers, and fluorine and silicone compounds and chelating agents represented by EDTA as the antifoaming agents, as needed.

These various additives are generally added to the emulsified dispersion after emulsification of the oil-soluble dye. However, they maybe added to the oily phase or the aqueous phase in dispersion by emulsification to carry out so-called co-emulsification.

The ink of the invention can be used for forming images on known materials on which the images are recorded, that is to say, plain paper, resin-coated paper, paper for ink-jet use only described, for example, in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597 and JP-A-10-337947, films, paper for both ink-jet and electrophotographic uses, cloths, glass, metal and ceramics.

The recording paper and recording films used for conducting ink jet recording by use of the ink of the invention will be described below. Supports used in the recording paper and recording films are composed of chemical pulp such as LBKP or NBKP, mechanical pulp such as GP, PGW, RMP, TMP, CTMP, CMP or CGP, or waste paper pulp such as DIP, and prepared with various machines such as a Fourdrinier paper machine and a cylinder paper machine, adding known additives such as a pigment, a binder, a size agent, a fixing agent, a cationic agent and a paper strong agent as needed. In addition to these supports, either of synthetic paper and plastic film sheets may also be used. The thickness of the supports is desirably from 10 $\mu$m to 250 $\mu$m, and the basis weight is preferably from 10 g/m$^2$ to 250 g/m$^2$. The supports may be provided with ink receiving layers and back coat layers as such, or after size pressing with starch or polyvinyl alcohol or formation of anchor coat layers. Further, the supports may be subjected to flattening treatment using calendering machines such as a machine calender, a TG calender and a soft calender. In the invention, paper laminated with a plastic (for example, polyethylene, polystyrene, polyethylene terephthalate, polybutene or a copolymer thereof) on both sides, and plastic films are preferably used as the supports. It is preferred that a white pigment (for example, titanium oxide or zinc oxide) or a coloring dye (for example, cobalt blue, ultramarine blue or neodymium oxide) is added to the plastic.

Pigments and water-soluble binders are contained in the ink receiving layers provided on the supports. White pigments are preferred as the pigments, and include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide and zinc carbonate, and organic pigments such as styrenic pigments, acrylic pigments, urea resins and melamine resins. As the white pigments contained in the ink receiving layers, porous inorganic pigments are preferred, and particularly, synthetic amorphous silica having a large pore area is suitable. Although both silicic acid anhydride obtained by the dry process and hydrous silicic acid obtained by the wet process are available as synthetic amorphous silica, the use of hydrous silicic acid is particularly preferred.

The aqueous binders contained in the ink receiving layers include water-soluble polymers such as polyvinyl alcohol, silanol-modified polyvinyl alcohol, starch, cationized starch, casein, gelatin, carboxymethyl cellulose, hydroxyethyl cellulose, polyvinyl pyrrolidone, a polyalkylene oxide and a polyalkylene oxide derivative; and water-dispersible polymers such as a styrene-butadiene latex and an acrylic emulsion. These aqueous binders can be used either alone or as a combination of two or more of them. In the invention, of these, polyvinyl alcohol and silanol-modified polyvinyl alcohol are particularly suitable in terms of adhesion to the pigments and separation resistance of the ink receiving layers.

The ink receiving layers can contain additives such as mordants, water resistance imparting agents, light resistance improvers, surfactants and the like, as well as the pigments and the aqueous binders.

It is preferred that the mordants to be added to the ink receiving layers are immobilized. For that purpose, polymer mordants are preferably used.

The polymer mordants are described in JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834, JP-A-60-122940, JP-A-60-122941, JP-A-60-122942, JP-A-60-235134, JP-A-1-161236, U.S. Pat. Nos. 2,484,430, 2,548,564, 3,148,061, 3,309,690, 4,115,124, 4,124,386, 4,193,800, 4,273,853, 4,282,305 and 4,450,224. Image receiving materials containing the polymer mordants described in JP-A-1-161236, pages 212 to 215, are particularly preferred. The use of the mordants described therein provides images having excellent image quality, and improves light resistance of images.

The water resistance imparting agents are effective for imparting water resistance to images, and as these water resistance imparting agents, cationic resins are particularly desirable. Such cationic resins include polyamide polyamine epichlorohydrin, polyethyleneimine, polyaminesulfone, dimethyldiallylammonium chloride polymer, cationic polyacrylamide and colloidal silica. Of these cationic resins, polyamide polyamine epichlorohydrin is particularly suitable. The content of these cationic resins is preferably from 1% to 15% by weight, and particularly preferably from 3% to 10% by weight, based on the total solid content of the ink receiving layer.

The light resistance improvers include zinc sulfate, zinc oxide, hindered amine antioxidants and benzotriazole UV absorbers such as benzophenone. Of these, zinc sulfate is particularly preferred.

The surfactants act as coating aids, separation improvers, slipperiness improvers or antistatic agents. The surfactants are described in JP-A-62-173463 and JP-A-62-183457. Organic fluoro compounds may be used instead of the surfactants. The organic fluoro compounds are preferably hydrophobic. Examples of the organic fluoro compounds include fluorine surfactants, oily fluorine compounds (for example, fluorine oil) and solid fluorine compound resins (for example, tetrafluoroethylene resin). The organic fluoro compounds are described in JP-B-57-9053 (columns 8 to 17), JP-A-61-20994 and JP-A-62-135826. Other additives added to the ink receiving layers include pigment dispersing agents, thickening agents, antifoaming agents, dyes, fluorescent brightening agents, preservatives, pH adjusting agents, matte agents and hardening agents. The ink receiving layer may be either of one layer or of two layers.

The recording paper and the recording films can also be provided with back coat layers, and components which can be added to these layers include white pigments, aqueous binders and other components. The white pigments contained in the back coat layers include, for example, white inorganic pigments such as precipitated calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrous halloysite, magnesium carbonate and magnesium hydroxide, and organic pigments such as styrenic plastic pigments, acrylic plastic pigments, polyethylene, microcapsules, urea resins and melamine resins.

The aqueous binders contained in the back coat layers include water-soluble polymers such as a styrene/maleate copolymer, a styrene/acrylate copolymer, polyvinyl alcohol, silanol-modified polyvinyl alcohol, starch, cationized starch, casein, gelatin, carboxymethyl cellulose, hydroxyethyl cellulose and polyvinyl pyrrolidone; and water-dispersible polymers such as a styrene-butadiene latex and an acrylic emulsion. Other components contained in the back coat layers include antifoaming agents, foam inhibitors, dyes, fluorescent brightening agents, preservatives and water resistance imparting agents.

Polymer latexes may be added to the constituent layers (including the back coat layers) of the ink-jet recording paper and the recording films. The polymer latexes are used for improving film properties such as dimensional stability, curl prevention, adhesion prevention and crack prevention of films. The polymer latexes are described in JP-A-62-245258, JP-A-62-1316648 and JP-A-62-110066. Addition of the polymer latex having a low glass transition temperature (of 40° C. or less) to a mordant-containing layer can prevent cracks and curls of the layer. Further, addition of the polymer latex having a high glass transition temperature can also prevent curls of the layer.

The ink of the invention has no limitation on the ink-jet recording system, and is used in known systems. Such systems include a charge control system of discharging ink utilizing electrostatic attracting force, a drop-on-demand system (pressure pulse system) utilizing vibration pressure of piezoelectric elements, an acoustic ink-jet system of discharging ink by converting electric signals to acoustic beams, irradiating the ink with the beams, and utilizing the resulting radiation pressure, and a thermal ink-jet (bubble jet) system of heating ink to form air bubbles and utilizing the resulting pressure. The ink-jet recording systems include a system of injecting ink having a low concentration, called photo ink, as a number of droplets small in volume, a system of using a plurality of ink compositions substantially identical in hue and different in concentration to improve image quality, and a system using colorless and transparent ink.

EXAMPLES

The invention will be further illustrated with reference to the following examples, which are, however, not to be construed as limiting the invention.

Example 1
(Preparation of Ink Set 101)

Oil-soluble dye (1-1) (8 g) and 5 g of sodium dioctylsulfosuccinate were dissolved in 6 g of high boiling organic solvent (S-1), 10 g of high boiling organic solvent (S-2) and 50 ml of ethyl acetate at 70° C. To the resulting solution, 500 ml of deionized water was added while stirring with a magnetic stirrer to prepare an oil-in-water crude particle dispersion.

Then, the crude dispersion was passed 5 times through a Microfluidizer (Microfluidex Inc.) at a pressure of 60 MPa, thereby forming fine particles. Further, for the resulting emulsion, desolvation was performed with a rotary evaporator until the odor of ethyl acetate was removed.

To the fine emulsion of the oil-soluble dye thus obtained, 140 g of diethylene glycol, 64 g of glycerol, 7 g of SURFYNOL 465 (Air Products & Chemicals) and additives such as urea were added, and then, deionized water was added thereto, followed by adjustment to pH 9 with 10 mol/l of KOH, thereby preparing light magenta ink so as to give concentrations shown in Table 1. The volume average particle size of the resulting emulsified dispersion ink was measured with a Microtrack UPA (manufactured by Nikkiso Co., Ltd.). As a result, it was 51 nm.

Furthermore, changing the kind of dye and the high boiling organic solvent, magenta ink, light cyan ink, cyan ink, yellow ink and black ink of ink set 101 shown in Table 1 were prepared.

TABLE 1

|  | Light Magenta | Magenta | Light Cyan | Cyan | Yellow | Black |
|---|---|---|---|---|---|---|
| Oil-Soluble Dye | 1-1 5.00 g/l | 1-1 20.0 g/l | C-1 9.3 g/l | C-1 37.2 g/l | Y-1 27.2 g/l | 1-1 10.0 g/l |
|  |  |  |  |  |  | C-1 18.6 g/l |
|  |  |  |  |  |  | Y-1 13.6 g/l |
| High Boiling Organic Solvent | S-1 3.63 g/l | 14.52 g/l | 6.75 g/l | 27.0 g/l | 19.74 g/l | 30.6 g/l |
|  | S-2 6.38 g/l | 25.52 g/l | 11.9 g/l | 47.6 g/l | 34.7 g/l | 53.8 g/l |
| Sodium Dioctylsulfosuccinate | 6.25 g/l | 25.0 g/l | 11.6 g/l | 46.4 g/l | 34.0 g/l | 52.7 g/l |
| Diethylene glycol | 110.0 g/l | 110.0 g/l | 110.0 g/l | 110.0 g/l | 110.0 g/l | 110.0 g/l |
| Urea | 46.0 g/l | 46.0 g/l | 46.0 g/l | 46.0 g/l | 46.0 g/l | 46.0 g/l |
| Glycerol | 50.0 g/l | 50.0 g/l | 50.0 g/l | 50.0 g/l | 50.0 g/l | 50.0 g/l |
| SURFYNOL 465 | 5.5 g/l | 5.5 g/l | 5.5 g/l | 5.5 g/l | 5.5 g/l | 5.5 g/l |
| Triethanolamine | 7.5 g/l | 7.5 g/l | 7.5 g/l | 7.5 g/l | 7.5 g/l | 7.5 g/l |
| Benzotriazole | 0.075 g/l | 0.075 g/l | 0.075 g/l | 0.075 g/l | 0.075 g/l | 0.075 g/l |
| Proxel XL2 | 2.5 g/l | 2.5 g/l | 2.5 g/l | 2.5 g/l | 2.5 g/l | 2.5 g/l |
| Deionized water to make 1 liter |  |  |  |  |  |  |
| Volume Average Particle Size | 51 nm | 53 nm | 62 nm | 65 nm | 59 nm | 70 nm |

In Table 1, C-1, Y-1, S-1 and S-2 are as follows:

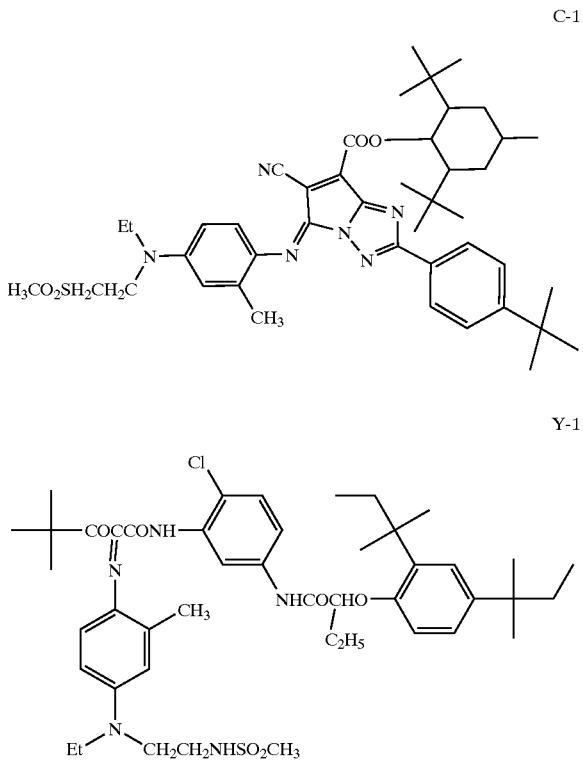

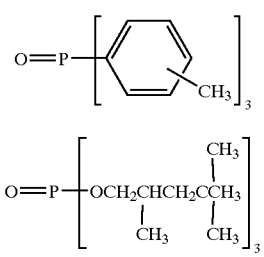

S-1

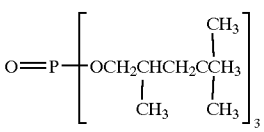

S-2

Then, ink sets 102 to 185 were prepared in the same manner as with ink set 101 with the exception that the oil-soluble dyes of ink set 101 were changed to oil-soluble dyes shown in Tables 2 to 11 so as to give the same molar amounts as added in ink set 101 (when two or more oil-soluble dyes were used in combination for the same color ink, they are used in amounts equimolar with each other), and/or compounds of formula (1) were added in amounts shown in Table 2 to 11 by molar ratios to the oil-soluble dyes.

Further, ink sets 186 for comparison and 187 changed in volume average particle size were prepared by changing the pressure in emulsification.

Furthermore, ink set 188 according to Table 12 was prepared as an ink set for comparison using water-soluble dyes.

TABLE 2

| Ink Set | | Light Magenta | Magenta | Light Cyan | Cyan | Yellow | Black | Note |
|---|---|---|---|---|---|---|---|---|
| 101 | Oil-Soluble Dye | 1-1 5.0 g/l | 1-1 20.0 g/l | C-1 9.3 g/l | C-1 37.2 g/l | Y-1 27.2 g/l | 1-1 10.0 g/l C-1 18.6 g/l Y-1 13.6 g/l | Comparison |
| | Compound of Formula (1) | — | — | — | — | — | — | |
| | Volume Average Particle Size | 51 nm | 53 nm | 62 nm | 65 nm | 59 nm | 70 nm | |
| 102 | Oil-Soluble Dye | 1-1 | 1-1 | C-1 | C-1 | Y-1 | 1-1, C-1, Y-1 | Invention |
| | Compound of Formula (1) | I-1 (100 mol %) | I-1 (100 mol %) | I-1 (100 mol %) | I-1 (100 mol %) | I-1 (100 mol %) | I-1 (100 mol %) | |
| | Volume Average Particle Size | 53 nm | 50 nm | 63 nm | 65 nm | 55 nm | 60 nm | |
| 103 | Oil-Soluble Dye | 1-1 | 1-1 | C-1 | C-1 | Y-1 | 1-1, C-1, Y-1 | Invention |
| | Compound of Formula (1) | I-11 (100 mol %) | I-11 (100 mol %) | I-11 (100 mol %) | I-11 (100 mol %) | I-11 (100 mol %) | I-11 (100 mol %) | |
| | Volume Average Particle Size | 53 nm | 50 nm | 63 nm | 65 nm | 55 nm | 60 nm | |
| 104 | Oil-Soluble Dye | 1-1 | 1-1 | C-1 | C-1 | Y-1 | 1-1, C-1, Y-1 | Invention |
| | Compound of Formula (1) | I-12 (100 mol %) | I-12 (100 mol %) | I-12 (100 mol %) | I-12 (100 mol %) | I-12 (100 mol %) | I-12 (100 mol %) | |
| | Volume Average Particle Size | 53 nm | 50 nm | 63 nm | 65 nm | 55 nm | 60 nm | |
| 105 | Oil-Soluble Dye | 1-1 | 1-1 | C-1 | C-1 | Y-1 | 1-1, C-1, Y-1 | Invention |
| | Compound of Formula (1) | I-14 (100 mol %) | I-14 (100 mol %) | I-14 (100 mol %) | I-14 (100 mol %) | I-14 (100 mol %) | I-14 (100 mol %) | |
| | Volume Average Particle Size | 53 nm | 50 nm | 63 nm | 65 nm | 55 nm | 60 nm | |
| 106 | Oil-Soluble Dye | 1-1 | 1-1 | C-1 | C-1 | Y-1 | 1-1, C-1, Y-1 | Invention |
| | Compound of Formula (1) | I-16 (100 mol %) | I-16 (100 mol %) | I-16 (100 mol %) | I-16 (100 mol %) | I-16 (100 mol %) | I-16 (100 mol %) | |
| | Volume Average Particle Size | 53 nm | 50 nm | 63 nm | 65 nm | 55 nm | 60 nm | |
| 107 | Oil-Soluble Dye | 1-1 | 1-1 | C-1 | C-1 | Y-1 | 1-1, C-1, Y-1 | Invention |
| | Compound of Formula (1) | I-39 (100 mol %) | I-39 (100 mol %) | I-39 (100 mol %) | I-39 (100 mol %) | I-39 (100 mol %) | I-39 (100 mol %) | |
| | Volume Average Particle Size | 53 nm | 50 nm | 63 nm | 65 nm | 55 nm | 60 nm | |
| 108 | Oil-Soluble Dye | 1-1 | 1-1 | C-1 | C-1 | Y-1 | 1-1, C-1, Y-1 | Invention |
| | Compound of Formula (1) | I-40 (100 mol %) | I-40 (100 mol %) | I-40 (100 mol %) | I-40 (100 mol %) | I-40 (100 mol %) | I-40 (100 mol %) | |
| | Volume Average Particle Size | 53 nm | 50 nm | 63 nm | 65 nm | 55 nm | 60 nm | |

TABLE 3

| Ink Set | | Light Magenta | Magenta | Light Cyan | Cyan | Yellow | Black | Note |
|---|---|---|---|---|---|---|---|---|
| 109 | Oil-Soluble Dye | 1-1 | 1-1 | C-1 | C-1 | Y-1 | 1-1, C-1, Y-1 | Invention |
| | Compound of Formula (1) | I-31 (100 mol %) | I-31 (100 mol %) | I-31 (100 mol %) | I-31 (100 mol %) | I-31 (100 mol %) | I-31 (100 mol %) | |
| | Volume Average Particle Size | 53 nm | 50 nm | 63 nm | 65 nm | 55 nm | 60 nm | |
| 110 | Oil-Soluble Dye | 1-1 | 1-1 | C-1 | C-1 | Y-1 | 1-1, C-1, Y-1 | Invention |
| | Compound of Formula (1) | I-32 | I-32 | I-32 | I-32 | I-32 | I-32 | |

TABLE 3-continued

| Ink Set | | Light Magenta | Magenta | Light Cyan | Cyan | Yellow | Black | Note |
|---|---|---|---|---|---|---|---|---|
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 111 | Oil-Soluble Dye | 1-1 | 1-1 | C-1 | C-1 | Y-1 | 1-1, C-1, Y-1 13.6 g/l | Invention |
| | Compound of Formula (1) | I-37 | I-37 | I-37 | I-37 | I-37 | I-37 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 112 | Oil-Soluble Dye | 1-1 | 1-1 | C-1 | C-1 | Y-1 | 1-1, C-1 Y-1 13.6 g/l | Invention |
| | Compound of Formula (1) | I-38 | I-38 | I-38 | I-38 | I-38 | I-38 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 113 | Oil-Soluble Dye | 1-1 | 1-1 | C-1 | C-1 | Y-1 | 1-1, C-1, Y-1 | Invention |
| | Compound of Formula (1) | I-42 | I-42 | I-42 | I-42 | I-42 | I-42 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 114 | Oil-Soluble Dye | 1-1 | 1-1 | C-1 | C-1 | Y-1 | 1-1, C-1, Y-1 | Invention |
| | Compound of Formula (1) | I-44 | I-44 | I-44 | I-44 | I-44 | I-44 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 115 | Oil-Soluble Dye | 1-1 | 1-1 | C-1 | C-1 | Y-1 | 1-1, C-1, Y-1 | Invention |
| | Compound of Formula (1) | I-53 | I-53 | I-53 | I-53 | I-53 | I-53 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 116 | Oil-Soluble Dye | 1-1 | 1-1 | C-1 | C-1 | Y-1 | 1-1, C-1, Y-1 | Invention |
| | Compound of Formula (1) | I-54 | I-54 | I-54 | I-54 | I-54 | I-54 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 117 | Oil-Soluble Dye | 1-1 | 1-1 | C-1 | C-1 | Y-1 | 1-1, C-1 Y-1 13.6 g/l | Invention |
| | Compound of Formula (1) | I-76 | I-76 | I-76 | I-76 | I-76 | I-76 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |

TABLE 4

| Ink Set | | Light Magenta | Magenta | Light Cyan | Cyan | Yellow | Black | Note |
|---|---|---|---|---|---|---|---|---|
| 118 | Oil-Soluble Dye | 1-1 | 1-1 | C-1 | C-1 | Y-1 | 1-1, C-1, Y-1 | Invention |
| | Compound of Formula (1) | I-77 | I-77 | I-77 | I-77 | I-77 | I-77 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 119 | Oil-Soluble Dye | 1-1 | 1-1 | C-1 | C-1 | Y-1 | 1-1, C-1, Y-1 | Invention |
| | Compound of Formula (1) | I-79 | I-79 | I-79 | I-79 | I-79 | I-79 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 120 | Oil-Soluble Dye | 1-1 | 1-1 | C-1 | C-1 | Y-1 | 1-1, C-1, Y-1 | Invention |
| | Compound of Formula (1) | I-80 | I-80 | I-80 | I-80 | I-80 | I-80 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 121 | Oil-Soluble Dye | 1-1 | 1-1 | C-1 | C-1 | Y-1 | 1-1, C-1, Y-1 | Invention |
| | Compound of Formula (1) | I-69 | I-69 | I-69 | I-69 | I-69 | I-69 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 122 | Oil-Soluble Dye | 1-1 | 1-1 | C-1 | C-1 | Y-1 | 1-1, C-1 Y-1 13.6 g/l | Invention |
| | Compound of Formula (1) | I-70 | I-70 | I-70 | I-70 | I-70 | I-70 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |

TABLE 4-continued

| Ink Set | | Light Magenta | Magenta | Light Cyan | Cyan | Yellow | Black | Note |
|---|---|---|---|---|---|---|---|---|
| 123 | Oil-Soluble Dye | 1-5 | 1-5 | C-1 | C-1 | Y-1 | 1-5 10.0 g/l | Comparison |
| | | 5.0 g/l | 20.0 g/l | 9.3 g/l | 37.2 g/l | 27.2 g/l | C-1 18.6 g/l | |
| | | | | | | | Y-1 13.6 g/l | |
| | Compound of Formula (1) | — | — | — | — | — | — | |
| | Volume Average Particle Size | 51 nm | 53 nm | 62 nm | 65 nm | 59 nm | 70 nm | |
| 124 | Oil-Soluble Dye | 1-5 | 1-5 | C-1 | C-1 | Y-1 | 1-5, C-1, Y-1 | Invention |
| | Compound of Formula (1) | I-11 | I-11 | I-11 | I-11 | I-11 | I-11 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 125 | Oil-Soluble Dye | 1-5 | 1-5 | C-1 | C-1 | Y-1 | 1-5, C-1, Y-1 | Invention |
| | Compound of Formula (1) | I-39 | I-39 | I-39 | I-39 | I-39 | I-39 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 126 | Oil-Soluble Dye | 1-5 | 1-5 | C-1 | C-1 | Y-1 | 1-5, C-1, Y-1 | Invention |
| | Compound of Formula (1) | I-31 | I-31 | I-31 | I-31 | I-31 | I-31 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |

TABLE 5

| Ink Set | | Light Magenta | Magenta | Light Cyan | Cyan | Yellow | Black | Note |
|---|---|---|---|---|---|---|---|---|
| 127 | Oil-Soluble Dye | 1-5 | 1-5 | C-1 | C-1 | Y-1 | 1-5, C-1, Y-1 | Invention |
| | Compound of Formula (1) | I-42 | I-42 | I-42 | I-42 | I-42 | I-42 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 128 | Oil-Soluble Dye | 1-5 | 1-5 | C-1 | C-1 | Y-1 | 1-5, C-1, Y-1 | Invention |
| | Compound of Formula (1) | I-44 | I-44 | I-44 | I-44 | I-44 | I-44 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 129 | Oil-Soluble Dye | 1-5 | 1-5 | C-1 | C-1 | Y-1 | 1-5, C-1, Y-1 | Invention |
| | Compound of Formula (1) | I-53 | I-53 | I-53 | I-53 | I-53 | I-53 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 130 | Oil-Soluble Dye | 1-5 | 1-5 | C-1 | C-1 | Y-1 | 1-5, C-1, Y-1 | Invention |
| | Compound of Formula (1) | I-54 | I-54 | I-54 | I-54 | I-54 | I-54 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 131 | Oil-Soluble Dye | 1-5 | 1-5 | C-1 | C-1 | Y-1 | 1-5, C-1, Y-1 | Invention |
| | Compound of Formula (1) | I-77 | I-77 | I-77 | I-77 | I-77 | I-77 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 132 | Oil-Soluble Dye | 1-5 | 1-5 | C-1 | C-1 | Y-1 | 1-5, C-1, Y-1 | Invention |
| | Compound of Formula (1) | I-69 | I-69 | I-69 | I-69 | I-69 | I-69 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |
| 133 | Oil-Soluble Dye | 1-12 | 1-12 | C-1 | C-1 | Y-1 | 1-12 10.0 g/l | Comparison |
| | | 5.0 g/l | 20.0 g/l | 9.3 g/l | 37.2 g/l | 27.2 g/l | C-1 18.6 g/l | |
| | | | | | | | Y-1 13.6 g/l | |
| | Compound of Formula (1) | — | — | — | — | — | — | |
| | Volume Average Particle Size | 51 nm | 53 nm | 62 nm | 65 nm | 59 nm | 70 nm | |
| 134 | Oil-Soluble Dye | 1-12 | 1-12 | C-1 | C-1 | Y-1 | 1-12, C-1, Y-1 | Invention |
| | Compound of Formula (1) | I-11 | I-11 | I-11 | I-11 | I-11 | I-11 | |
| | | (100 mol %) | (100 mol %) | (100 mol %) | (100 mol %) | (100 mol %) | (100 mol %) | |
| | Volume Average Particle Size | 53 nm | 50 nm | 63 nm | 65 nm | 55 nm | 60 nm | |

TABLE 5-continued

| Ink Set | | Light Magenta | Magenta | Light Cyan | Cyan | Yellow | Black | Note |
|---|---|---|---|---|---|---|---|---|
| 135 | Oil-Soluble Dye | 1-12 | 1-12 | C-1 | C-1 | Y-1 | 1-12, C-1, Y-1 | Invention |
| | Compound of Formula (1) | I-39 (100 mol %) | I-39 (100 mol %) | I-39 (100 mol %) | I-39 (100 mol %) | I-39 (100 mol %) | I-39 (100 mol %) | |
| | Volume Average Particle Size | 53 nm | 50 nm | 63 nm | 65 nm | 55 nm | 60 nm | |

TABLE 6

| Ink Set | | Light Magenta | Magenta | Light Cyan | Cyan | Yellow | Black | Note |
|---|---|---|---|---|---|---|---|---|
| 136 | Oil-Soluble Dye | 1-12 | 1-12 | C-1 | C-1 | Y-1 | 1-12, C-1, Y-1 | Invention |
| | Compound of Formula (1) | I-31 (100 mol %) | I-31 (100 mol %) | I-31 (100 mol %) | I-31 (100 mol %) | I-31 (100 mol %) | I-31 (100 mol %) | |
| | Volume Average Particle Size | 53 nm | 50 nm | 63 nm | 65 nm | 55 nm | 60 nm | |
| 137 | Oil-Soluble Dye | 1-12 | 1-12 | C-1 | C-1 | Y-1 | 1-12, C-1, Y-1 | Invention |
| | Compound of Formula (1) | I-42 (100 mol %) | I-42 (100 mol %) | I-42 (100 mol %) | I-42 (100 mol %) | I-42 (100 mol %) | I-42 (100 mol %) | |
| | Volume Average Particle Size | 53 nm | 50 nm | 63 nm | 65 nm | 55 nm | 60 nm | |
| 138 | Oil-Soluble Dye | 1-12 | 1-12 | C-1 | C-1 | Y-1 | 1-12, C-1, Y-1 | Invention |
| | Compound of Formula (1) | I-44 (100 mol %) | I-44 (100 mol %) | I-44 (100 mol %) | I-44 (100 mol %) | I-44 (100 mol %) | I-44 (100 mol %) | |
| | Volume Average Particle Size | 53 nm | 50 nm | 63 nm | 65 nm | 55 nm | 60 nm | |
| 139 | Oil-Soluble Dye | 1-12 | 1-12 | C-1 | C-1 | Y-1 | 1-12, C-1, Y-1 | Invention |
| | Compound of Formula (1) | I-53 (100 mol %) | I-53 (100 mol %) | I-53 (100 mol %) | I-53 (100 mol %) | I-53 (100 mol %) | I-53 (100 mol %) | |
| | Volume Average Particle Size | 53 nm | 50 nm | 63 nm | 65 nm | 55 nm | 60 nm | |
| 140 | Oil-Soluble Dye | 1-12 | 1-12 | C-1 | C-1 | Y-1 | 1-12, C-1, Y-1 | Invention |
| | Compound of Formula (1) | I-54 (100 mol %) | I-54 (100 mol %) | I-54 (100 mol %) | I-54 (100 mol %) | I-54 (100 mol %) | I-54 (100 mol %) | |
| | Volume Average Particle Size | 53 nm | 50 nm | 63 nm | 65 nm | 55 nm | 60 nm | |
| 141 | Oil-Soluble Dye | 1-12 | 1-12 | C-1 | C-1 | Y-1 | 1-12, C-1, Y-1 | Invention |
| | Compound of Formula (1) | I-77 (100 mol %) | I-77 (100 mol %) | I-77 (100 mol %) | I-77 (100 mol %) | I-77 (100 mol %) | I-77 (100 mol %) | |
| | Volume Average Particle Size | 53 nm | 50 nm | 63 nm | 65 nm | 55 nm | 60 nm | |
| 142 | Oil-Soluble Dye | 1-12 | 1-12 | C-1 | C-1 | Y-1 | 1-12, C-1, Y-1 | Invention |
| | Compound of Formula (1) | I-69 (100 mol %) | I-69 (100 mol %) | I-69 (100 mol %) | I-69 (100 mol %) | I-69 (100 mol %) | I-69 (100 mol %) | |
| | Volume Average Particle Size | 53 nm | 50 nm | 63 nm | 65 nm | 55 nm | 60 nm | |
| 143 | Oil-Soluble Dye | 1-18 5.0 g/l | 1-18 20.0 g/l | C-1 9.3 g/l | C-1 37.2 g/l | Y-1 27.2 g/l | 1-18 10.0 g/l C-1 18.6 g/l Y-1 13.6 g/l | Comparison |
| | Compound of Formula (1) | — | — | — | — | — | | |
| | Volume Average Particle Size | 51 nm | 53 nm | 62 nm | 65 nm | 59 nm | 70 nm | |
| 144 | Oil-Soluble Dye | 1-18 | 1-18 | C-1 | C-1 | Y-1 | 1-18, C-1, Y-1 | Invention |
| | Compound of Formula (1) | I-11 (100 mol %) | I-11 (100 mol %) | I-11 (100 mol %) | I-11 (100 mol %) | I-11 (100 mol %) | I-11 (100 mol %) | |
| | Volume Average Particle Size | 53 nm | 50 nm | 63 nm | 65 nm | 55 nm | 60 nm | |

TABLE 7

| Ink Set | | Light Magenta | Magenta | Light Cyan | Cyan | Yellow | Black | Note |
|---|---|---|---|---|---|---|---|---|
| 145 | Oil-Soluble Dye | 1-18 | 1-18 | C-1 | C-1 | Y-1 | 1-18, C-1, Y-1 | Invention |
| | Compound of Formula (1) | I-39 (100 mol %) | I-39 (100 mol %) | I-39 (100 mol %) | I-39 (100 mol %) | I-39 (100 mol %) | I-39 (100 mol %) | |
| | Volume Average Particle Size | 53 nm | 50 nm | 63 nm | 65 nm | 55 nm | 60 nm | |
| 146 | Oil-Soluble Dye | 1-18 | 1-18 | C-1 | C-1 | Y-1 | 1-18, C-1, Y-1 | Invention |
| | Compound of Formula (1) | I-31 (100 mol %) | I-31 (100 mol %) | I-31 (100 mol %) | I-31 (100 mol %) | I-31 (100 mol %) | I-31 (100 mol %) | |

TABLE 7-continued

| Ink Set | | Light Magenta | Magenta | Light Cyan | Cyan | Yellow | Black | Note |
|---|---|---|---|---|---|---|---|---|
| | Volume Average Particle Size | 53 nm | 50 nm | 63 nm | 65 nm | 55 nm | 60 nm | |
| 147 | Oil-Soluble Dye | 1-18 | 1-18 | C-1 | C-1 | Y-1 | 1-18, C-1, Y-1 | Invention |
| | Compound of Formula (1) | I-42 (100 mol %) | I-42 (100 mol %) | I-42 (100 mol %) | I-42 (100 mol %) | I-42 (100 mol %) | I-42 (100 mol %) | |
| | Volume Average Particle Size | 53 nm | 50 nm | 63 nm | 65 nm | 55 nm | 60 nm | |
| 148 | Oil-Soluble Dye | 1-18 | 1-18 | C-1 | C-1 | Y-1 | 1-18, C-1, Y-1 | Invention |
| | Compound of Formula (1) | I-44 (100 mol %) | I-44 (100 mol %) | I-44 (100 mol %) | I-44 (100 mol %) | I-44 (100 mol %) | I-44 (100 mol %) | |
| | Volume Average Particle Size | 53 nm | 50 nm | 63 nm | 65 nm | 55 nm | 60 nm | |
| 149 | Oil-Soluble Dye | 1-18 | 1-18 | C-1 | C-1 | Y-1 | 1-18, C-1, Y-1 | Invention |
| | Compound of Formula (1) | I-53 (100 mol %) | I-53 (100 mol %) | I-53 (100 mol %) | I-53 (100 mol %) | I-53 (100 mol %) | I-53 (100 mol %) | |
| | Volume Average Particle Size | 53 nm | 50 nm | 63 nm | 65 nm | 55 nm | 60 nm | |
| 150 | Oil-Soluble Dye | 1-18 | 1-18 | C-1 | C-1 | Y-1 | 1-18, C-1, Y-1 | Invention |
| | Compound of Formula (1) | I-54 (100 mol %) | I-54 (100 mol %) | I-54 (100 mol %) | I-54 (100 mol %) | I-54 (100 mol %) | I-54 (100 mol %) | |
| | Volume Average Particle Size | 53 nm | 50 nm | 63 nm | 65 nm | 55 nm | 60 nm | |
| 151 | Oil-Soluble Dye | 1-18 | 1-18 | C-1 | C-1 | Y-1 | 1-18, C-1, Y-1 | Invention |
| | Compound of Formula (1) | I-77 (100 mol %) | I-77 (100 mol %) | I-77 (100 mol %) | I-77 (100 mol %) | I-77 (100 mol %) | I-77 (100 mol %) | |
| | Volume Average Particle Size | 53 nm | 50 nm | 63 nm | 65 nm | 55 nm | 60 nm | |
| 152 | Oil-Soluble Dye | 1-18 | 1-18 | C-1 | C-1 | Y-1 | 1-18, C-1, Y-1 | Invention |
| | Compound of Formula (1) | I-69 (100 mol %) | I-69 (100 mol %) | I-69 (100 mol %) | I-69 (100 mol %) | I-69 (100 mol %) | I-69 (100 mol %) | |
| | Volume Average Particle Size | 53 nm | 50 nm | 63 nm | 65 nm | 55 nm | 60 nm | |
| 153 | Oil-Soluble Dye | 1-19 5.0 g/l | 1-19 20.0 g/l | C-1 9.3 g/l | C-1 37.2 g/l | Y-1 27.2 g/l | 1-19 10.0 g/l C-1 18.6 g/l Y-1 13.6 g/l | Comparison |
| | Compound of Formula (1) | — | — | — | — | — | — | |
| | Volume Average Particle Size | 51 nm | 53 nm | 62 nm | 65 nm | 59 nm | 70 nm | |

TABLE 8

| Ink Set | | Light Magenta | Magenta | Light Cyan | Cyan | Yellow | Black | Note |
|---|---|---|---|---|---|---|---|---|
| 154 | Oil-Soluble Dye | 1-19 | 1-19 | C-1 | C-1 | Y-1 | 1-19, C-1, Y-1 | Invention |
| | Compound of Formula (1) | I-11 (100 mol %) | I-11 (100 mol %) | I-11 (100 mol %) | I-11 (100 mol %) | I-11 (100 mol %) | I-11 (100 mol %) | |
| | Volume Average Particle Size | 53 nm | 50 nm | 63 nm | 65 nm | 55 nm | 60 nm | |
| 155 | Oil-Soluble Dye | 1-19 | 1-19 | C-1 | C-1 | Y-1 | 1-19, C-1, Y-1 | Invention |
| | Compound of Formula (1) | I-39 (100 mol %) | I-39 (100 mol %) | I-39 (100 mol %) | I-39 (100 mol %) | I-39 (100 mol %) | I-39 (100 mol %) | |
| | Volume Average Particle Size | 53 nm | 50 nm | 63 nm | 65 nm | 55 nm | 60 nm | |
| 156 | Oil-Soluble Dye | 1-19 | 1-19 | C-1 | C-1 | Y-1 | 1-19, C-1, Y-1 | Invention |
| | Compound of Formula (1) | I-31 (100 mol %) | I-31 (100 mol %) | I-31 (100 mol %) | I-31 (100 mol %) | I-31 (100 mol %) | I-31 (100 mol %) | |
| | Volume Average Particle Size | 53 nm | 50 nm | 63 nm | 65 nm | 55 nm | 60 nm | |
| 157 | Oil-Soluble Dye | 1-19 | 1-19 | C-1 | C-1 | Y-1 | 1-19, C-1, Y-1 | Invention |
| | Compound of Formula (1) | I-42 (100 mol %) | I-42 (100 mol %) | I-42 (100 mol %) | I-42 (100 mol %) | I-42 (100 mol %) | I-42 (100 mol %) | |
| | Volume Average Particle Size | 53 nm | 50 nm | 63 nm | 65 nm | 55 nm | 60 nm | |
| 158 | Oil-Soluble Dye | 1-19 | 1-19 | C-1 | C-1 | Y-1 | 1-19, C-1, Y-1 | Invention |
| | Compound of Formula (1) | I-44 (100 mol %) | I-44 (100 mol %) | I-44 (100 mol %) | I-44 (100 mol %) | I-44 (100 mol %) | I-44 (100 mol %) | |
| | Volume Average Particle Size | 53 nm | 50 nm | 63 nm | 65 nm | 55 nm | 60 nm | |
| 159 | Oil-Soluble Dye | 1-19 | 1-19 | C-1 | C-1 | Y-1 | 1-19, C-1, Y-1 | Invention |
| | Compound of Formula (1) | I-53 (100 mol %) | I-53 (100 mol %) | I-53 (100 mol %) | I-53 (100 mol %) | I-53 (100 mol %) | I-53 (100 mol %) | |

TABLE 8-continued

| Ink Set | | Light Magenta | Magenta | Light Cyan | Cyan | Yellow | Black | Note |
|---|---|---|---|---|---|---|---|---|
| | Volume Average Particle Size | 53 nm | 50 nm | 63 nm | 65 nm | 55 nm | 60 nm | |
| 160 | Oil-Soluble Dye | 1-19 | 1-19 | C-1 | C-1 | Y-1 | 1-19, C-1, Y-1 | Invention |
| | Compound of Formula (1) | I-54 (100 mol %) | I-54 (100 mol %) | I-54 (100 mol %) | I-54 (100 mol %) | I-54 (100 mol %) | I-54 (100 mol %) | |
| | Volume Average Particle Size | 53 nm | 50 nm | 63 nm | 65 nm | 55 nm | 60 nm | |
| 161 | Oil-Soluble Dye | 1-19 | 1-19 | C-1 | C-1 | Y-1 | 1-19, C-1, Y-1 | Invention |
| | Compound of Formula (1) | I-77 (100 mol %) | I-77 (100 mol %) | I-77 (100 mol %) | I-77 (100 mol %) | I-77 (100 mol %) | I-77 (100 mol %) | |
| | Volume Average Particle Size | 53 nm | 50 nm | 63 nm | 65 nm | 55 nm | 60 nm | |
| 162 | Oil-Soluble Dye | 1-19 | 1-19 | C-1 | C-1 | Y-1 | 1-19, C-1, Y-1 | Invention |
| | Compound of Formula (1) | I-69 (100 mol %) | I-69 (100 mol %) | I-69 (100 mol %) | I-69 (100 mol %) | I-69 (100 mol %) | I-69 (100 mol %) | |
| | Volume Average Particle Size | 53 nm | 50 nm | 63 nm | 65 nm | 55 nm | 60 nm | |

TABLE 9

| Ink Set | | Light Magenta | Magenta | Light Cyan | Cyan | Yellow | Black | Note |
|---|---|---|---|---|---|---|---|---|
| 163 | Oil-Soluble Dye | 1-1 | 1-1 | C-1 | C-1 | Y-1 | 1-1, C-1, Y-1 | Invention |
| | Compound of General Formula (1) | I-11, I-31 (100 mol %) | I-11, I-31 (100 mol %) | I-11, I-31 (100 mol %) | I-11, I-31 (100 mol %) | I-11, I-31 (100 mol %) | I-11, I-31 (100 mol %) | |
| | Volume Average Particle Size | 53 nm | 50 nm | 63 nm | 65 nm | 55 nm | 60 nm | |
| 164 | Oil-Soluble Dye | 1-1 | 1-1 | C-1 | C-1 | Y-1 | 1-1, C-1, Y-1 | Invention |
| | Compound of Formula (1) | I-11, I-44 (100 mol %) | I-11, I-44 (100 mol %) | I-11, I-44 (100 mol %) | I-11, I-44 (100 mol %) | I-11, I-44 (100 mol %) | I-11, I-44 (100 mol %) | |
| | Volume Average Particle Size | 53 nm | 50 nm | 63 nm | 65 nm | 55 nm | 60 nm | |
| 165 | Oil-Soluble Dye | 1-1 | 1-1 | C-1 | C-1 | Y-1 | 1-1, C-1, Y-1 | Invention |
| | Compound of Formula (1) | I-31, I-44 (100 mol %) | I-31, I-44 (100 mol %) | I-31, I-44 (100 mol %) | I-31, I-44 (100 mol %) | I-31, I-44 (100 mol %) | I-31, I-44 (100 mol %) | |
| | Volume Average Particle Size | 53 nm | 50 nm | 63 nm | 65 nm | 55 nm | 60 nm | |
| 166 | Oil-Soluble Dye | 1-1 | 1-1 | C-1 | C-1 | Y-1 | 1-1, C-1, Y-1 | Invention |
| | Compound of General Formula (1) | I-53, I-77 (100 mol %) | I-53, I-77 (100 mol %) | I-53, I-77 (100 mol %) | I-53, I-77 (100 mol %) | I-53, I-77 (100 mol %) | I-53, I-77 (100 mol %) | |
| | Volume Average Particle Size | 53 nm | 50 nm | 63 nm | 65 nm | 55 nm | 60 nm | |
| 167 | Oil-Soluble Dye | 1-1 | 1-1 | C-1 | C-1 | Y-1 | 1-1, C-1, Y-1 | Invention |
| | Compound of Formula (1) | I-53, I-69 (100 mol %) | I-53, I-69 (100 mol %) | I-53, I-69 (100 mol %) | I-53, I-69 (100 mol %) | I-53, I-69 (100 mol %) | I-53, I-69 (100 mol %) | |
| | Volume Average Particle Size | 53 nm | 50 nm | 63 nm | 65 nm | 55 nm | 60 nm | |
| 168 | Oil-Soluble Dye | 1-1 | 1-1 | C-1 | C-1 | Y-1 | 1-1, C-1, Y-1 | Invention |
| | Compound of Formula (1) | I-77, I-69 (100 mol %) | I-77, I-69 (100 mol %) | I-77, I-69 (100 mol %) | I-77, I-69 (100 mol %) | I-77, I-69 (100 mol %) | I-77, I-69 (100 mol %) | |
| | Volume Average Particle Size | 53 nm | 50 nm | 63 nm | 65 nm | 55 nm | 60 nm | |
| 169 | Oil-Soluble Dye | 1-1 | 1-1 | C-1 | C-1 | Y-1 | 1-1, C-1, Y-1 | Invention |
| | Compound of General Formula (1) | I-31, I-53 (100 mol %) | I-31, I-53 (100 mol %) | I-31, I-53 (100 mol %) | I-31, I-53 (100 mol %) | I-31, I-53 (100 mol %) | I-31, I-53 (100 mol %) | |
| | Volume Average Particle Size | 53 nm | 50 nm | 63 nm | 65 nm | 55 nm | 60 nm | |
| 170 | Oil-Soluble Dye | 1-1 | 1-1 | C-1 | C-1 | Y-1 | 1-1, C-1, Y-1 | Invention |
| | Compound of Formula (1) | I-31, I-77 (100 mol %) | I-31, I-77 (100 mol %) | I-31, I-77 (100 mol %) | I-31, I-77 (100 mol %) | I-31, I-77 (100 mol %) | I-31, I-77 (100 mol %) | |
| | Volume Average Particle Size | 53 nm | 50 nm | 63 nm | 65 nm | 55 nm | 60 nm | |
| 171 | Oil-Soluble Dye | 1-1 | 1-1 | C-1 | C-1 | Y-1 | 1-1, C-1, Y-1 | Invention |
| | Compound of Formula (1) | I-44, I-53 (100 mol %) | I-44, I-53 (100 mol %) | I-44, I-53 (100 mol %) | I-44, I-53 (100 mol %) | I-44, I-53 (100 mol %) | I-44, I-53 (100 mol %) | |
| | Volume Average Particle Size | 53 nm | 50 nm | 63 nm | 65 nm | 55 nm | 60 nm | |

TABLE 10

| Ink Set | | Light Magenta | Magenta | Light Cyan | Cyan | Yellow | Black | Note |
|---|---|---|---|---|---|---|---|---|
| 172 | Oil-Soluble Dye | 1-1 | 1-1 | C-1 | C-1 | Y-1 | 1-1, C-1, Y-1 | Invention |
| | Compound of Formula (1) | I-11 (20 mol %) | I-11 (20 mol %) | I-11 (20 mol %) | I-11 (20 mol %) | I-11 (20 mol %) | I-11 (20 mol %) | |
| | Volume Average Particle Size | 53 nm | 50 nm | 63 nm | 65 nm | 55 nm | 60 nm | |
| 173 | Oil-Soluble Dye | 1-1 | 1-1 | C-1 | C-1 | Y-1 | 1-1, C-1, Y-1 | Invention |
| | Compound of Formula (1) | I-11 (50 mol %) | I-11 (50 mol %) | I-11 (50 mol %) | I-11 (50 mol %) | I-11 (50 mol %) | I-11 (50 mol %) | |
| | Volume Average Particle Size | 53 nm | 50 nm | 63 nm | 65 nm | 55 nm | 60 nm | |
| 174 | Oil-Soluble Dye | 1-1 | 1-1 | C-1 | C-1 | Y-1 | 1-1, C-1, Y-1 | Invention |
| | Compound of Formula (1) | I-11 (200 mol %) | I-11 (200 mol %) | I-11 (200 mol %) | I-11 (200 mol %) | I-11 (200 mol %) | I-11 (200 mol %) | |
| | Volume Average Particle Size | 53 nm | 50 nm | 63 nm | 65 nm | 55 nm | 60 nm | |
| 175 | Oil-Soluble Dye | 1-1 | 1-1 | C-1 | C-1 | Y-1 | 1-1, C-1, Y-1 | Invention |
| | Compound of Formula (1) | I-11 (500 mol %) | I-11 (500 mol %) | I-11 (500 mol %) | I-11 (500 mol %) | I-11 (500 mol %) | I-11 (500 mol %) | |
| | Volume Average Particle Size | 53 nm | 50 nm | 63 nm | 65 nm | 55 nm | 60 nm | |
| 176 | Oil-Soluble Dye | 1-1, 1-12 5.0 g/l | 1-1, 1-12 20.0 g/l | C-1 9.3 g/l | C-1 37.2 g/l | Y-1 27.2 g/l | 1-18 10.0 g/l C-1 18.6 g/l Y-1 13.6 g/l | Comparison |
| | Compound of Formula (1) | — | — | — | — | — | — | |
| | Volume Average Particle Size | 51 nm | 53 nm | 62 nm | 65 nm | 59 nm | 70 nm | |
| 177 | Oil-Soluble Dye | 1-1, 1-18 5.0 g/l | 1-1, 1-18 20.0 g/l | C-1 9.3 g/l | C-1 37.2 g/l | Y-1 27.2 g/l | 1-18 10.0 g/l C-1 18.6 g/l Y-1 13.6 g/l | Comparison |
| | Compound of Formula (1) | — | — | — | — | — | — | |
| | Volume Average Particle Size | 51 nm | 53 nm | 62 nm | 65 nm | 59 nm | 70 nm | |
| 178 | Oil-Soluble Dye | 1-1, 1-12 | 1-1, 1-12 | C-1 | C-1 | Y-1 | 1-18, C-1, Y-1 | Invention |
| | Compound of Formula (1) | I-11 (100 mol %) | I-11 (100 mol %) | I-11 (100 mol %) | I-11 (100 mol %) | I-11 (100 mol %) | I-11 (100 mol %) | |
| | Volume Average Particle Size | 53 nm | 50 nm | 63 nm | 65 nm | 55 nm | 60 nm | |
| 179 | Oil-Soluble Dye | 1-1, 1-18 | 1-1, 1-18 | C-1 | C-1 | Y-1 | 1-18, C-1, Y-1 | Invention |
| | Compound of Formula (1) | I-11 (100 mol %) | I-11 (100 mol %) | I-11 (100 mol %) | I-11 (100 mol %) | I-11 (100 mol %) | I-11 (100 mol %) | |
| | Volume Average Particle Size | 53 nm | 50 nm | 63 nm | 65 nm | 55 nm | 60 nm | |
| 180 | Oil-Soluble Dye | 1-1, 1-12 | 1-1, 1-12 | C-1 | C-1 | Y-1 | 1-18, C-1, Y-1 | Invention |
| | Compound of Formula (1) | I-31 (100 mol %) | I-31 (100 mol %) | I-31 (100 mol %) | I-31 (100 mol %) | I-31 (100 mol %) | I-31 (100 mol %) | |
| | Volume Average Particle Size | 53 nm | 50 nm | 63 nm | 65 nm | 55 nm | 60 nm | |

TABLE 11

| Ink Set | | Light Magenta | Magenta | Light Cyan | Cyan | Yellow | Black | Note |
|---|---|---|---|---|---|---|---|---|
| 181 | Oil-Soluble Dye | 1-1, 1-18 | 1-1, 1-18 | C-1 | C-1 | Y-1 | 1-18, C-1, Y-1 | Invention |
| | Compound of Formula (1) | I-31 (100 mol %) | I-31 (100 mol %) | I-31 (100 mol %) | I-31 (100 mol %) | I-31 (100 mol %) | I-31 (100 mol %) | |
| | Volume Average Particle Size | 53 nm | 50 nm | 63 nm | 65 nm | 55 nm | 60 nm | |
| 182 | Oil-Soluble Dye | 1-1, 1-12 | 1-1, 1-12 | C-1 | C-1 | Y-1 | 1-18, C-1, Y-1 | Invention |
| | Compound of Formula (1) | I-53 (100 mol %) | I-53 (100 mol %) | I-53 (100 mol %) | I-53 (100 mol %) | I-53 (100 mol %) | I-53 (100 mol %) | |
| | Volume Average Particle Size | 53 nm | 50 nm | 63 nm | 65 nm | 55 nm | 60 nm | |
| 183 | Oil-Soluble Dye | 1-1, 1-18 | 1-1, 1-18 | C-1 | C-1 | Y-1 | 1-18, C-1, Y-1 | Invention |
| | Compound of Formula (1) | I-53 (100 mol %) | I-53 (100 mol %) | I-53 (100 mol %) | I-53 (100 mol %) | I-53 (100 mol %) | I-53 (100 mol %) | |
| | Volume Average Particle Size | 53 nm | 50 nm | 63 nm | 65 nm | 55 nm | 60 nm | |

TABLE 11-continued

| Ink Set | | Light Magenta | Magenta | Light Cyan | Cyan | Yellow | Black | Note |
|---|---|---|---|---|---|---|---|---|
| 184 | Oil-Soluble Dye | 1-1, 1-12 | 1-1, 1-12 | C-1 | C-1 | Y-1 | 1-18, C-1, Y-1 I-77 (100 mol %) | Invention |
| | Compound of Formula (1) | I-77 (100 mol %) | I-77 (100 mol %) | I-77 (100 mol %) | I-77 (100 mol %) | I-77 (100 mol %) | | |
| | Volume Average Particle Size | 53 nm | 50 nm | 63 nm | 65 nm | 55 nm | 60 nm | |
| 185 | Oil-Soluble Dye | 1-1, 1-18 | 1-1, 1-18 | C-1 | C-1 | Y-1 | 1-18, C-1, Y-1 I-77 (100 mol %) | Invention |
| | Compound of Formula (1) | I-77 (100 mol %) | I-77 (100 mol %) | I-77 (100 mol %) | I-77 (100 mol %) | I-77 (100 mol %) | | |
| | Volume Average Particle Size | 53 nm | 50 nm | 63 nm | 65 nm | 55 nm | 60 nm | |
| 186 | Oil-Soluble Dye | 1-1, 1-18 5.0 g/l | 1-1, 1-18 20.0 g/l | C-1 9.3 g/l | C-1 37.2 g/l | Y-1 27.2 g/l | 1-18 10.0 g/l C-1 18.6 g/l Y-1 13.6 g/l | Comparison |
| | Compound of Formula (1) | — | — | — | — | — | — | |
| | Volume Average Particle Size | 305 nm | 331 nm | 318 nm | 351 nm | 335 nm | 349 nm | |
| 187 | Oil-Soluble Dye | 1-1, 1-18 | 1-1, 1-18 | C-1 | C-1 | Y-1 | 1-18, C-1, Y-1 I-77 (100 mol %) | Invention |
| | Compound of Formula (1) | I-77 (100 mol %) | I-77 (100 mol %) | I-77 (100 mol %) | I-77 (100 mol %) | I-77 (100 mol %) | | |
| | Volume Average Particle Size | 305 nm | 331 nm | 318 nm | 351 nm | 335 nm | 349 nm | |

TABLE 12

| | Light Magenta | Magenta | Light Cyan | Cyan | Yellow | Black |
|---|---|---|---|---|---|---|
| Water-Soluble Dye | A-1 7.0 g/l | A-1 28.0 g/l | A-2 8.75 g/l | A-2 35.0 g/l | A-3 14.7 g/l A-4 14.0 g/l | A-5 20.0 g/l A-6 20.0 g/l A-7 20.0 g/l A-3 21.0 g/l |
| Diethylene Glycol | 150 g/l | 112 g/l | 130 g/l | 200 g/l | 160 g/l | 20 g/l |
| Urea | | | | | | |
| Glycerol | 37 g/l | 46 g/l | — | — | — | — |
| Triethylene Glycol Monobutyl Ether | 130 g/l | 130 g/l | 150 g/l | 180 g/l | 150 g/l | 120 g/l |
| Diethylene Glycol Monobutyl Ether | — | — | — | — | — | 230 g/l |
| 2-Pyrrolidone | — | — | — | — | — | 80 g/l |
| SURFYNOL 465 | 12.5 g/l | 11.5 g/l | 11.1 g/l | 9.8 g/l | — | — |
| SURFYNOL GT | — | — | — | — | 9.0 g/l | 8.5 g/l |
| Triethanolamine | 6.9 g/l | 7.4 g/l | 6.8 g/l | 6.7 g/l | 0.8 g/l | 18.9 g/l |
| Benzotriazole | 0.08 g/l | 0.07 g/l | 0.08 g/l | 0.08 g/l | 0.08 g/l | 0.08 g/l |
| Proxel XL2 | 3.5 g/l | 2.5 g/l | 1.8 g/l | 2 g/l | 2.5 g/l | 1.8 g/l |
| Deionized water to make 1 liter | | | | | | |

In Table 12, A-1 to A-7 are as follows:

A-1

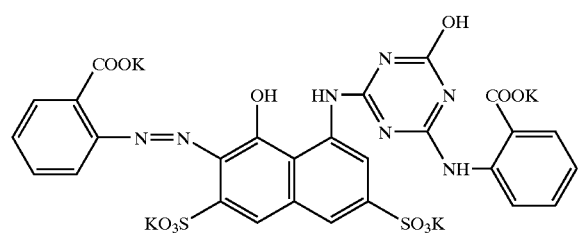

-continued
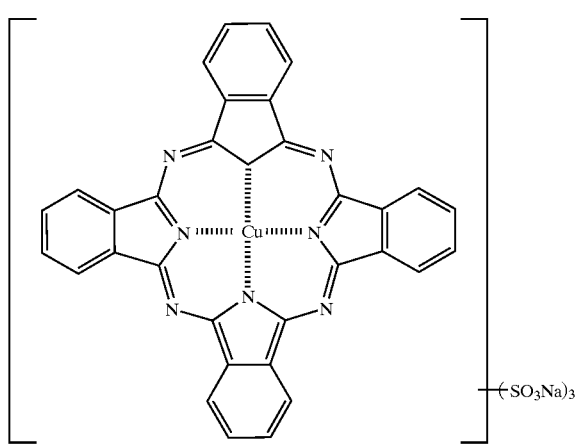
A-2
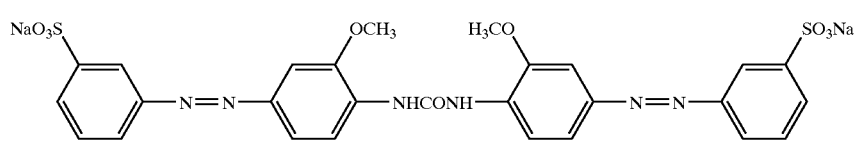
A-3
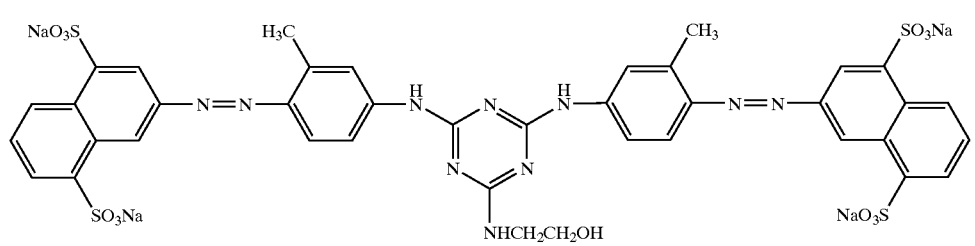
A-4
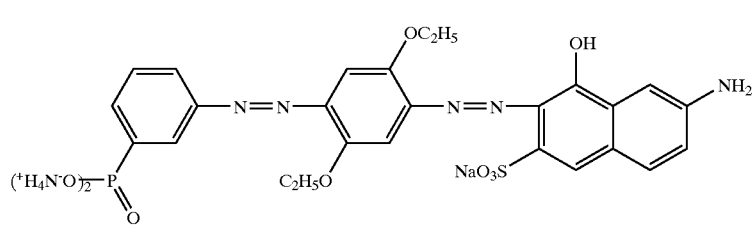
A-5
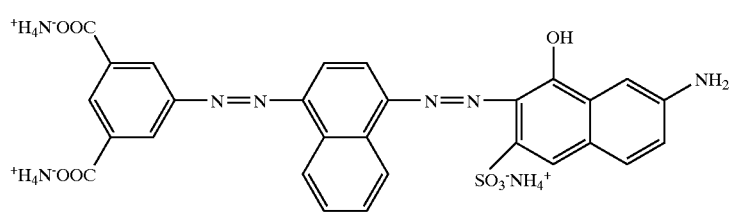
A-6
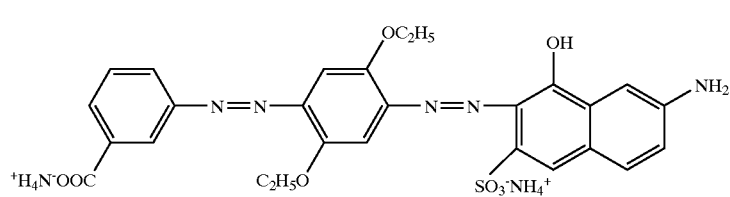
A-7
Then, these ink sets 101 to 188 were charged into cartridges of an ink-jet printer PM670C (manufactured by Seiko Epson Corporation), and images were printed on ink-jet paper, photo glossy paper EX, manufactured by Fuji Photo Film Co., Ltd. by use of the same printer, followed by the following evaluations.

Printing Performance (1)

Each cartridge was set on the printer, and ejecting of the ink from all nozzles was confirmed. Then, 20 sheets of A-4 size paper were printed out, and the distortion of printing was evaluated.

A: No distortion was observed from the initiation of printing to the termination thereof.

B: The distortion of printing was observed on some sheets of paper.

C: The distortion of printing was observed from the initiation of printing to the termination thereof.

Printing Performance (2)

Each cartridge was allowed to stand at 60° C. for 2 days, and then, the distortion of printing was evaluated in the same manner as with printing performance (1).

Drying Quality

A stain generated in touching the paper with a finger immediately after printing was visually evaluated.

Blur of Thin Line

Thin line patterns of yellow, magenta, cyan and black were printed and visually evaluated (evaluation (1)). For black, after magenta ink was printed, a thin line of black was printed all over. Then, a blur caused by contact of two colors was also evaluated (evaluation (2)).

Water Resistance

After the resulting image was immersed in deionized water for 10 seconds, a blur of the image was evaluated.

Image Keeping Quality

Printed samples of yellow, magenta, cyan and black were prepared, and the following evaluations were made.

(1) Light Fastness

After the image density Ci immediately after printing was measured with an X-rite 310, the image was irradiated with xenon light (85,000 luxes) by use of a weather meter (manufactured by Atlas Co.) for 10 days. Then, the image density Cf was measured again, and the dye remaining rate (Cf/Ci)×100 was determined to conduct evaluation.

(2) Dark Heat Keeping Quality

The image densities before and after storage of each sample under conditions of 80° C. and 15% RH for 7 days were measured with an X-rite 310, and the dye remaining rate was determined by the same calculation method as with the evaluation of light fastness, thereby evaluating the dark heat keeping quality.

Results obtained are shown in Tables 13 and 16.

TABLE 13

| Ink Set | Printing Performance (1) | Printing Performance (2) | Drying Quality | Blur of Thin Line (1) | Blur of Thin Line (2) | Water Resistance | Note |
|---|---|---|---|---|---|---|---|
| 101 | A | A | Poor | Poor | Poor | Poor | Comparison |
| 102 | A | A | Good | Good | Good | Good | Invention |
| 103 | A | A | Good | Good | Good | Good | Invention |
| 104 | A | A | Good | Good | Good | Good | Invention |
| 105 | A | A | Good | Good | Good | Good | Invention |
| 106 | A | A | Good | Good | Good | Good | Invention |
| 107 | A | A | Good | Good | Good | Good | Invention |
| 108 | A | B | Good | Good | Good | Good | Invention |
| 109 | A | B | Good | Good | Good | Good | Invention |
| 110 | A | B | Good | Good | Good | Good | Invention |
| 111 | A | B | Good | Good | Good | Good | Invention |
| 112 | A | B | Good | Good | Good | Good | Invention |
| 113 | A | B | Good | Good | Good | Good | Invention |
| 114 | A | B | Good | Good | Good | Good | Invention |
| 115 | A | B | Good | Good | Good | Good | Invention |
| 116 | A | B | Good | Good | Good | Good | Invention |

TABLE 13-continued

| Ink Set | Printing Performance (1) | Printing Performance (2) | Drying Quality | Blur of Thin Line (1) | Blur of Thin Line (2) | Water Resistance | Note |
|---|---|---|---|---|---|---|---|
| 117 | A | B | Good | Good | Good | Good | Invention |
| 118 | A | B | Good | Good | Good | Good | Invention |
| 119 | A | B | Good | Good | Good | Good | Invention |
| 120 | A | B | Good | Good | Good | Good | Invention |
| 121 | A | B | Good | Good | Good | Good | Invention |
| 122 | A | B | Good | Good | Good | Good | Invention |
| 123 | A | B | Poor | Poor | Poor | Poor | Comparison |
| 124 | A | B | Good | Good | Good | Good | Invention |
| 125 | A | A | Good | Good | Good | Good | Invention |
| 126 | A | A | Good | Good | Good | Good | Invention |
| 127 | A | A | Good | Good | Good | Good | Invention |
| 128 | A | B | Good | Good | Good | Good | Invention |
| 129 | A | B | Good | Good | Good | Good | Invention |
| 130 | A | B | Good | Good | Good | Good | Invention |
| 131 | A | A | Good | Good | Good | Good | Invention |
| 132 | A | A | Good | Good | Good | Good | Invention |
| 133 | A | A | Poor | Poor | Poor | Poor | Comparison |
| 134 | A | A | Good | Good | Good | Good | Invention |
| 135 | A | A | Good | Good | Good | Good | Invention |
| 136 | A | A | Good | Good | Good | Good | Invention |
| 137 | A | A | Good | Good | Good | Good | Invention |
| 138 | A | B | Good | Good | Good | Good | Invention |
| 139 | A | B | Good | Good | Good | Good | Invention |
| 140 | A | B | Good | Good | Good | Good | Invention |
| 141 | A | B | Good | Good | Good | Good | Invention |
| 142 | A | B | Good | Good | Good | Good | Invention |
| 143 | A | B | Poor | Poor | Poor | Poor | Comparison |
| 144 | A | B | Good | Good | Good | Good | Invention |
| 145 | A | B | Good | Good | Good | Good | Invention |

TABLE 14

| Ink Set | Printing Performance (1) | Printing Performance (2) | Drying Quality | Blur of Thin Line (1) | Blur of Thin Line (2) | Water Resistance | Note |
|---|---|---|---|---|---|---|---|
| 146 | A | B | Good | Good | Good | Good | Invention |
| 147 | A | B | Good | Good | Good | Good | Invention |
| 148 | A | B | Good | Good | Good | Good | Invention |
| 149 | A | B | Good | Good | Good | Good | Invention |
| 150 | A | B | Good | Good | Good | Good | Invention |
| 151 | A | B | Good | Good | Good | Good | Invention |
| 152 | A | B | Good | Good | Good | Good | Invention |
| 153 | A | B | Poor | Poor | Poor | Poor | Comparison |
| 154 | A | B | Good | Good | Good | Good | Invention |
| 155 | A | A | Good | Good | Good | Good | Invention |
| 156 | A | A | Good | Good | Good | Good | Invention |
| 157 | A | A | Good | Good | Good | Good | Invention |
| 158 | A | B | Good | Good | Good | Good | Invention |
| 159 | A | B | Good | Good | Good | Good | Invention |
| 160 | A | B | Good | Good | Good | Good | Invention |
| 161 | A | B | Good | Good | Good | Good | Invention |
| 162 | A | A | Good | Good | Good | Good | Invention |
| 163 | A | B | Good | Good | Good | Good | Invention |
| 164 | A | B | Good | Good | Good | Good | Invention |
| 165 | A | B | Good | Good | Good | Good | Invention |
| 166 | A | B | Good | Good | Good | Good | Invention |
| 167 | A | A | Good | Good | Good | Good | Invention |
| 168 | A | B | Poor | Poor | Poor | Poor | Comparison |
| 169 | A | B | Good | Good | Good | Good | Invention |
| 170 | A | B | Good | Good | Good | Good | Invention |
| 171 | A | B | Good | Good | Good | Good | Invention |
| 172 | A | B | Good | Good | Good | Good | Invention |
| 173 | A | B | Good | Good | Good | Good | Invention |
| 174 | A | B | Good | Good | Good | Good | Invention |
| 175 | A | B | Good | Good | Good | Good | Invention |
| 176 | A | B | Poor | Poor | Poor | Poor | Comparison |

TABLE 14-continued

| Ink Set | Printing Performance (1) | Printing Performance (2) | Drying Quality | Blur of Thin Line (1) | Blur of Thin Line (2) | Water Resistance | Note |
|---|---|---|---|---|---|---|---|
| 177 | A | B | Poor | Poor | Poor | Poor | Comparison |
| 178 | A | B | Good | Good | Good | Good | Invention |
| 179 | A | B | Good | Good | Good | Good | Invention |
| 180 | A | B | Good | Good | Good | Good | Invention |
| 181 | A | B | Good | Good | Good | Good | Invention |
| 182 | A | B | Good | Good | Good | Good | Invention |
| 183 | A | B | Good | Good | Good | Good | Invention |
| 184 | A | B | Good | Good | Good | Good | Invention |
| 185 | A | B | Good | Good | Good | Good | Invention |
| 186 | A | A | Poor | Poor | Poor | Poor | Comparison |
| 187 | C | C | Good | Good | Good | Good | Invention |
| 188 | A | B | Poor | Poor | Poor | Poor | Comparison |

TABLE 15

| Ink Set | Light-Dye Remaining Rate (%) | | | | Dark Heat-Dye Remaining Rate (%) | | | | Note |
|---|---|---|---|---|---|---|---|---|---|
| | Y | M | C | BK | Y | M | C | BK | |
| 101 | 40.1 | 56.1 | 32.8 | 42.8 | 40.8 | 57.1 | 33.8 | 41.8 | Comparison |
| 102 | 71.1 | 73.8 | 68.8 | 71.5 | 79.1 | 78.8 | 79.8 | 79.5 | Invention |
| 103 | 90.2 | 89.4 | 88.9 | 89.1 | 90.2 | 88.4 | 89.9 | 89.1 | Invention |
| 104 | 79.9 | 82.6 | 81.8 | 80.5 | 86.9 | 85.6 | 84.8 | 85.5 | Invention |
| 105 | 72.8 | 71.8 | 70.1 | 72.1 | 78.8 | 81.8 | 80.1 | 80.1 | Invention |
| 106 | 81.8 | 82.4 | 81.9 | 81.6 | 85.8 | 86.4 | 85.9 | 85.6 | Invention |
| 107 | 91.8 | 90.4 | 89.8 | 90.8 | 91.8 | 91.4 | 88.8 | 90.8 | Invention |
| 108 | 68.8 | 69.9 | 72.8 | 70.5 | 77.8 | 79.9 | 76.8 | 78.5 | Invention |
| 109 | 92.1 | 90.8 | 89.4 | 90.8 | 92.1 | 89.8 | 91.4 | 90.8 | Invention |
| 110 | 81.9 | 80.1 | 78.2 | 79.9 | 83.9 | 85.1 | 84.2 | 83.9 | Invention |
| 111 | 80.6 | 78.5 | 79.8 | 79.8 | 84.6 | 86.5 | 83.8 | 84.8 | Invention |
| 112 | 91.1 | 88.2 | 89.4 | 89.1 | 91.1 | 89.2 | 88.4 | 89.1 | Invention |
| 113 | 92.8 | 88.4 | 91.1 | 89.2 | 88.8 | 90.4 | 89.1 | 89.2 | Invention |
| 114 | 87.6 | 90.0 | 88.2 | 88.5 | 91.6 | 90.0 | 88.2 | 88.5 | Invention |
| 115 | 88.8 | 91.9 | 89.1 | 88.9 | 88.8 | 89.9 | 86.1 | 88.9 | Invention |
| 116 | 88.9 | 86.6 | 91.1 | 87.4 | 89.9 | 90.6 | 88.1 | 87.4 | Invention |
| 117 | 78.1 | 77.9 | 81.2 | 77.5 | 79.1 | 78.9 | 81.2 | 78.5 | Invention |
| 118 | 88.1 | 90.4 | 89.8 | 88.5 | 87.1 | 89.4 | 89.2 | 87.5 | Invention |
| 119 | 78.8 | 77.5 | 81.9 | 79.5 | 81.8 | 82.5 | 79.9 | 79.5 | Invention |
| 120 | 77.9 | 79.8 | 79.1 | 78.5 | 78.9 | 81.8 | 78.1 | 78.5 | Invention |
| 121 | 87.2 | 91.1 | 88.4 | 90.1 | 90.2 | 91.1 | 88.4 | 88.1 | Invention |
| 122 | 76.9 | 80.8 | 78.2 | 79.9 | 78.9 | 79.8 | 78.2 | 79.9 | Invention |
| 123 | 41.3 | 54.2 | 31.5 | 40.6 | 40.5 | 53.4 | 34.5 | 40.3 | Comparison |
| 124 | 90.2 | 88.8 | 88.9 | 89.1 | 90.2 | 87.7 | 89.9 | 89.1 | Invention |
| 125 | 91.8 | 89.9 | 89.8 | 90.8 | 91.8 | 90.8 | 88.8 | 90.8 | Invention |
| 126 | 92.1 | 90.8 | 89.4 | 90.8 | 92.1 | 89.3 | 91.4 | 90.8 | Invention |
| 127 | 92.8 | 87.9 | 91.1 | 89.2 | 88.8 | 89.8 | 89.1 | 89.2 | Invention |
| 128 | 87.6 | 89.5 | 88.2 | 88.5 | 91.6 | 89.6 | 88.2 | 88.5 | Invention |
| 129 | 88.8 | 91.3 | 89.1 | 88.9 | 88.8 | 89.3 | 86.1 | 88.9 | Invention |
| 130 | 88.9 | 87.9 | 91.1 | 87.4 | 89.9 | 89.9 | 88.1 | 87.4 | Invention |
| 131 | 88.1 | 89.8 | 89.8 | 88.5 | 87.1 | 88.8 | 89.2 | 87.5 | Invention |
| 132 | 87.2 | 90.6 | 88.4 | 90.1 | 90.2 | 90.6 | 88.4 | 88.1 | Invention |
| 133 | 42.3 | 50.5 | 32.4 | 39.7 | 40.7 | 48.3 | 34.8 | 38.4 | Comparison |
| 134 | 90.1 | 87.4 | 88.6 | 89.0 | 90.4 | 86.4 | 89.6 | 89.4 | Invention |
| 135 | 91.3 | 88.4 | 89.5 | 90.2 | 91.9 | 89.4 | 88.4 | 90.2 | Invention |
| 136 | 92.2 | 88.8 | 89.4 | 90.3 | 92.5 | 87.8 | 91.8 | 90.3 | Invention |
| 137 | 92.4 | 86.4 | 91.2 | 89.0 | 88.6 | 88.4 | 89.9 | 89.0 | Invention |
| 138 | 87.8 | 88.0 | 88.3 | 88.1 | 91.7 | 88.0 | 88.6 | 88.1 | Invention |
| 139 | 88.3 | 89.9 | 89.2 | 88.6 | 88.2 | 87.9 | 86.0 | 88.5 | Invention |
| 140 | 88.4 | 87.2 | 91.8 | 87.1 | 89.5 | 89.1 | 88.9 | 87.1 | Invention |
| 141 | 88.7 | 89.1 | 89.4 | 88.0 | 87.8 | 88.1 | 89.7 | 87.0 | Invention |
| 142 | 87.5 | 89.3 | 88.0 | 90.6 | 90.7 | 89.6 | 88.9 | 88.0 | Invention |
| 143 | 40.9 | 46.1 | 31.9 | 37.1 | 41.9 | 44.2 | 34.1 | 37.7 | Comparison |
| 144 | 90.7 | 87.1 | 88.7 | 88.7 | 90.6 | 86.1 | 89.1 | 89.0 | Invention |
| 145 | 91.4 | 88.0 | 89.5 | 89.5 | 91.5 | 89.0 | 88.3 | 89.8 | Invention |

TABLE 16

| Ink Set | Light-Dye Remaining Rate (%) | | | | Dark Heat-Dye Remaining Rate (%) | | | | Note |
|---|---|---|---|---|---|---|---|---|---|
| | Y | M | C | BK | Y | M | C | BK | |
| 146 | 92.3 | 88.2 | 89.3 | 90.0 | 92.0 | 87.2 | 91.5 | 90.0 | Invention |
| 147 | 92.8 | 85.9 | 91.9 | 88.8 | 88.2 | 88.0 | 89.1 | 88.7 | Invention |
| 148 | 87.6 | 87.7 | 88.8 | 88.0 | 91.1 | 87.3 | 88.9 | 87.8 | Invention |
| 149 | 88.5 | 89.3 | 89.6 | 88.1 | 88.8 | 87.1 | 86.8 | 88.1 | Invention |
| 150 | 88.2 | 87.0 | 91.3 | 86.8 | 89.9 | 88.5 | 88.5 | 87.0 | Invention |
| 151 | 88.2 | 88.6 | 89.9 | 87.5 | 87.9 | 87.8 | 89.9 | 86.8 | Invention |
| 152 | 87.1 | 88.9 | 88.6 | 90.1 | 90.2 | 89.1 | 88.2 | 87.6 | Invention |
| 153 | 40.2 | 43.1 | 33.9 | 37.2 | 41.9 | 42.1 | 34.7 | 37.1 | Comparison |
| 154 | 90.1 | 86.4 | 88.2 | 88.2 | 90.2 | 85.6 | 89.3 | 88.8 | Invention |
| 155 | 91.0 | 87.5 | 89.9 | 89.1 | 91.1 | 88.5 | 88.1 | 89.4 | Invention |
| 156 | 92.6 | 87.5 | 89.8 | 89.6 | 92.4 | 87.1 | 91.2 | 90.3 | Inven- |

TABLE 16-continued

| Ink Set | Light-Dye Remaining Rate (%) | | | | Dark Heat-Dye Remaining Rate (%) | | | | Note |
|---|---|---|---|---|---|---|---|---|---|
| | Y | M | C | BK | Y | M | C | BK | |
| 157 | 92.1 | 85.6 | 91.2 | 88.5 | 88.6 | 87.8 | 88.6 | 88.3 | Invention |
| 158 | 87.9 | 87.1 | 88.3 | 88.3 | 91.2 | 87.1 | 88.4 | 87.4 | Invention |
| 159 | 88.9 | 88.8 | 89.1 | 88.4 | 88.3 | 87.0 | 88.8 | 87.7 | Invention |
| 160 | 88.8 | 87.1 | 91.4 | 86.8 | 89.9 | 88.1 | 88.1 | 87.2 | Invention |
| 161 | 88.7 | 88.2 | 89.4 | 87.5 | 87.9 | 87.3 | 89.3 | 86.4 | Invention |
| 162 | 87.9 | 88.8 | 88.2 | 90.1 | 90.2 | 89.0 | 88.8 | 87.2 | Invention |
| 163 | 90.7 | 91.6 | 89.7 | 89.9 | 90.1 | 87.4 | 89.9 | 89.9 | Invention |
| 164 | 91.4 | 90.5 | 89.8 | 90.9 | 91.2 | 90.5 | 88.9 | 90.8 | Invention |
| 165 | 92.5 | 91.8 | 89.8 | 90.7 | 92.4 | 89.7 | 91.8 | 89.8 | Invention |
| 166 | 91.5 | 90.5 | 91.9 | 89.6 | 88.2 | 90.3 | 89.9 | 89.9 | Invention |
| 167 | 88.2 | 91.7 | 89.5 | 88.9 | 91.1 | 91.2 | 88.8 | 89.5 | Invention |
| 168 | 89.1 | 90.6 | 90.3 | 89.9 | 89.8 | 90.7 | 86.9 | 88.9 | Invention |
| 169 | 89.4 | 91.3 | 91.6 | 88.4 | 90.9 | 89.8 | 88.7 | 90.4 | Invention |
| 170 | 89.1 | 90.3 | 90.7 | 89.5 | 88.7 | 88.9 | 89.6 | 87.4 | Invention |
| 171 | 90.2 | 91.4 | 88.5 | 91.1 | 90.6 | 90.9 | 88.8 | 88.5 | Invention |
| 172 | 88.2 | 87.4 | 86.9 | 87.1 | 80.2 | 79.4 | 81.9 | 82.1 | Invention |
| 173 | 89.9 | 89.6 | 88.8 | 88.5 | 84.9 | 85.6 | 85.8 | 86.5 | Invention |
| 174 | 91.8 | 91.8 | 90.1 | 90.1 | 90.8 | 91.8 | 90.1 | 91.1 | Invention |
| 175 | 92.8 | 92.4 | 91.9 | 92.0 | 93.8 | 92.4 | 91.9 | 91.6 | Invention |
| 176 | 41.8 | 54.2 | 33.1 | 41.3 | 42.9 | 53.1 | 54.1 | 39.3 | Comparison |
| 177 | 42.1 | 50.5 | 31.8 | 38.5 | 41.8 | 48.9 | 35.9 | 40.4 | Comparison |
| 178 | 90.3 | 91.8 | 88.7 | 89.5 | 90.1 | 89.9 | 89.3 | 89.3 | Invention |
| 179 | 91.1 | 89.9 | 89.4 | 90.7 | 91.3 | 89.8 | 88.1 | 90.2 | Invention |
| 180 | 92.7 | 90.5 | 89.9 | 80.7 | 92.1 | 91.4 | 91.3 | 90.6 | Invention |
| 181 | 92.3 | 89.8 | 91.7 | 89.3 | 88.4 | 89.8 | 89.4 | 89.4 | Invention |
| 182 | 87.2 | 91.6 | 88.9 | 88.4 | 91.2 | 90.7 | 88.3 | 88.8 | Invention |
| 183 | 88.9 | 90.5 | 89.9 | 88.8 | 88.6 | 88.4 | 86.7 | 88.9 | Invention |
| 184 | 88.8 | 89.8 | 91.3 | 87.6 | 89.5 | 89.7 | 88.0 | 87.9 | Invention |
| 185 | 88.3 | 91.4 | 89.6 | 88.2 | 87.9 | 90.4 | 89.3 | 87.7 | Invention |
| 186 | 42.4 | 58.4 | 34.6 | 45.3 | 41.9 | 59.8 | 35.3 | 43.5 | Comparison |
| 187 | 90.3 | 91.1 | 89.3 | 89.9 | 87.9 | 90.1 | 88.9 | 88.0 | Invention |
| 188 | 50.1 | 21.2 | 73.3 | 38.8 | 78.8 | 79.1 | 81.7 | 76.1 | Comparison |

Tables 13 to 16 show that the use of the ink compositions for ink jet recording of the invention gives excellent printing performance, and also provides excellent water resistance and fastness. Further, according to the ink compositions for ink jet recording of the invention, blurs do not occur in printing thin lines.

Further, when the compound of 1-1 was used as the magenta dye and the compound of C-1 as the cyan dye, a particularly significant improved effect was observed.

Example 2

The ink sets prepared in Example 1 were charged into cartridges of an ink-jet printer BJ-F850 (manufactured by Canon Inc.), and images were printed on ink-jet paper, photo glossy paper EX, manufactured by Fuji Photo Film Co., Ltd. by use of the same printer, followed by the same evaluations as with Example 1. As a consequence, results similar to those of Example 1 were obtained.

The ink compositions for ink jet recording according to the invention have excellent printing performance, are excellent in water resistance and fastness, and do not generate blurs in printing thin lines.

The entire disclosure of each and every foreign patent application from which the benefit of foreign priority has been claimed in the present application is incorporated herein by reference, as if fully set forth herein.

What is claimed is:

1. An ink composition for ink jet recording comprising:
    an aqueous medium;
    a high boiling organic solvent dispersed in the aqueous medium;
    an oil-soluble dye dissolved in the high boiling organic solvent; and
    a compound represented by the following formula (I):

wherein $R^{101}$ and $R^{102}$ each independently represents one of a hydrogen atom, an aliphatic group, an aromatic group, a heterocyclic group, an acyl group, an aliphatic oxycarbonyl group, an aromatic oxycarbonyl group, an aliphatic sulfonyl group, an aromatic sulfonyl group, a substituted or unsubstituted carbamoyl group and a substituted or unsubstituted thiocarbamoyl group; $R^{103}$ represents one of an aliphatic group, an aromatic group, an aliphatic oxy group, an aromatic oxy group, an aliphatic thio group, an aromatic thio group, an acyloxy group, an aliphatic oxycarbonyloxy group, an aromatic oxycarbonyloxy group, a substituted or unsubstituted amino group, a heterocyclic group and a hydroxyl group; and $R^{101}$ and $R^{102}$, $R^{102}$ and $R^{103}$, and $R^{103}$ and $R^{101}$ may each combine with each other to form one of 5-, 6- and 7-membered ring, excluding the case a 2,2,6,6-tetraalkylpiperidine skeleton is formed, wherein the oil-soluble dye is represented by the following formula (II):

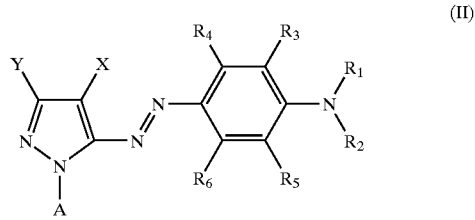

wherein X represents an electron attractive group having a Hammett substituent constant $\sigma_p$ of at least 0.20; $R_1$ and $R_2$ each independently represents one of a substituted or unsubstituted alkyl group, a substituted or unsubstituted alkenyl group, a substituted or unsubstituted cycloalkyl group and a substituted or unsubstituted aralkyl group; $R_3$, $R_4$, $R_5$ and $R_6$ each independently represents one of a hydrogen atom, a halogen atom, an alkyl group, a cycloalkyl group, an alkenyl group, an aralkyl group, an aiyl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group and an acyl group, which may each further have a substituent group; $R_1$ and $R_2$, $R_3$ and $R_1$, and $R_2$ and $R_5$ may each combine with each other to form a ring; Y represents one of a secondary or tertiary alkyl group, and a substituted or unsubstituted aryl group; and A represents a group comprising a non-metallic atomic group necessary for forming a one of 5-, 6-, 7- and 8-membered ring, and the ring may be substituted, may be a saturated ring, and may have an unsaturated bond.

2. The ink composition according to claim 1, wherein A in the formula (II) is a group represented by one of the following formulae (2-1) to (2-9):

(2-1)
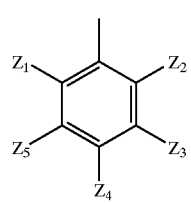

(2-2)
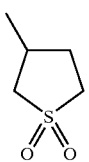

(2-3)
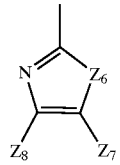

(2-4)
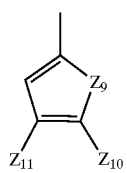

(2-5)
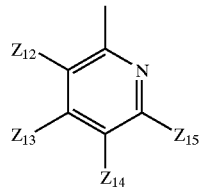

(2-6)
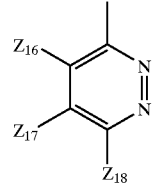

(2-7)
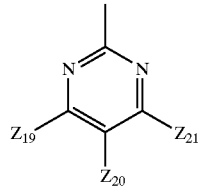

(2-8)
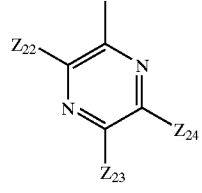

(2-9)
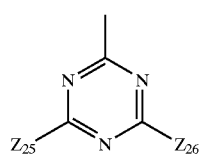

wherein $Z_1$ and $Z_2$ each independently represents one of a halogen atom, an alkyl group, a cycloalkyl group, an aralkyl group, an alkenyl group, an aryl group, a heterocyclic group, a cyano group, a hydroxyl group, a nitro group, an amino group, an alkylamino group, an alkoxy group, an aryloxy group, an amido group, an arylamino group, an ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group and an acyl group; $Z_6$ and $Z_9$ each independently represents one of N-R, an oxygen atom and a sulfur atom; and R, $Z_3$, $Z_4$, $Z_5$, $Z_7$, $Z_8$, $Z_{10}$, $Z_{11}$, $Z_{12}$, $Z_{13}$, $Z_{14}$, $Z_{15}$, $Z_{16}$, $Z_{17}$, $Z_{18}$, $Z_{19}$, $Z_{20}$, $Z_{21}$, $Z_{22}$, $Z_{23}$, $Z_{24}$, $Z_{25}$ and $Z_{26}$ each independently represents one of a hydrogen atom, a halogen atom, an alkyl group, a cycloalkyl group, an alkenyl group, an aralkyl group, an aryl group, a heterocyclic group, a cyano group, a hydroxyl group, a nitro group, an amino group, an alkylamino group, an alkoxy group, an aryloxy group, an amido group, an arylamino group, a ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclic oxy group, an azo group, an acyloxy group, a carbamoyloxy group, a silyloxy group, an aryloxycarbonyl group, an aryloxycarbonylamino group, an imido group, a heterocyclic thio group, a sulfinyl group, a phosphoryl group and an acyl group.

3. The ink composition according to claim 1, wherein the compound represented by the formula (I) is a compound represented by the following formula (IA):

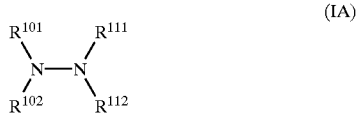

(IA)

wherein $R^{101}$ and $R^{102}$ have the same meaning as defined in the formula (I), and $R^{111}$ and $R^{112}$ have the same meaning as $R^{101}$.

4. The ink composition according to claim 2, wherein the compound represented by the formula (I) is a compound represented by the following formula (IA):

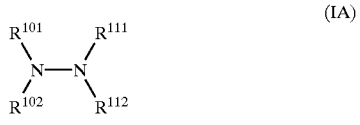

(IA)

wherein $R^{101}$ and $R^{102}$ have the same meaning as defined in the formula (I), and $R^{111}$ and $R^{112}$ have the same meaning as $R^{101}$.

5. The ink composition according to claim 1, wherein the compound represented by the formula (I) is a compound represented by the following formula (IB):

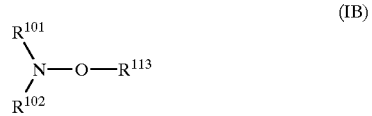

(IB)

wherein $R^{101}$ and $R^{102}$ have the same meaning as defined in the formula (I), and $R^{113}$ has the same meaning as $R^{101}$.

6. The ink composition according to claim 2, wherein the compound represented by the formula (I) is a compound represented by the following formula (IB):

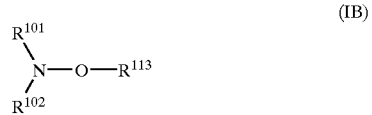

(IB)

wherein $R^{101}$ and $R^{102}$ have the same meaning as defined in the formula (I), and $R^{113}$ has the same meaning as $R^{101}$.

7. The ink composition according to claim 3, wherein $R^{101}$ and $R^{102}$ each independently represents one of a hydrogen atom, an aliphatic group, an aromatic group and an acyl group.

8. The ink composition according to claim 4, wherein $R^{101}$ and $R^{102}$ each independently represents one of a hydrogen atom, an aliphatic group, an aromatic group and an acyl group.

9. The ink composition according to claim 3, wherein $R^{111}$ and $R^{112}$ each independently represents one of a hydrogen atom, an acyl group, an aliphatic oxycarbonyl group, an aromatic oxycarbonyl group, an aliphatic sulfonyl group, an aromatic sulfonyl group, a substituted or unsubstituted carbamoyl group and a substituted or unsubstituted thiocarbamoyl group.

10. The ink composition according to claim 4, wherein $R^{111}$ and $R^{112}$ each independently represents one of a hydrogen atom, an acyl group, an aliphatic oxycarbonyl group, an aromatic oxycarbonyl group, an aliphatic sulfonyl group, an aromatic sulfonyl group, a substituted or unsubstituted carbamoyl group and a substituted or unsubstituted thiocarbamoyl group.

11. The ink composition according to claim 5, wherein $R^{113}$ represents one of a hydrogen atom, an aliphatic group, an aromatic group, a heterocyclic group and an acyl group.

12. The ink composition according to claim 6, wherein $R^{113}$ represents one of a hydrogen atom, an aliphatic group, an aromatic group, a heterocyclic group and an acyl group.

13. The ink composition according to claim 1, wherein particles comprising the dye dispersed in the aqueous medium have an average particle size of from 5 nm to 100 nm.

14. The ink composition according to claim 1, wherein the compound represented by the formula (I) and the oil-soluble dye are comprised in same particles.

15. The ink composition according to claim 1, wherein the amount of the compound represented by the formula (I) is from 1 mol % to 1000 mol % based on the amount of the oil-soluble dye.

16. The ink composition according to claim 1, wherein the amount of the oil-soluble dye is from 0.2 to 20 parts by weight per 100 parts by weight of the ink composition.

17. The ink composition according to claim 1, wherein the amount of the high boiling organic solvent is from 0.01 to 20 parts by weight based on 1 parts by weight of the amount of the oil-soluble dye.

18. An image formation method which comprises ejecting the ink composition according to claim 1 onto an image receiving paper comprising: an image receiving layer comprising white inorganic pigment particles; and a support.

19. An image formation method which comprises ejecting the ink composition according to claim 2 onto an image receiving paper comprising: an image receiving layer comprising white inorganic pigment particles; and a support.

20. The image formation method according to claim 18, wherein the compound represented by the formula (I) is a compound represented by the following formula (IA):

(IA)

wherein $R^{101}$ and $R^{102}$ have the same meaning as defined in the formula (I), and $R^{111}$ and $R^{112}$ have the same meaning as $R^{101}$.

21. The image formation method according to claim 19, wherein the compound represented by the formula (I) is a compound represented by the following formula (IA):

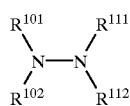

(IA)

wherein $R^{101}$ and $R^{102}$ have the same meaning as defined in the formula (I), and $R^{111}$ and $R^{112}$ have the same meaning as $R^{101}$.

22. The image formation method according to claim 18, wherein the compound represented by the formula (I) is a compound represented by the following formula (IB):

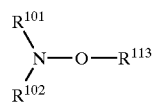

(IB)

wherein $R^{101}$ and $R^{102}$ have the same meaning as defined in the formula (I), and $R^{113}$ has the same meaning as $R^{101}$.

23. The image formation method according to claim 19, wherein the compound represented by the formula (I) is a compound represented by the following formula (IB):

(IB)

wherein $R^{101}$ and $R^{102}$ have the same meaning as defined in the formula (I), and $R^{113}$ has the same meaning as $R^{101}$.

* * * * *